US010027872B2

(12) United States Patent
Takanashi et al.

(10) Patent No.: US 10,027,872 B2
(45) Date of Patent: Jul. 17, 2018

(54) ACCESSORY APPARATUS, IMAGE-CAPTURING APPARATUS, IMAGE-CAPTURING SYSTEM, CONTROL METHOD AND STORAGE MEDIUM STORING CONTROL PROGRAM

(71) Applicant: CANON KABUSHIKI KAISHA, Tokyo (JP)

(72) Inventors: Hideya Takanashi, Tokyo (JP); Takayuki Komatsu, Yokohama (JP); Nobuyuki Horie, Tokyo (JP); Katsuhiro Wada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/471,223

(22) Filed: Mar. 28, 2017

(65) Prior Publication Data

US 2017/0289425 A1 Oct. 5, 2017

(30) Foreign Application Priority Data

Mar. 31, 2016 (JP) ................. 2016-070093

(51) Int. Cl.
*H04N 5/232* (2006.01)
*H04N 5/225* (2006.01)

(52) U.S. Cl.
CPC ....... *H04N 5/23203* (2013.01); *H04N 5/2252* (2013.01); *H04N 5/23209* (2013.01)

(58) Field of Classification Search
CPC .................................................. H04N 5/23203
USPC ...................................................... 348/211.1
See application file for complete search history.

(56) References Cited

U.S. PATENT DOCUMENTS

| 2010/0005109 | A1* | 1/2010 | Etoh ...................... G11B 27/36 707/E17.044 |
| 2011/0109789 | A1 | 5/2011 | Himuro |
| 2013/0308042 | A1* | 11/2013 | Kawada ................. G03B 17/14 348/360 |

FOREIGN PATENT DOCUMENTS

| JP | 11-338029 A | 12/1999 |
| JP | 2014-013360 A | 1/2014 |

OTHER PUBLICATIONS

The above documents were cited in a European Search Report dated Oct. 2, 2017, which is enclosed, that issued in the corresponding European Patent Application No. 17163784.6.

* cited by examiner

*Primary Examiner* — Joel Fosselman
(74) *Attorney, Agent, or Firm* — Cowan, Liebowitz & Latman, P.C.

(57) ABSTRACT

The accessory apparatus includes an accessory communicator providing a notification channel, a first data communication channel and a second data communication channel. The accessory controller transmits, in response to receiving a transmission request from an image-capturing apparatus through the notification channel, accessory data to the image-capturing apparatus through the first data communication channel and receives camera data transmitted from the image-capturing apparatus through the second data communication channel. The accessory controller has a function of detecting a camera communication error in the camera data and is configured to, when detecting the camera communication error, transmit accessory error information to the image-capturing apparatus and erase the accessory data stored in an accessory data buffer.

21 Claims, 29 Drawing Sheets

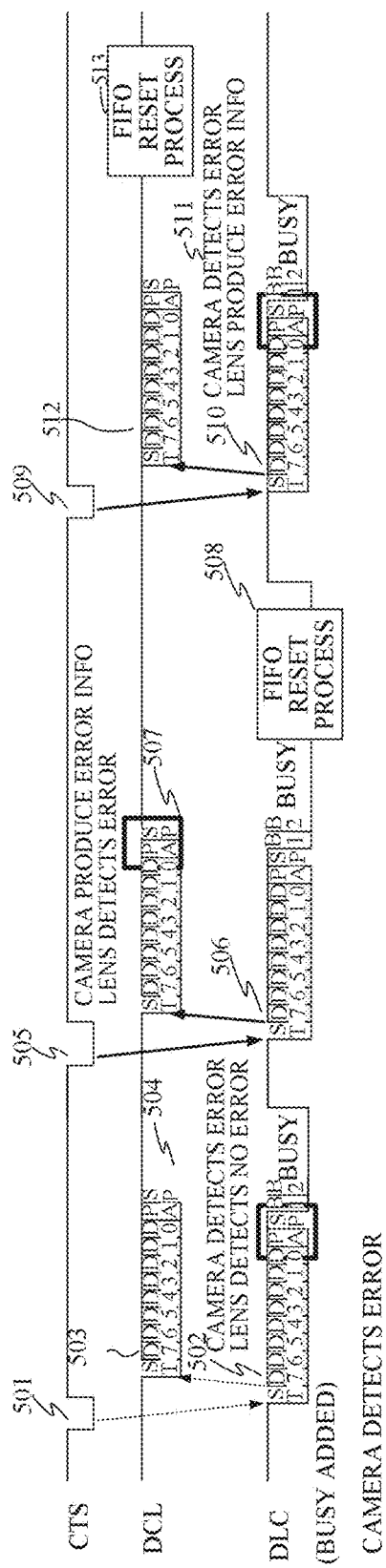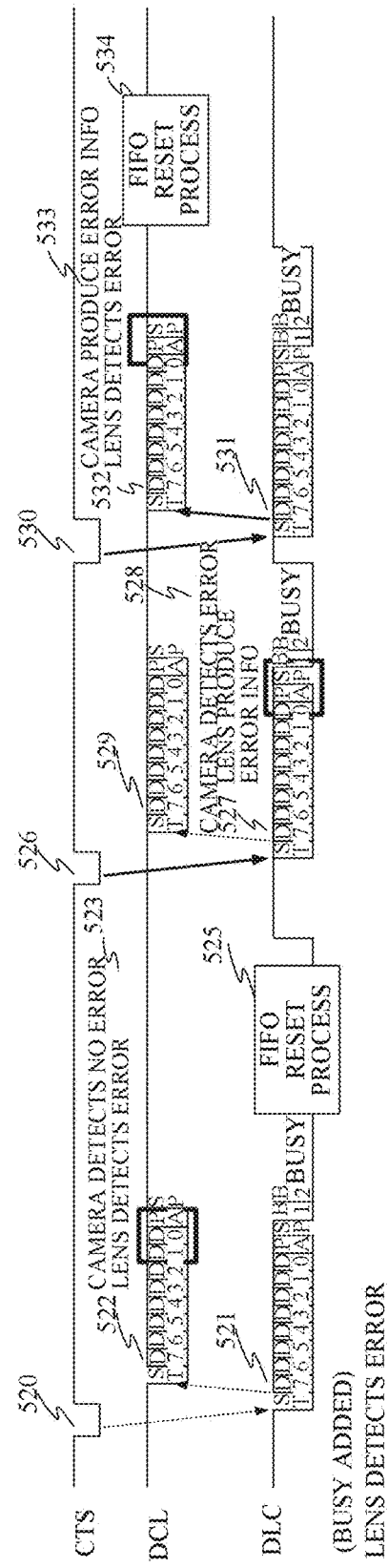

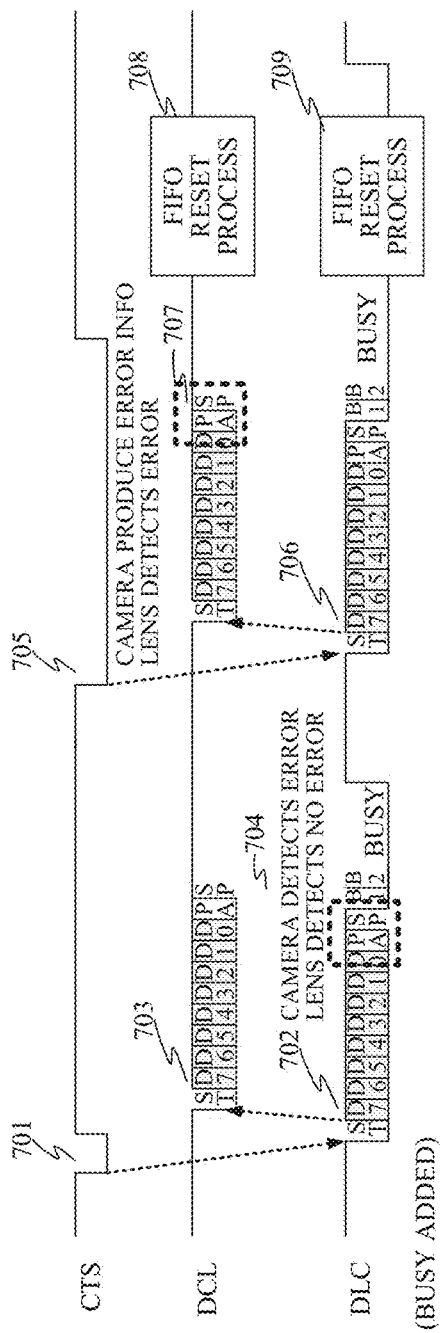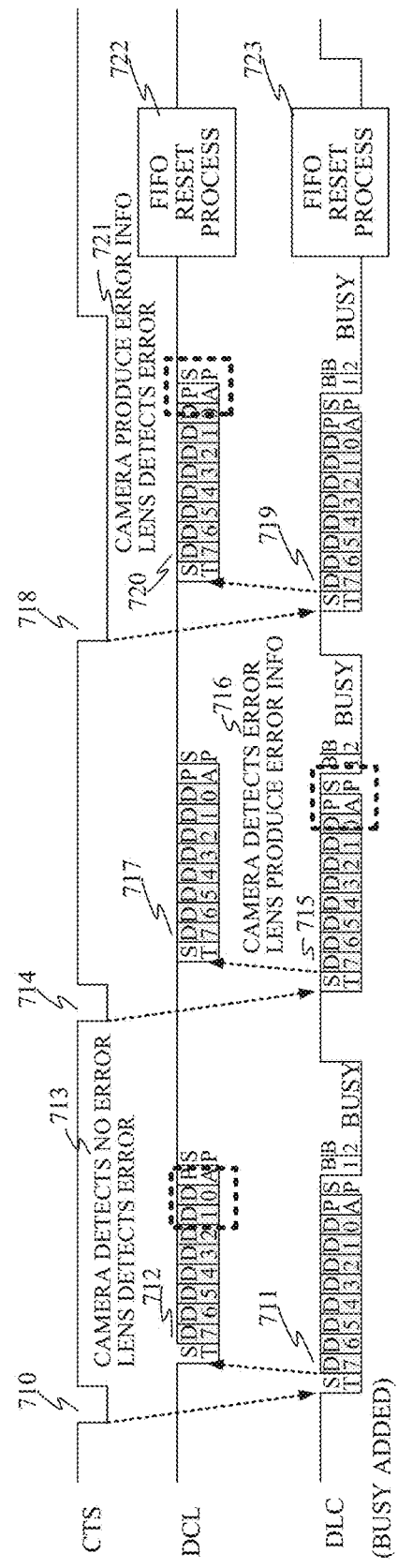
FIG. 7A
FIG. 7B

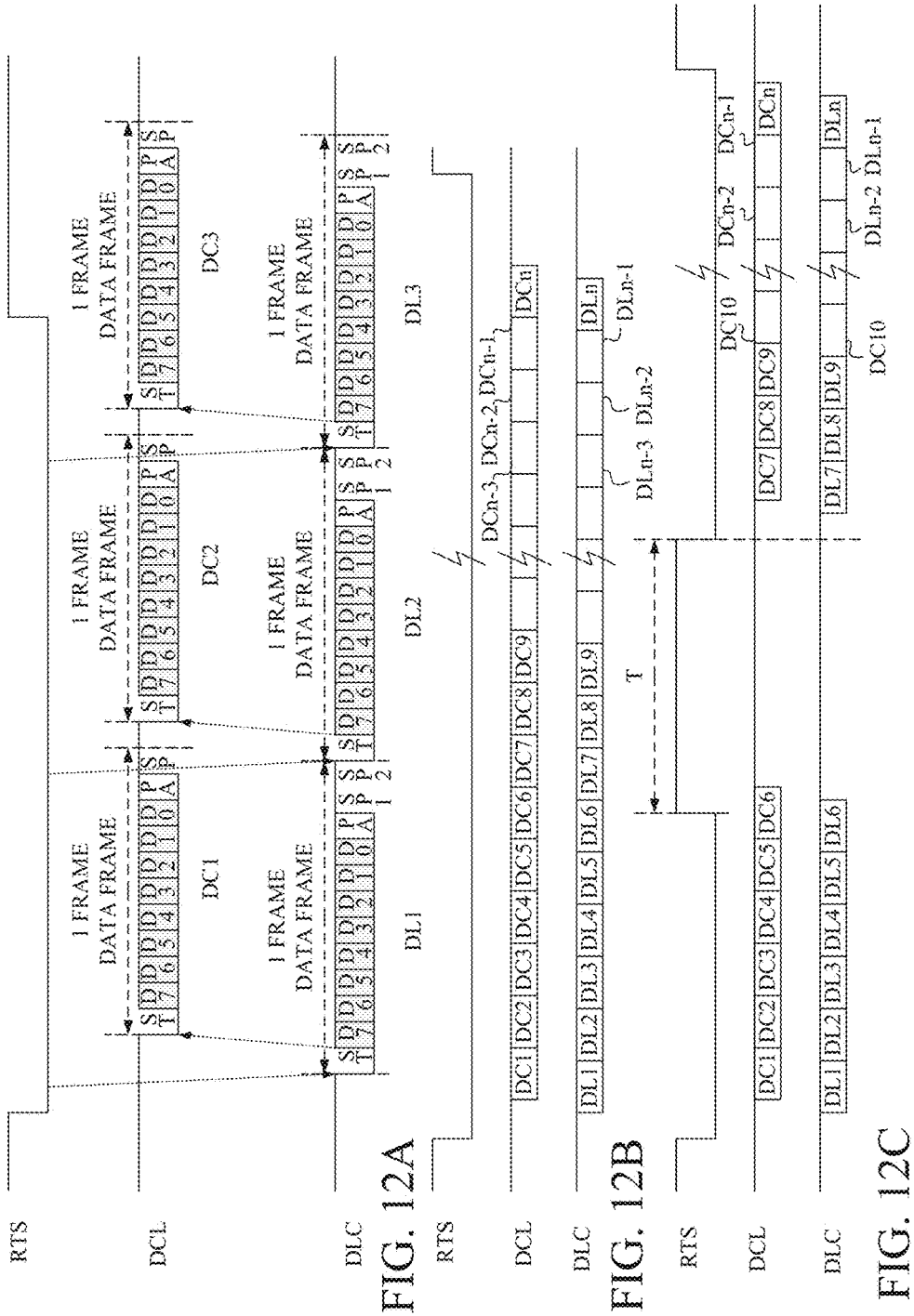

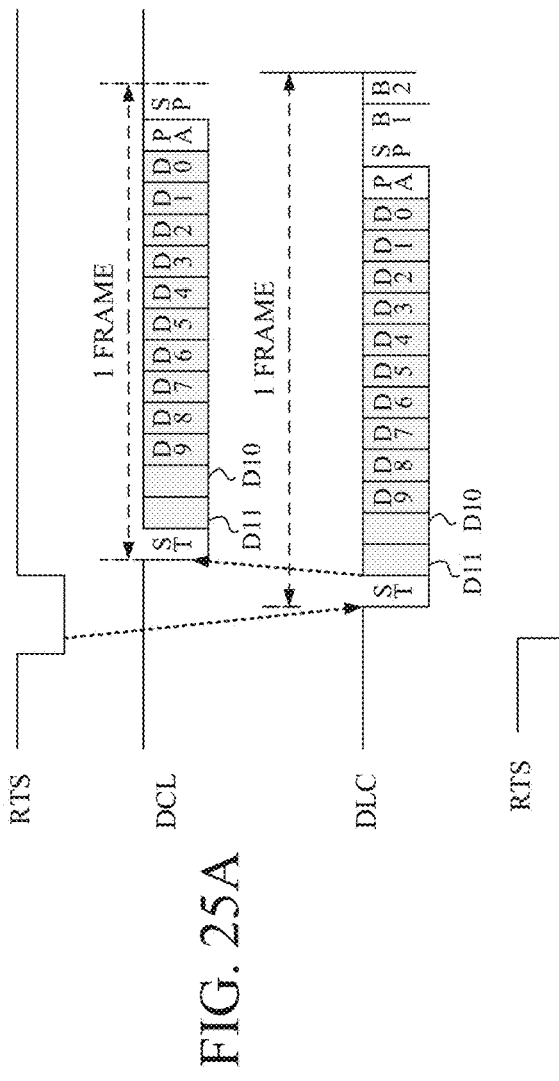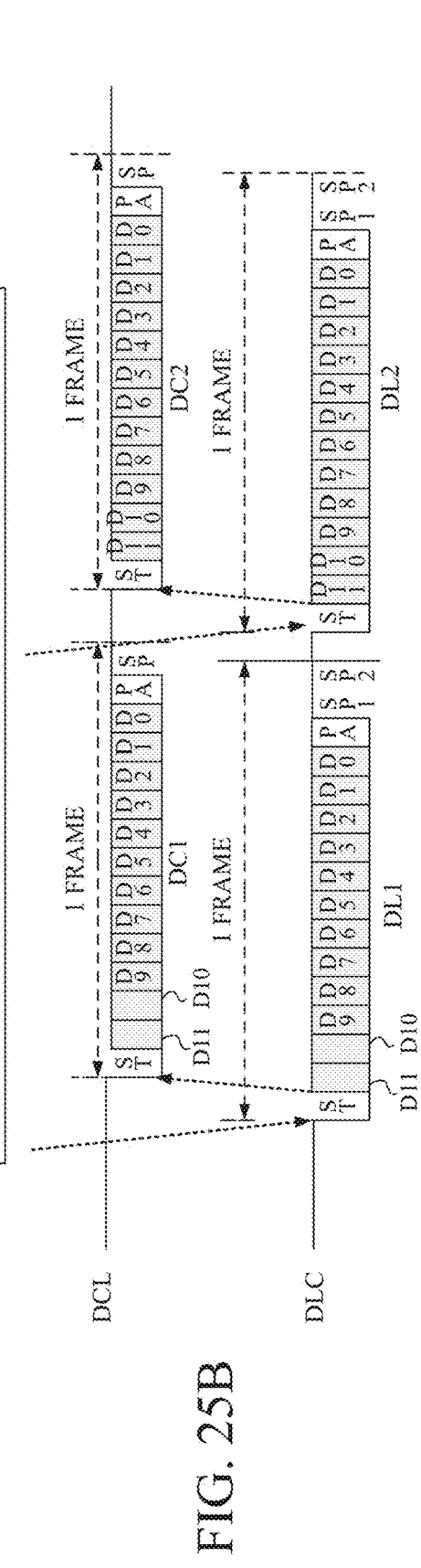
FIG. 25A
FIG. 25B

ACCESSORY APPARATUS, IMAGE-CAPTURING APPARATUS, IMAGE-CAPTURING SYSTEM, CONTROL METHOD AND STORAGE MEDIUM STORING CONTROL PROGRAM

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus communicate with each other for controlling the accessory apparatus from the camera body and for providing, from the accessory apparatus to the camera body, data required for controlling the accessory apparatus. In particular, when an interchangeable lens is used for capturing a moving image to be recorded or a live-view moving image to be displayed, smooth lens control in synchronization with image-capturing periods is required, so that it is necessary to synchronize image-capturing times in the camera body with control times in the interchangeable lens. Thus, the camera body is required to complete receipt of the data from the interchangeable lens and transmission of various commands and requests to the interchangeable lens in one image-capturing period.

However, an increase of an amount of the data to be received by the camera body from the interchangeable lens and a reduction of the image-capturing period (that is, an increase of a frame rate) require large volume data communication in a shorter time. Japanese Patent Laid-Open No. 2014-013360 discloses a camera system that performs communication processes according to image-capturing modes (such as a still image capturing mode and a motion image capturing mode) when a camera body and an interchangeable lens perform clock-synchronous serial communication therebetween.

To achieve high-speed data communication, it is necessary to increase a communication rate of data signal itself. However, the increase in communication rate easily causes an influence of a noise component in a communication path, which may increase an incidence of communication errors. Thus, it is important, when the communication error occurs, that the camera body and the interchangeable lens enable to return from the communication error. Japanese Patent Laid-Open No. 2014-013360 described above fails to disclose a method for returning from the communication error. On the other hand, Japanese Patent Laid-Open No. 11-338029 discloses a camera system enabling, when a communication error in serial communication between a camera body and an interchangeable lens occurs, returning from the communication error by performing an initializing operation of the serial communication.

However, performing such an initializing operation in response to the occurrence of the communication error prohibits a restart of the communication between the camera body and an interchangeable lens until the initial communication is completed. The initializing operation is, for example, transmission and receipt of identification data performed between the camera body and the interchangeable lens in response to power-on of the camera system before a start of the communication.

Furthermore, in general, the camera body and the interchangeable lens are each configured to transmit data to be transmitted to the other apparatus after storing the data to a transmission buffer. Therefore, for example, when the camera body detects a communication error, it is necessary to cause the interchangeable lens to clear the transmission buffer in the interchangeable lens, which requires an unwanted communication. Performing these initializing operation and buffer clearing operation when the communication error occurs makes it impossible to rapidly restart image capturing after the communication error occurs.

SUMMARY OF THE INVENTION

The present invention provides an accessory apparatus and an image-capturing apparatus each capable of rapidly restarting communication therebetween and image capturing after a communication error occurs.

The present invention provides as an aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to transmit, in response to receiving a transmission request as the notice from the image-capturing apparatus through the notification channel, the accessory data to the image-capturing apparatus through the first data communication channel and to receive the camera data transmitted from the image-capturing apparatus through the second data communication channel. The accessory communicator includes an accessory data buffer (312) configured to store the accessory data to be transmitted to the image-capturing apparatus. The accessory controller has a function of detecting a camera communication error in the camera data received from the image-capturing apparatus and is configured to, when detecting the camera communication error, transmit accessory error information to the image-capturing apparatus and erase the accessory data stored in the accessory data buffer.

The present invention provides as another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to provide a transmission request as the notice to the accessory apparatus through the notification channel to cause the accessory apparatus to transmit the accessory data through the first data communication channel and to transmit the camera data to the accessory apparatus through the second data communication channel. The camera communicator includes a camera data buffer (302) configured to store the camera data to be transmitted to the accessory apparatus. The camera controller has a function of detecting an accessory communication error in the accessory data received from the accessory apparatus and is configured to, when detecting the accessory communication error, transmit camera error information to the accessory apparatus and erase the camera data stored in the camera data buffer.

The present invention provides as yet another aspect thereof an image-capturing system including the above accessory and image-capturing apparatuses.

The present invention provides as still another aspect thereof a control method for controlling an accessory apparatus detachably attachable to an image-capturing apparatus, the accessory apparatus configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The method includes the step of causing the accessory apparatus receiving a transmission request as the notice from the image-capturing apparatus through the notification channel to transmit the accessory data to the image-capturing apparatus through the first data communication channel, the step of causing the accessory apparatus to receive the camera data transmitted from the image-capturing apparatus through the second data communication channel, and the step of causing the accessory apparatus detecting a camera communication error in the camera data received from the image-capturing apparatus to transmit accessory error information to the image-capturing apparatus and to erase the accessory data stored in an accessory data buffer to which the accessory data to be transmitted to the image-capturing apparatus is stored.

The present invention provides as yet still another aspect thereof a control method for controlling an image-capturing apparatus to which an accessory apparatus is detachably attachable, the image-capturing apparatus configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The method includes the step of causing the image-capturing apparatus to provide a transmission request as the notice to the accessory apparatus through the notification channel to cause the accessory apparatus to transmit the accessory data to the image-capturing apparatus through the first data communication channel, the step of causing the image-capturing apparatus to transmit the camera data to the accessory apparatus through the second data communication channel, and the step of causing the image-capturing apparatus detecting an accessory communication error in the accessory data received from the accessory apparatus to transmit camera error information to the accessory apparatus and to erase the camera data stored in a camera data buffer to which the camera data to be transmitted to the accessory apparatus is stored.

The present invention provides as further another aspect thereof a non-transitory storage medium storing a computer program for causing a computer to execute any one of the above control methods.

Further features and aspects of the present invention will become apparent from the following description of exemplary embodiments with reference to the attached drawings.

BRIEF DESCRIPTION OF THE DRAWINGS

FIGS. 5A and 5B illustrate waveforms of signals transmitted and received between the camera body and the interchangeable lens when a communication error is detected in Embodiment 1.

FIGS. 7A and 7B illustrate waveforms of signals transmitted and received between a camera body and an interchangeable lens when a communication error is detected in Embodiment 2 of the present invention.

FIGS. 12A to 12C illustrate waveforms of signals transmitted and received between a camera body and an interchangeable lens in a non-BUSY addition mode in a first communication setting in Embodiment 4 of the present invention.

FIGS. 25A and 25B illustrate waveforms of signals transmitted and received between a camera body and an interchangeable lens in a second communication setting in Embodiment 6 of the present invention.

DESCRIPTION OF THE EMBODIMENTS

Exemplary embodiments of the present invention will be described below with reference to the accompanied drawings.

Embodiment 1

Figure 1:
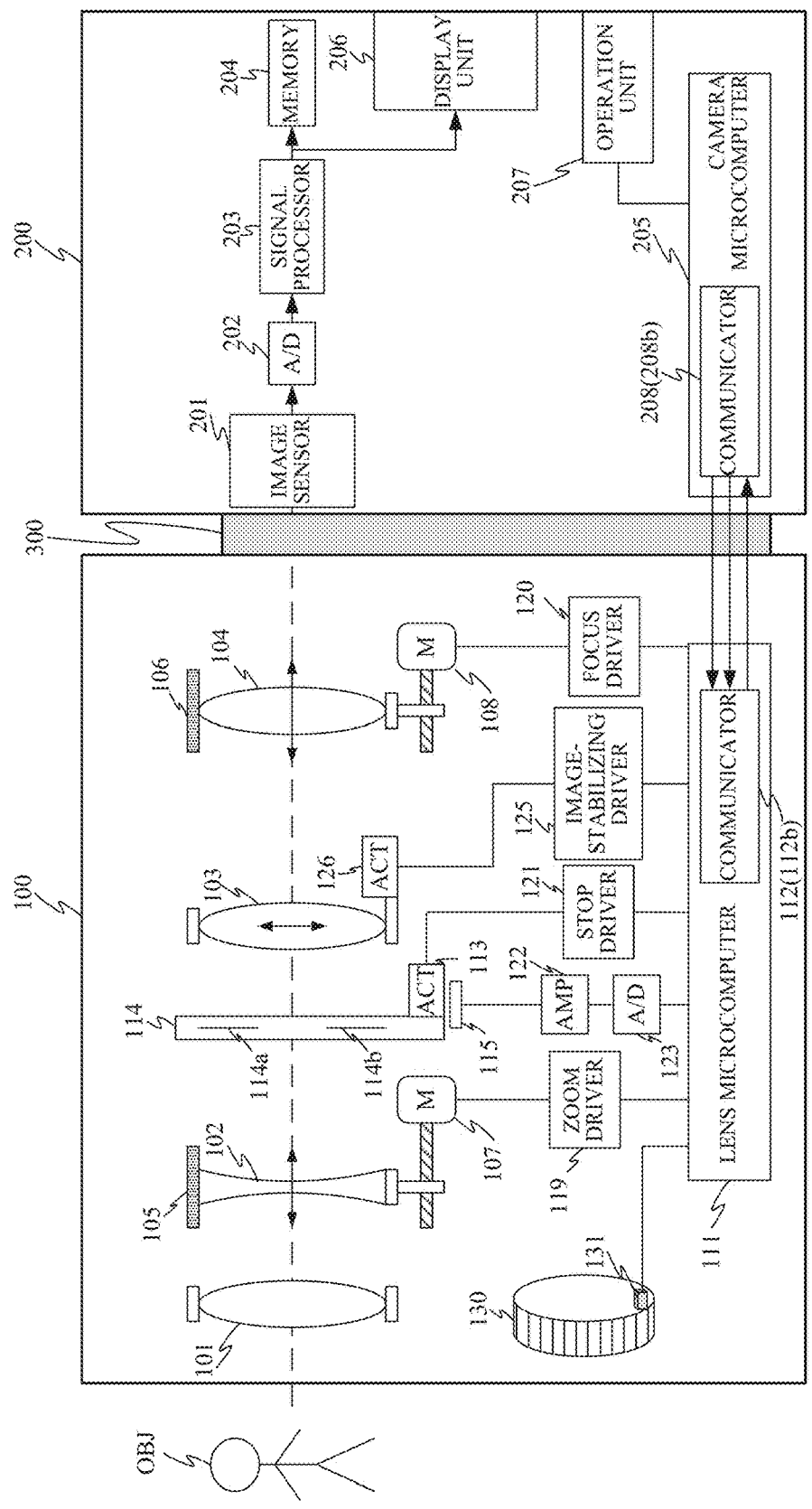
FIG. 1 is a block diagram illustrating a lens-interchangeable camera system that is Embodiment 1 of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later. The communicators are compatible with various communication methods and switch their communication formats to the same one in synchronization with each other depending on types of data to be communicated and purposes of their communication, which enables selecting an optimum communication format for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, a stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100. The lens microcomputer 111 receives, via the lens communicator 112 as an accessory communicator, control commands transmitted from the camera body 200 and transmission requests for lens data (accessory data) output therefrom.

The lens microcomputer 111 performs various lens controls corresponding to the control commands and transmits lens data corresponding to the transmission requests via the lens communicator 112. The lens microcomputer 111 performs operations relating to the communication with the camera body 200 (that is, with a camera microcomputer 205 described later) according to a lens communication control program as a computer program.

This embodiment employs asynchronous serial communication as a communication method between the lens microcomputer 111 and the camera microcomputer 205. The lens microcomputer 111 and the camera microcomputer 205 can share error information indicating that an abnormality of the communication therebetween, that is, a communication error occurs.

In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123.

The lens microcomputer 111 outputs, depending on the input detection result from the A/D converter 123, a stop drive signal to a stop driver 121 so as to cause the stop driver 121 to drive a stop actuator 113, thereby controlling a light amount control operation of the stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103.

The camera body 200 includes an image sensor 201 constituted by a CCD sensor, a CMOS sensor or the like, an A/D converter 202, a signal processor 203, a recorder 204, the camera microcomputer 205 and a display unit 206.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

A memory 210 is constituted by, for example, a DDR (Double Data Rate SDRAM). The memory 210 stores the digital image-capturing signal obtained using the image sensor 201 and the video signal produced by the image processor 203 and stores the lens data received from the lens microcomputer 111.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera data transceiver 208b. Moreover, the camera microcomputer 205 transmits, to the lens microcomputer 111 through the camera data transceiver 208b, the control command relating to the light amount control operation of the stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Next, with referring to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112.

The three channels are a transmission request channel as a notification channel, a first data communication channel and a second data communication channel. The transmission request channel is used for providing the notices such as the transmission requests (transmission instructions) for the lens data and switch requests (switch instructions) for communication settings described later, from the camera microcomputer 205 to the lens microcomputer 111. The provision of the notice through the transmission request channel is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

The request-to-send signal RTS is provided from the camera microcomputer 205 as a communication master to the lens microcomputer 111 as a communication slave.

The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205.

The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second). The camera and lens microcomputers 205 and 111 communicate with each other by a full-duplex communication method enabling mutual transmission and receipt of data.

The communication method between the camera body 200 and the interchangeable lens 100 may be performed by three-channel clock-synchronous serial communication instead of the three-channel asynchronous serial communication. Furthermore, in a case of performing large volume data transmission from the lens microcomputer 111 to the camera microcomputer 205, the clock-synchronous serial communication may be switched to the asynchronous serial communication. In this case, the notification channel may be used as a clock line for providing a clock signal from the camera microcomputer 205 to the lens microcomputer 111. This enables selectively using the two communication methods, that is, the asynchronous serial communication and the clock-synchronous serial communication without adding a new channel. In the clock-synchronous serial communication, the error information may be shared by communication commands.

The camera microcomputer 205 includes a camera error detector 2051, a camera communication controller 2052 and a signal inverter 213. The camera error detector 2051 has a function of detecting presence and absence of a communication error (lens communication error) in the lens data signal DLC received from the lens microcomputer 111. The communication error detected by the camera error detector 2051 is at least one of a parity error and a framing error. The camera error detector 2051 may be hardware separate from the camera microcomputer 205, and also in this case the camera error detector 2051 is part of the camera controller.

The signal inverter 213 inverts, when the camera error detector 2051 detects the communication error, part (specific bits) of the camera data signal DCL output from a transmission data parallel-serial converter 305 described later. The camera communication controller 2052 controls the camera data transceiver 208b, the camera error detector 2051 and the signal inverter 213.

A clock generator 212 provided in the camera body 200 is constituted by a crystal oscillator or the like and outputs a clock signal with a predetermined frequency (or period). The clock signal generated by the clock generator 212 has a higher frequency than that of a baud rate generated by a baud rate generator 211 provided in the camera body 200. The baud rate generator 211 includes a frequency divider whose frequency division ratio is variable and divides the clock signal output from the clock generator 212 by a frequency division ratio corresponding to a baud-rate-generator setting value from the camera microcomputer 205 to generate the baud rate. Also in the interchangeable lens 100, a clock generator 144 and a baud rate generator 140 having the same functions as those of the clock generator 212 and the baud rate generator 211 are provided.

On the other hand, the lens microcomputer 111 includes a lens error detector 1091, a lens communication controller 1092 and a signal inverter 142. The lens error detector 1091 has a function of detecting presence and absence of a communication error (camera communication error) in the camera data signal DCL received from the camera microcomputer 205. The communication error detected by the lens error detector 1091 is also at least one of the parity error and the framing error. The lens error detector 1091 may be hardware separate from the lens microcomputer 111, and also in this case the lens error detector 1091 is part of the lens controller (accessory controller).

The signal inverter 142 inverts, when the lens error detector 1091 detects the communication error, part (specific bits) of the lens data signal DLC output from a transmission data parallel-serial converter 315 described later. The lens communication controller 1092 controls the lens data transceiver 112b, the lens error detector 1091 and the signal inverter 142.

Figure 3:
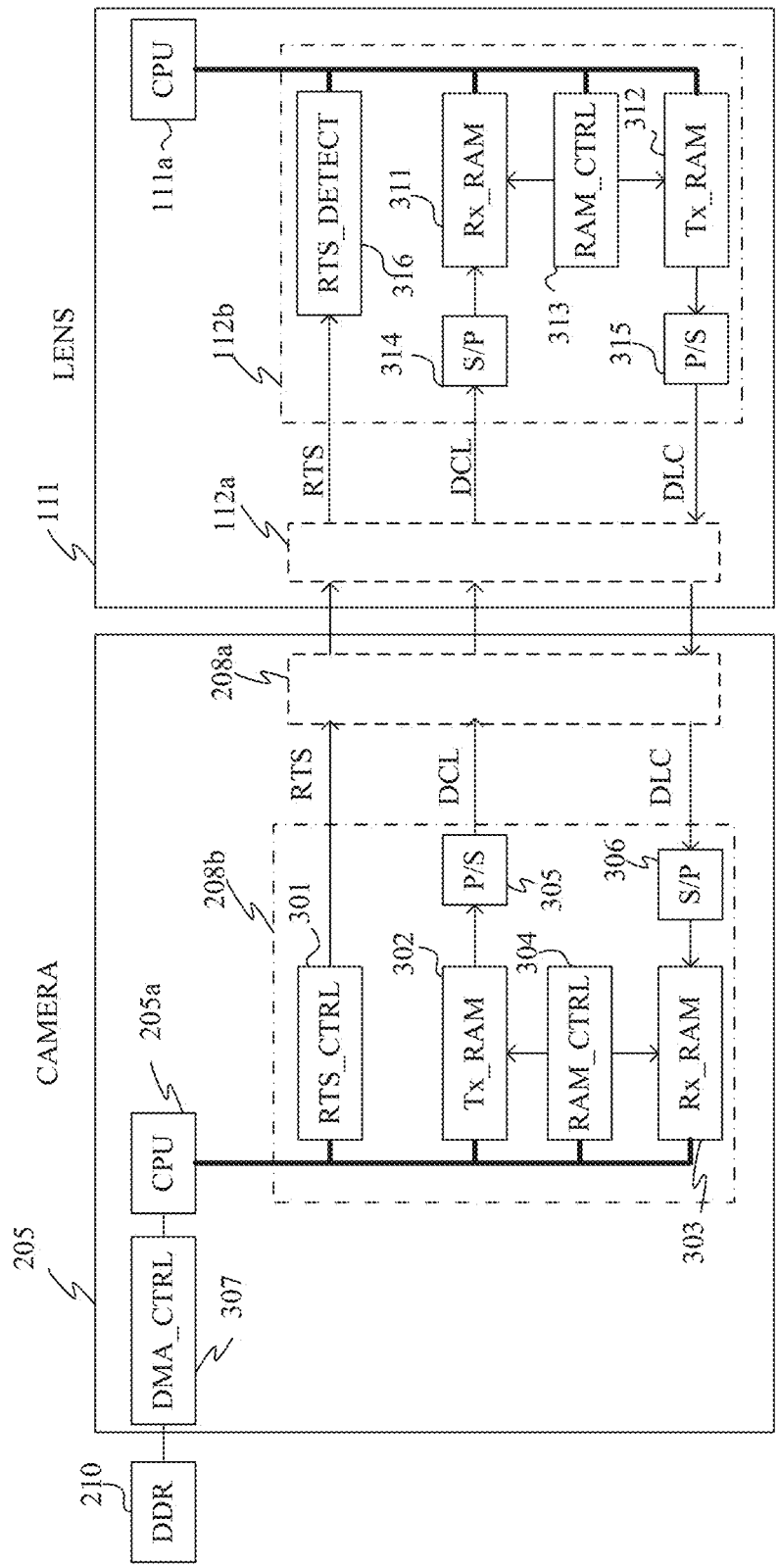
FIG. 3 is a diagram illustrating a configuration of camera and lens transceiver in a first communication setting in Embodiment 1.

Next, with referring to FIG. 3 and FIGS. 4A to 4C, description will be made of a first communication setting that is one of communication settings between the camera and lens microcomputers 205 and 111. FIG. 3 illustrates a configuration of the camera data transceiver 208b in the camera microcomputer 205 and the lens data transceiver 112b in the lens microcomputer 111. The camera microcomputer 205 includes a CPU 205a as a core of the camera microcomputer 205, an RTS controller 301 and a transmission data buffer 302 as a camera data buffer constituted by a RAM or the like. The camera microcomputer 205 further includes a receipt data buffer 303 constituted by a RAM or the like and a buffer controller 304 that controls data storing and data read-out to and from the buffers 302 and 303.

On the other hand, the lens microcomputer 111 includes a CPU 111a as a core of the lens microcomputer 111, an RTS detector 316 and a receipt data buffer 311 constituted by a RAM or the like. The camera microcomputer 111 further includes a transmission data buffer 312 as an accessory data buffer constituted by a RAM or the like and a buffer controller 313 that controls data storing and data read-out to and from the buffers 311 and 312.

The camera data signal DCL to be transmitted from the camera microcomputer 205 to the lens microcomputer 111 is stored to the transmission data buffer 302. For example, when the camera data signal DCL of 128 bytes is transmitted, this camera data signal DCL of 128 bytes is first stored to the transmission data buffer 302 and then is transmitted to the lens microcomputer 111. The buffer controller 304 reads out the camera data signal DCL frame by frame from the transmission data buffer 302. The read camera data signal DCL of each frame is converted from a parallel data signal into a serial data signal by the parallel-serial converter 305 and is transmitted from the camera microcomputer 205 to the lens microcomputer 111 through the second data communication channel.

The camera data signal DCL transmitted from the camera microcomputer 205 is converted from the serial data signal into a parallel data signal by the serial-parallel converter 314 in the lens microcomputer 111.

The buffer controller 313 stores the camera data signal DCL converted into the parallel data signal to the receipt data buffer 311. The lens data signal DLC to be transmitted from the lens microcomputer 111 to the camera microcomputer 205 is stored to the transmission data buffer 312. For example, when the lens data signal DLC of 128 bytes is transmitted, this lens data signal DLC of 128 bytes is first stored to the transmission data buffer 312 and then is transmitted to the camera microcomputer 205. The buffer controller 313 reads out the lens data signal DLC frame by frame from the transmission data buffer 312. The read lens data signal DLC of each frame is converted from a parallel data signal into a serial data signal by the parallel-serial converter 315 and is transmitted from the lens microcomputer 111 to the camera microcomputer 205 through the first data communication channel. The lens data signal DLC transmitted from the lens microcomputer 111 is converted from the serial data signal into a parallel data signal by the serial-parallel converter 306 in the camera microcomputer 205. The buffer controller 304 stores the lens data signal DLC converted into the parallel data signal to the receipt data buffer 303. The lens data signal DLC stored in the receipt data buffer 303 is read out therefrom by a DMA controller 307, and the read lens data signal DLC is transferred and stored to the memory 210.

As described above, this embodiment provides the transmission data buffers 302 and 312 to both the camera and lens microcomputers 205 and 111. Therefore, in order to return to a normal communication state when the communication error occurs, it is necessary to clear (that is, erase the data signals stored in) these transmission data buffers 302 and 312. A method of sharing the error information will be described later.

Figure 4A:
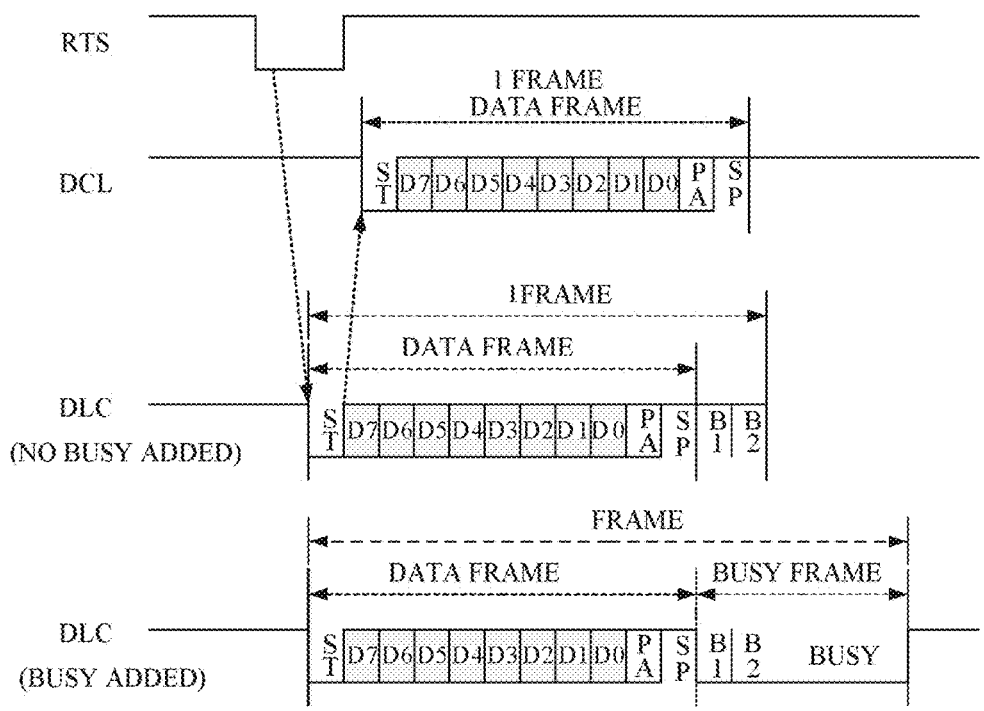
FIGS. 4A to 4C illustrate waveforms of signals transmitted and received between the camera body and the interchangeable lens in the first communication setting in Embodiment 1.
Figure 4B:
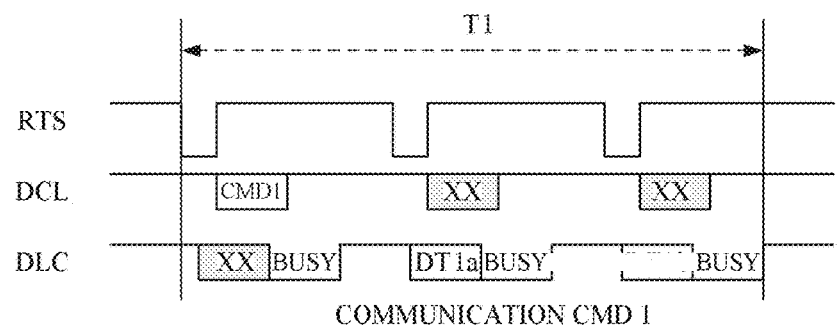
Figure 4C:
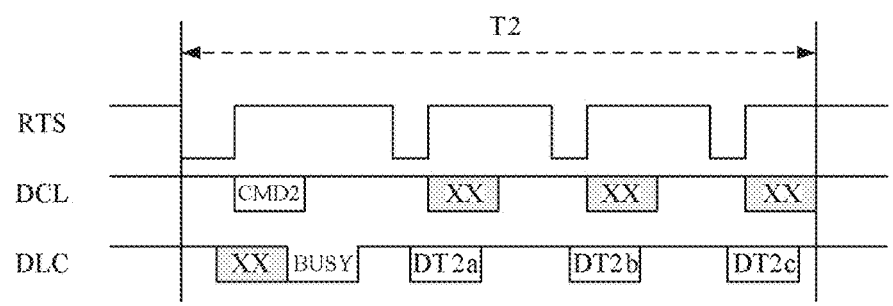

This first communication setting further includes, as described later, a communication setting (hereinafter referred to as "a BUSY addition mode") in which a busy frame is added and a communication setting (hereinafter referred to as "a non-BUSY addition mode") in which the busy frame is not added. FIGS. 4A to 4C illustrates waveforms of signals transmitted and received between the camera and lens microcomputers 205 and 111 in the first communication setting. An arrangement of procedures of the signal transmission and receipt is called a communication protocol.

FIG. 4A illustrates signal waveforms of one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. The data frame includes a start field, a data field and an end field. The signal level of the lens data signal DLC is held at High in a non-transmission state where data transmission is not performed. The lens microcomputer 111 sets the signal level to Low in one bit time period in order to provide a notice of a start of one frame transmission of the lens data signal DLC to the camera microcomputer 205. The start field is a time period for providing this start of one frame transmission to the camera microcomputer 205, and one bit time period as the start field is called "a start bit ST" in this embodiment.

That is, one data frame is started from this start bit ST. The start bit ST is provided as a head bit of each one frame of the lens data signal DLC. However, the start bit is not limited to the head bit and may be provided at an arbitrary bit.

Next, the lens microcomputer 111 transmits one-byte lens data in 8 bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0. This 8 bit time period is the data field. Then, the lens microcomputer 111 adds one bit parity information (parity bit) PA at tenth bit and sets the signal level of the lens data signal DLC to High in a time period of a stop bit SP indicating an end of the one frame. Thus, the data frame starting from the start bit SP ends.

The parity bit PA is a bit indicating parity for the data D0 to D7. The camera and lens microcomputers 205 and 111 select beforehand which one of an odd parity and an even parity is to be used. In a case where the communication error is unnecessary to be considered, the parity bit PA may be omitted. The stop bit SP is a bit indicating an end of one frame transmission. Although this embodiment provides one bit as the stop bit SP, the stop bit SP may be constituted by two or more bits.

Thereafter, as illustrated by "DLC (with BUSY)" in FIG. 4A, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the BUSY notice. A sum time period of the parity bit PA, the stop bit SP and the busy frame is corresponds to the end field.

On the other hand, for a case where the BUSY notice is unnecessary to be provided from the lens microcomputer 111 to the camera microcomputer 205, as illustrated by "DLC (without BUSY)" in FIG. 4A, a data format is provided that forms one frame without adding the BUSY notice (BUSY frame). That is, the lens microcomputer 111 can select as the data format of the lens data signal DLC, depending on a process situation, one to which the BUSY notice is added and one to which the BUSY notice is not added.

Description will be made of a method of determining the presence and absence of the BUSY notice; the method is performed by the camera microcomputer 205. In FIG. 4A, the signal waveform of "DLC (with BUSY)" and the signal waveform of "DLC (without BUSY)" both include bit positions B1 and B2. The camera microcomputer 205 selects one of these bit positions B1 and B2 as a BUSY determination position P for determining the presence and absence of the BUSY notice. As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111. Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

FIG. 4B illustrates signal waveforms in a case of performing continuous communication in the BUSY addition mode illustrated by "DLC (with BUSY)" in FIG. 4A. The BUSY notice (BUSY frame) from the lens microcomputer 111 is provided using the lens data signal DLC through the first data communication channel, and a subsequent communication is started after the BUSY notice is terminated. In FIG. 4B, CMD1 represents a transmission request command that is transmitted as the camera data signal DCL from the camera microcomputer 205 to the lens microcomputer 111. The lens microcomputer 111 transmits, in response to receiving this transmission request command CMD1, lens data signals DT1 (DT1a and DT1b) of two bytes corresponding to the transmission request command CMD1 to the camera microcomputer 205.

FIG. 4C illustrates signal waveforms in a case of performing communication with switching the communication setting (communication mode) between the BUSY addition mode and the non-BUSY addition mode. In an example of FIG. 4C, the communication is first performed in the BUSY addition mode and then performed in the non-BUSY addition mode.

In FIG. 4C, CMD2 represents a control command and a transmission request command that are transmitted as the camera data signal DCL from the camera microcomputer 205 to the lens microcomputer 111. Although FIG. 4C illustrates a case where the camera microcomputer 205 transmits the control and transmission request commands in one frame, the control and transmission request commands may be transmitted in mutually separate frames. The lens microcomputer 111 switches, in response to receiving the control command in the command CMD2, the communication mode from the BUSY addition mode to the non-BUSY addition mode. Then, the lens microcomputer 111 transmits, in response to receiving the transmission request command in the command CMD2, lens data signals DT2 (DT2a to DT2c) of three bytes corresponding to the transmission request command to the camera microcomputer 205.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, the communication procedures between the camera and lens microcomputers 205 and 111 will be described. First, the communication procedures in the BUSY addition mode will be described.

The camera microcomputer 205 sets, when an event for starting the communication with the lens microcomputer 111 occurs, a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens dada signal DLC to be transmitted to the camera microcomputer 205. Then, after a preparation for transmitting the lens data signal DLC is completed, the lens microcomputer 111 starts transmitting one frame of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS. The camera microcomputer 205 thereby terminates the transmission request and starts the transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is necessary to be provided to the camera microcomputer 205. The camera microcomputer 205 monitors the presence or absence of the BUSY notice and prohibits the assertion of the request-to-send signal RTS for a subsequent transmission request while the BUSY notice is provided. The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed.

As just described, in this embodiment, in response to the assertion of the request-to-send signal RTS upon the communication starting event occurring in the camera microcomputer 205, the lens microcomputer 111 starts transmitting the data frame of the lens data signal DLC to the camera microcomputer 205. On the other hand, the camera microcomputer 205 having detected the start bit ST of the lens data signal DLC starts transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Next, the communication procedures in the non-BUSY addition mode will be described. The non-BUSY addition mode enables a higher-speed data communication as compared with the BUSY addition mode because the BUSY frame is not added. In the non-BUSY addition mode, the data format of one frame of the lens data signal DLC is formed only by the data frame, that is, does not include the BUSY frame. Therefore, in the non-BUSY addition mode, the lens microcomputer 111 cannot provide the BUSY notice to the camera microcomputer 205. This data format is used for burst communication as continuous communication in which each interval between frames is shortened so as to transmit relatively large volume data between the camera microcomputer 205 and the lens microcomputer 111. That is, the non-BUSY addition mode enables large volume data communication at a higher speed.

Next, with referring to FIGS. 5A and 5B, description will be made of a process performed when the communication error occurs in the first communication setting. FIG. 5A illustrates waveforms of signals transmitted and received between the camera and lens microcomputers 205 and 111 when the camera microcomputer 205 (camera error detector 2051) detects the communication error. The camera and lens microcomputers 205 and 111 perform processes 501 to 513.

In response to the assertion of the request-to-send signal RTS by the camera microcomputer 205 (501), the lens microcomputer 111 transmits the lens data signal DLC of one frame to the camera microcomputer 205 (502). In response thereto, the camera microcomputer 205 transmits the camera data signal DCL of one frame to the lens microcomputer 111 (503). The camera error detector 2051 in the camera microcomputer 205 detects an inversion of the parity bit PA or the stop bit SP as the communication error (504), and the camera microcomputer 205 recognizes it as a parity error or a framing error.

The camera microcomputer 205 performs the following processes in a subsequent frame in order to share the detection of the communication error by the camera error detector 2051 (that is, error information) with the lens microcomputer 111. The camera microcomputer 205 asserts the request-to-send signal RTS again (505) and receives the lens data signal DLC from the lens microcomputer 111 (506). Thereafter, the camera microcomputer 205 produces camera error information (hereinafter simply referred to as "error information") in order to share the detection of the communication error with the lens microcomputer 111 (507). As a method of producing the error information in this embodiment, the camera microcomputer 205 (signal inverter 213) inverts the parity bit PA (0 or 1) that is the specific bit of the camera data signal DCL. However, instead of the parity bit PA, the stop bit SP as another specific bit may be inverted.

The camera data signal DCL thus produced as the error information (hereinafter referred to as "a camera error notice frame") is transmitted to the lens microcomputer 111. However, the lens microcomputer 111 receiving the camera error notice frame for the first time cannot determine whether or not the camera microcomputer 205 recognizes the detection of the communication error.

Therefore, the camera and lens microcomputers 205 and 111 perform the following communication process to share the detection of the communication error therebetween. The lens microcomputer 111 clears the transmission data buffer 312 in the lens data transceiver 112b to discard the lens data signal DLC to be subsequently transmitted to the camera microcomputer 205 (508). The camera microcomputer 205 asserts the request-to-send signal RTS in a subsequent frame to the camera error notice frame (509). In response to the assertion, the lens microcomputer 111 transmits the lens data signal DLC to the camera microcomputer 205 (510). In these processes, the lens microcomputer 111 (signal inverter 142) inverts, in response to previously receiving the camera error notice frame, the parity bit PA as the specific bit of the lens data signal DLC to produce accessory error information (hereinafter simply referred to as "error information") Then, the camera microcomputer 205 transmits the lens data signal DLC produced as the error information to the camera microcomputer 205 (511). The camera microcomputer 205 thus receives the error information from the lens microcomputer 111 (512).

Through the above-described transmission and receipt of the error information, both the camera and lens microcomputers 205 and 111 share the detection of the communication error. Thereafter, the camera microcomputer 205 clears the transmission data buffer 302 in the camera data transceiver 208b to discard the camera data signal DCL to be subsequently transmitted to the lens microcomputer 111 (513).

FIG. 5B illustrates waveforms of signals transmitted and received between the camera and lens microcomputers 205 and 111 when the lens microcomputer 111 (lens error detector 1091) detects the communication error. The camera and lens microcomputers 205 and 111 perform processes 520 to 534.

In response to the assertion of the request-to-send signal RTS by the camera microcomputer 205 (520), the lens microcomputer 111 transmits the lens data signal DLC of one frame to the camera microcomputer 205 (521). In response thereto, the camera microcomputer 205 transmits the camera data signal DCL of one frame to the lens microcomputer 111 (522). The lens error detector 1091 in the lens microcomputer 111 detects an inversion of the parity bit PA or the stop bit SP as the communication error (523), and the lens microcomputer 111 recognizes it as a parity error or a framing error.

The lens microcomputer 111 cannot determine whether this detected communication error is one produced by the camera microcomputer 205 in order to share the error information with the lens microcomputer 111 or one occurring due to an actual abnormality in the camera data signal DCL. However, the lens microcomputer 111 in either case proceeds to a process for sharing the detection of the communication error with the camera microcomputer 205. Thus, the lens microcomputer 111 clears the transmission data buffer 312 in the lens data transceiver 112b to discard the lens data signal DLC to be subsequently transmitted to the camera microcomputer 205 (525).

Next, the lens microcomputer 111 performs the following processes in a subsequent frame in order to share the detection of the communication error with the camera microcomputer 205. When the camera microcomputer 205 asserts the request-to-send signal RTS (526), the lens microcomputer 111 transmits the lens data signal DLC to the camera microcomputer 205.

Since the lens data buffer 312 in the lens data transceiver 112b has been already cleared, the lens microcomputer transmits, for example, "00H" as the lens data signal DLC to the camera microcomputer 205 (527). Then, the lens microcomputer 111 produces error information (528). Specifically, the lens microcomputer 111 inverts the parity bit PA (0 or 1) of the lens data signal DLC. However, the lens microcomputer 111 may invert the stop bit SP as the other specific bit.

The lens data signal DLC as the error information (hereinafter referred to as "a lens error notice frame") thus produced is transmitted to the camera microcomputer 205. In response to receiving the lens error notice frame, the camera microcomputer 205 transmits the camera data signal DCL of one frame (529) and then performs the following communication process in order to share the detection of the communication error with the lens microcomputer 111 in a subsequent frame.

First, the camera microcomputer 205 asserts the request-to-send signal RTS (530). In response thereto, the lens microcomputer 111 transmits the lens data signal DLC to the camera microcomputer 205 (531), and furthermore in response thereto, the camera microcomputer 205 transmits the camera data signal DCL to the lens microcomputer 111 (532). In producing the camera data signal DCL, the camera microcomputer 205 inverts the parity bit PA of the camera data signal DLC to produce error information and transmits the camera data signal DLC as the error information to the lens microcomputer 111 (533).

The above-described transmission and receipt of the error information enables the camera and lens microcomputers 205 and 111 to share the detection of the communication error. Thereafter, the camera microcomputer 205 clears the transmission data buffer 302 in the camera data transceiver 208b to discard the camera data signal DCL to be subsequently transmitted to the lens microcomputer 111 (534).

Next, description will be made of flow of the above-described communication process (communication control) with referring to a flowchart illustrated in FIGS. 6A and 6B. Steps (each abbreviated by S in FIGS. 6A and 6B) 601 to 611 are performed by the camera microcomputer 205, and steps 620 to 635 are performed by the lens microcomputer 111. The camera and lens microcomputers 205 and 111 each perform this process according to a communication control program as a computer program.

In response to occurrence of a communication event for communicating with the lens microcomputer 111 at step 601, the camera microcomputer 205 proceeds to step 602 to store the camera data signal DCL (whole frames) such as a transmission request command corresponding to the communication event to the transmission data buffer 302. The camera data signal DCL has a size depending on the transmission request command.

Next, at step 603, the camera microcomputer 205 asserts the request-to-send signal RTS. Then, at step 604, the camera microcomputer 205 receives the lens data signal DLC of one frame transmitted from the lens microcomputer 111 in response to the assertion of the request-to-send signal RTS.

Next, at step 605, the camera microcomputer 205 determines whether or not the lens data signal DLC of one frame (previous frame) received at step 604 includes an abnormality, that is, there is a communication error. If the lens data signal DLC includes the abnormality (the communication error is detected), the camera microcomputer 205 proceeds to step 606.

At step 606, the camera microcomputer 205 inverts the parity bit PA of one frame to be subsequently transmitted to the lens microcomputer 111 among the frames of the camera data signal DCL stored in the transmission data buffer 302 at step 602. Then, at step 607, the camera microcomputer 205 transmits the camera data signal DCL of the one frame whose parity bit PA is inverted to the lens microcomputer 111.

Next, at step 608, the camera microcomputer 205 determines whether or not the lens data signal DLC of one frame (current frame) received at step 604 in the current routine includes an abnormality. If the lens data signal DLC includes the abnormality, the camera microcomputer 205 proceeds to step 609.

At step 609, the camera microcomputer 205 determines whether or not the determination is made that the lens data signal DLC from the lens microcomputer 111 includes the abnormality after transmitting the error information to the lens microcomputer 111. This determination is made for checking whether or not the communication error is detected by both the camera and lens microcomputers 205 and 111. If yes, the camera microcomputer 205 at step 610 clears the transmission data buffer 302.

Thereafter, upon confirming that the BUSY notice of the lens data signal DLC has been terminated by the lens microcomputer 111, the camera microcomputer 205 performs a retransmission of the camera data signal DCL (that is, a communication retry) corresponding to the communication event occurring at step 601.

If the determination is made that the lens data signal DLC includes no abnormality at step 608 or if the error information has not been yet transmitted to the lens microcomputer 111 (that is, the detection of the communication error is not shared between the camera and lens microcomputers 205 and 111) at step 609, the camera microcomputer 205 proceed to step 611.

At step 611, the camera microcomputer 205 determines whether or not transmission of the whole frames of the camera data signal DCL stored in the transmission data buffer 302 at step 602 to the lens microcomputer 111 has been completed. If the transmission has been completed, the camera microcomputer 205 enters into a communication standby (IDLE) state. If the transmission has not been yet completed, the camera microcomputer 205 at step 612 performs an increment of an index specifying a frame to be subsequently transmitted among the frames of the camera data signal DCL remaining in the transmission data buffer 302 without being transmitted and then returns to step 603.

Next, description will be made of the processes performed by the lens microcomputer 111. The lens microcomputer 111 at step 620 stores, in response to the transmission request command (camera data signal DCL) from the camera microcomputer 205, the lens data signal DLC of one frame as dummy data to a head index region of the transmission data buffer 312. The lens microcomputer 111 has to transmit this dummy data to the camera microcomputer 205 before analyzing the transmission request command from the camera microcomputer 205.

Next, at step 621, the lens microcomputer 111 determines whether or not the request-to-send signal RTS is asserted by the camera microcomputer 205. If the request-to-send signal RTS is asserted, the lens microcomputer 111 at step 622 transmits, to the camera microcomputer 205, the one frame lens data signal DLC as the dummy data stored in the transmission data buffer 312 at step 620.

Thereafter, at step 623, the lens microcomputer 111 receives the camera data signal DCL of one frame transmitted from the camera microcomputer 205. Then, at step 624, the lens microcomputer 111 determines whether or not the camera data signal DCL received at step 623 includes an abnormality. If the camera data signal DCL includes the abnormality, the lens microcomputer 111 at step 625 clears the transmission data buffer 312 and enters into a communication standby (IDLE) state. The reason therefor is as described above. The lens microcomputer 111 does not transmit the lens data signal DLC related to the camera data signal DCL received at step 623.

On the other hand, if a determination is made at step 624 that the camera data signal DCL received at step 623 does not include the abnormality, the lens microcomputer 111 proceeds to step 626.

At step 626, the lens microcomputer 111 stores the lens data signal DLC (whole frames) related to the camera data signal DCL received at step 623 to the transmission data buffer 312.

Next, at step 627, the lens microcomputer 111 waits for the assertion of the request-to-send signal RTS by the camera microcomputer 205. If the request-to-send signal RTS is asserted, the lens microcomputer 111 at step 628 determines whether or not the camera data signal DCL of a previous frame received from the camera microcomputer 205 at step 631 described later in a previous routine includes an abnormality. If the camera data signal DCL of the previous frame does not include the abnormality, the lens microcomputer 111 directly proceeds to step 631. If the camera data signal DCL of the previous frame includes the abnormality, the lens microcomputer 111 proceeds to step 629 to invert the parity bit PA of a first frame of the lens data signal DLC stored in the transmission data buffer 312 and then proceeds to step 630.

The lens microcomputer 111 directly proceeding from step 628 to step 630 transmits, to the camera microcomputer 205, the lens data signal DLC of one frame in which the parity bit PA is not inverted. On the other hand, the lens microcomputer 111 proceeding from step 628 to step 630 via step 629 transmits, to the camera microcomputer 205, the lens data signal DLC of the one (first) frame in which the parity bit PA is inverted. The camera microcomputer 205 receiving any one of these lens data signals DLC transmits the camera data signal DCL of one frame, and the lens microcomputer 111 at step 631 receives this camera data signal DCL.

Next, at step 632, the lens microcomputer 111 determines whether or not the camera data signal DCL of a current frame received at step 631 in this (current) routine includes an abnormality. If the camera data signal DCL includes the abnormality, the lens microcomputer 111 proceeds to step 633 to clear the transmission data buffer 312 and enters into the communication standby (IDLE) state. On the other hand, if the camera data signal DCL received at step 631 does not include the abnormality, the lens microcomputer 111 proceeds to step 634. At step 634, the lens microcomputer 111 determines whether or not transmission of the whole frames of the lens data signal DLC stored in the transmission data buffer 312 at step 626 to the camera microcomputer 205 has been completed. If the transmission has been completed, the lens microcomputer 111 enters into the communication standby (IDLE) state. If the transmission has not been yet completed, the lens microcomputer 111 at step 635 performs an increment of an index specifying a frame to be subsequently transmitted among the frames of the lens data signal DLC remaining in the transmission data buffer 312 without being transmitted and then returns to step 627.

This embodiment enables, when the camera microcomputer 205 or the lens microcomputer 111 detects the communication error, the camera microcomputer 205 and the lens microcomputer 111 to share the detection of the communication error (error information). Thereby, the camera and lens microcomputers 205 and 111 can clear their transmission data buffers 301 and 312 immediately after the communication error occurs and restart the communication therebetween in a short time.

Embodiment 2

Next, description will be made of a camera system that is a second embodiment (Embodiment 2) of the present invention. Embodiment 1 described, as one method of sharing the error information between the camera and lens microcomputers 205 and 111, the method in which one of the camera and lens microcomputers 205 that detects the communication error transmits the error information to the other microcomputer. In addition, Embodiment 1 described the case of producing the error information by inverting the parity bit or the stop bit.

However, in this method, as described above, the lens microcomputer 111 cannot determine whether the error information is one produced by the camera microcomputer 205 in order to share the error information with the lens microcomputer 111 or one occurring due to an actual abnormality included in the camera data signal DCL. Therefore, the lens microcomputer 111 has to produce, in order to certainly share the error information with the camera microcomputer 205, the lens data signal DLC as the error information to transmit it to the camera microcomputer 205.

Embodiment 2 enables, by using the transmission request channel (RTS), the lens microcomputer 111 to determine whether the detected communication error is one produced by the camera microcomputer 205 in order to share the error information with the camera microcomputer 205 or one occurring due to an actual abnormality included in the camera data signal DCL.

A configuration of the camera system of Embodiment 2 is the same as that of Embodiment 1 described with referring to FIGS. 1 to 4C. With referring to FIGS. 7A and 7B, description will be made of a process performed in Embodiment 2 when the communication error occurs in the first communication setting.

FIG. 7A illustrates waveforms of signals transmitted and received between the camera and lens microcomputers 205 and 111 when the camera microcomputer 205 (camera error detector 2051) detects the communication error. The camera and lens microcomputers 205 and 111 perform processes 701 to 709.

In response to the assertion of the request-to-send signal RTS by the camera microcomputer 205 (701), the lens microcomputer 111 transmits the lens data signal DLC of one frame to the camera microcomputer 205 (702). In response thereto, the camera microcomputer 205 transmits the camera data signal DCL of one frame to the lens microcomputer 111 (703). The camera error detector 2051 in the camera microcomputer 205 detects an inversion of the parity bit PA or the stop bit SP as the communication error (704), and the camera microcomputer 205 recognizes it as a parity error or a framing error.

The camera microcomputer 205 performs the following processes in a subsequent frame in order to share the detection of the communication error by the camera error detector 2051 (that is, error information) with the lens microcomputer 111.

The camera microcomputer 205 asserts the request-to-send signal RTS again (705) and receives the lens data signal DLC from the lens microcomputer 111 (706).

Thereafter, the camera microcomputer 205 produces error information in order to share the detection of the communication error with the lens microcomputer 111 (707). Also in this embodiment, the camera microcomputer 205 inverts the parity bit PA (0 or 1) of the camera data signal DCL to produce the error information. However, other methods may be used for producing the error information.

In this embodiment, the camera microcomputer 205 maintains the assertion of the request-to-send signal RTS when transmitting the camera data signal DCL as the error information to the lens microcomputer 111.

The transmission of the error information from the camera microcomputer 205 to the lens microcomputer 111 with the assertion of the request-to-send signal RTS being maintained enables the lens microcomputer 111 to recognize that the error information is for sharing purpose. That is, the lens microcomputer 111 recognizes, through the assertion of the request-to-send signal RTS when receiving the error information, that the error information is an error detection notice from the camera microcomputer 205 to determine that the error information is for sharing purpose. On the other hand, the lens microcomputer 111 recognizes, through the negation of the request-to-send signal RTS when receiving the error information, that the error information is due to an actual abnormality occurring in the camera data signal DCL.

After sharing the error information with the lens microcomputer 111, the camera microcomputer 205 clears the transmission data buffer 302 in the camera data transceiver 208b to discard the camera data signal DCL to be subsequently transmitted to the lens microcomputer 111 (708). The lens microcomputer 111 also clears the transmission data buffer 312 in the lens data transceiver 112b to discard the lens data signal DLC to be subsequently transmitted to the camera microcomputer 205 (709).

The lens microcomputer 111 maintains the BUSY notice for the camera microcomputer 205 by the lens data signal DLC until completely clearing the transmission data buffer 312 and terminates the BUSY notice after completely clearing the transmission data buffer 312. On the other hand, the camera microcomputer 205 performs a subsequent communication after clearing the transmission data buffer 302.

The above-described process enables, when the camera microcomputer 205 detects the communication error, both the camera and lens microcomputers 205 and 111 to simultaneously clear their transmission data buffers 302 and 312, which enables restarting a normal communication between the camera and lens microcomputers 205 and 111.

FIG. 7B illustrates waveforms of signals transmitted and received between the camera and lens microcomputers 205 and 111 when the lens microcomputer 111 (lens error detector 1091) detects the communication error. The camera and lens microcomputers 205 and 111 perform processes 710 to 723. In response to the assertion of the request-tosend signal RTS by the camera microcomputer 205 (710), the lens microcomputer 111 transmits the lens data signal DLC to the camera microcomputer 205 (711). In response thereto, the camera microcomputer 205 transmits the camera data signal DCL to the lens microcomputer 111 (712). The lens error detector 1091 in the lens microcomputer 111 detects an inversion of the parity bit PA or the stop bit SP as the communication error (713), and the lens microcomputer 111 recognizes it as a parity error or a framing error.

The lens microcomputer 111 determines whether or not the request-to-send signal RTS is asserted when detecting the communication error.

If the request-to-send signal RTS is negated (714), the lens microcomputer 111 determines that the detected communication error (error information) is not transmitted from the camera microcomputer 205 for sharing purpose, but indicates the abnormality occurring in the camera data signal DCL. In this case, the lens microcomputer 111 produces error information by inverting the parity bit PA of the lens data signal DLC to be transmitted in a subsequent frame (hereinafter referred to as "a lens error notice frame") and then transmits the lens error notice frame to the camera microcomputer 205 (715 and 716). In response to receiving the lens error notice frame, the camera microcomputer 205 transmits one frame of the camera data signal DCL to the lens microcomputer 111 (717). Thereafter, the camera microcomputer 205 performs the following communication process (communication control) in order to share the detection of the communication error with the lens microcomputer 111 in a subsequent frame.

In response to the assertion of the request-to-send signal RTS (718) by the camera microcomputer 205, the lens microcomputer 111 transmits the lens data signal DLC of one frame to the camera microcomputer 205 (719). In response thereto, the camera microcomputer 205 produces error information by inverting the parity bit PA of the camera data signal DCL of one frame and transmits the error information to the lens microcomputer 111 (720 and 721). With the transmission of the error information, the camera microcomputer 205 maintains the assertion of the request-to-send signal RTS to provide an error detection notice to the lens microcomputer 111. The lens microcomputer 111 receiving the error detection notice recognizes that the received error information is for sharing purpose.

After sharing the error information with the lens microcomputer 111, the camera microcomputer 205 clears the transmission data buffer 302 in the camera data transceiver 208b to discard the camera data signal DCL to be subsequently transmitted to the lens microcomputer 111 (722). The lens microcomputer 111 also clears the transmission data buffer 312 in the lens data transceiver 112b to discard the lens data signal DLC to be subsequently transmitted to the camera microcomputer 205 (723). The lens microcomputer 111 maintains the BUSY notice for the camera microcomputer 205 by the lens data signal DLC until completely clearing the transmission data buffer 312 and terminates the BUSY notice after completely clearing the transmission data buffer 312. On the other hand, the camera microcomputer 205 performs a subsequent communication after clearing the transmission data buffer 302.

The above-described process enables, when the lens microcomputer 111 detects the communication error, both the camera and lens microcomputers 205 and 111 to simultaneously clear their transmission data buffers 302 and 312, which enables restarting a normal communication between the camera and lens microcomputers 205 and 111.

Figure 8A:
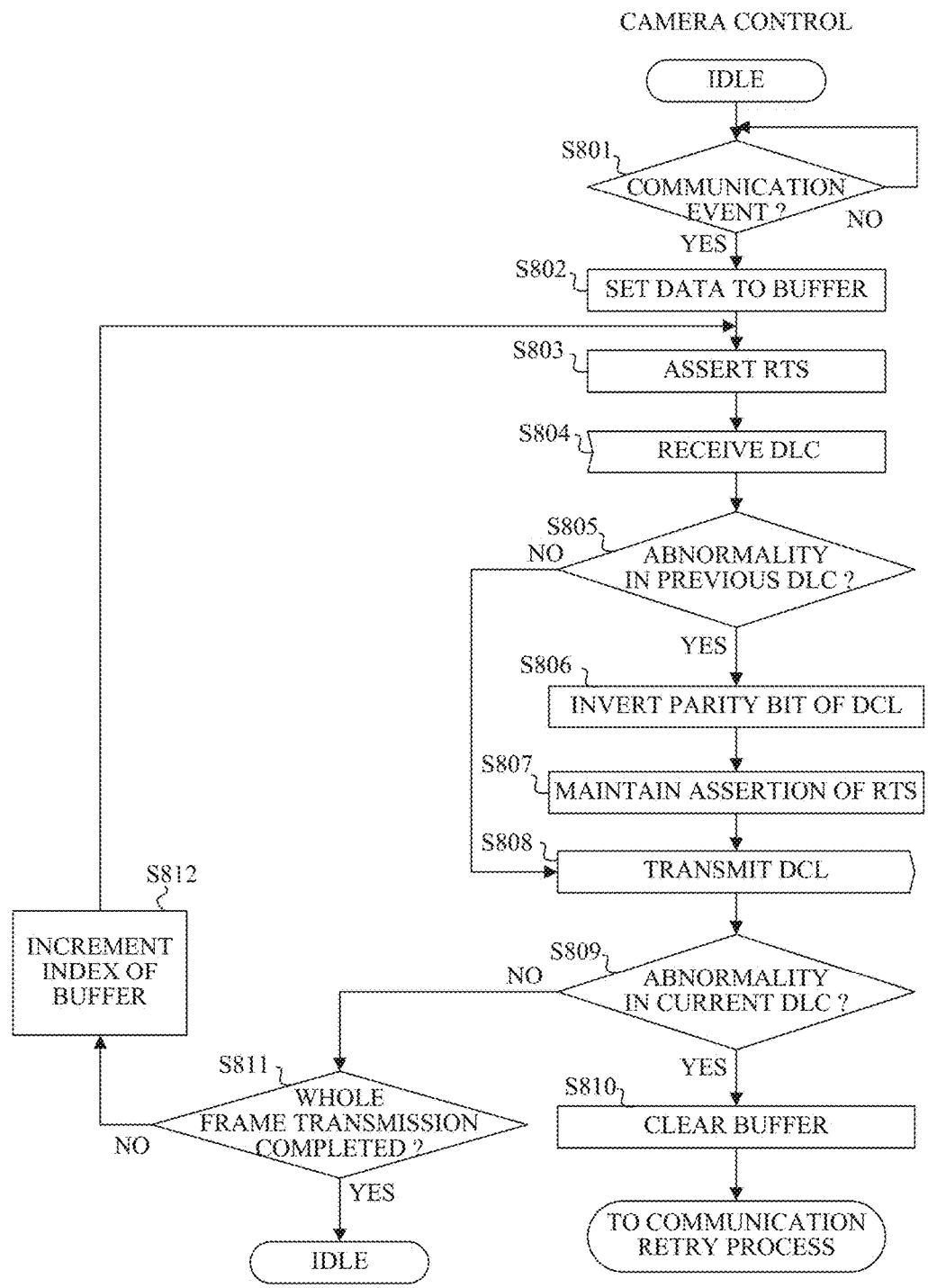
FIGS. 8A and 8B are flowcharts illustrating a communication process in Embodiment 2.
Figure 8B:
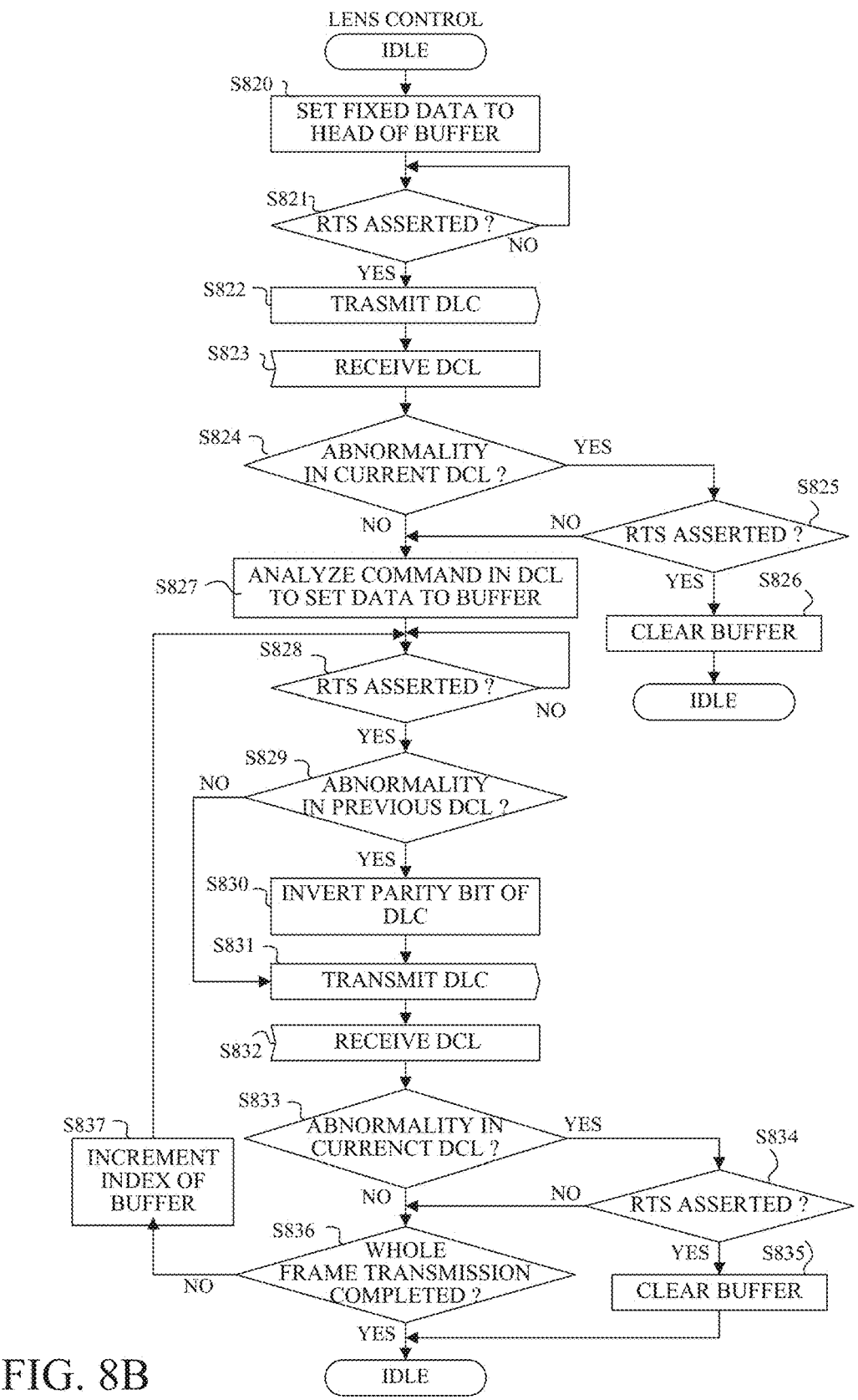

Next, description will be made of flow of the above-described communication process (communication control) with referring to a flowchart illustrated in FIGS. 8A and 8B. Steps (each abbreviated by S in FIGS. 8A and 8B) 801 to 812 are performed by the camera microcomputer 205, and steps 820 to 837 are performed by the lens microcomputer 111. The camera and lens microcomputers 205 and 111 each perform this process according to a communication control program as a computer program.

In response to occurrence of a communication event for communicating with the lens microcomputer 111 at step 801, the camera microcomputer 205 proceeds to step 802 to store the camera data signal DCL (whole frames) such as a transmission request command corresponding to the communication event to the transmission data buffer 302. The camera data signal DCL has a size depending on the transmission request command.

Next, at step 803, the camera microcomputer 205 asserts the request-to-send signal RTS.

Then, at step 804, the camera microcomputer 205 receives the lens data signal DLC of one frame transmitted from the lens microcomputer 111 in response to the assertion of the request-to-send signal RTS.

Next, at step 805, the camera microcomputer 205 determines whether or not the lens data signal DLC of one frame (previous frame) received at step 804 includes an abnormality, that is, there is a communication error. If the lens data signal DLC includes the abnormality (the communication error is detected), the camera microcomputer 205 proceeds to step 806.

At step 806, the camera microcomputer 205 inverts the parity bit PA of one frame to be subsequently transmitted to the lens microcomputer 111 among the frames of the camera data signal DCL stored in the transmission data buffer 302 at step 802. Then, the camera microcomputer 205 at step 807 asserts the request-to-send signal RTS to maintain the assertion and at step 808 transmits the camera data signal DCL of the one frame whose parity bit PA is inverted to the lens microcomputer 111.

Next, at step 809, the camera microcomputer 205 determines whether or not the lens data signal DLC of one frame (current frame) received at step 804 in the current routine includes an abnormality. If the lens data signal DLC includes the abnormality, the camera microcomputer 205 proceeds to step 810. At step 810, the camera microcomputer 205 clears the transmission data buffer 302. Thereafter, upon confirming that the BUSY notice of the lens data signal DLC has been terminated by the lens microcomputer 111, the camera microcomputer 205 performs a retransmission of the camera data signal DCL (that is, a communication retry) corresponding to the communication event occurring at step 801.

At step 809, if the determination is made at step 805 that the lens data signal DLC includes no abnormality, the camera microcomputer 205 proceeds to step 811. At step 811, the camera microcomputer 205 determines whether or not transmission of the whole frames of the camera data signal DCL stored in the transmission data buffer 302 at step 802 to the lens microcomputer 111 has been completed. If the transmission has been completed, the camera microcomputer 205 enters into a communication standby (IDLE) state. If the transmission has not been yet completed, the camera microcomputer 205 at step 812 performs an increment of an index specifying a frame to be subsequently transmitted among the frames of the camera data signal DCL remaining in the transmission data buffer 302 without being transmitted and then returns to step 803.

Next, description will be made of the processes performed by the lens microcomputer 111. The lens microcomputer 111 at step 820 stores, in response to the transmission request command (camera data signal DCL) from the camera microcomputer 205, the lens data signal DLC of one frame as dummy data to a head index region of the transmission data buffer 312. The lens microcomputer 111 has to transmit this dummy data to the camera microcomputer 205 before analyzing the transmission request command from the camera microcomputer 205.

Next, at step 821, the lens microcomputer 111 determines whether or not the request-to-send signal RTS is asserted by the camera microcomputer 205. If the request-to-send signal RTS is asserted, the lens microcomputer 111 at step 822 transmits, to the camera microcomputer 205, the one frame lens data signal DLC as the dummy data stored in the transmission data buffer 312 at step 820.

Thereafter, at step 823, the lens microcomputer 111 receives the camera data signal DCL of one frame transmitted from the camera microcomputer 205.

Then, at step 824, the lens microcomputer 111 determines whether or not the camera data signal DCL received at step 823 includes an abnormality. If the camera data signal DCL includes the abnormality, the lens microcomputer 111 at step 825 determines whether or not the request-to-send signal RTS is asserted.

If the request-to-send signal RTS is asserted (that is, the error detection notice has been provided), the lens microcomputer 111 determines that the abnormality of the camera data signal DCL is error information transmitted from the camera microcomputer 205 for sharing purpose and then proceeds to step 826. At step 826, the lens microcomputer 111 clears the transmission data buffer 312 and enters into the communication standby (IDLE) state.

On the other hand, if a determination is made at step 824 that the camera data signal DCL received at step 823 does not include the abnormality or if, though a determination is made that the camera data signal DCL includes the abnormality, the request-to-send signal RTS is negated at step 825, the lens microcomputer 111 proceeds to step 827. At step 827, the lens microcomputer 111 stores the lens data signal DLC (whole frames) related to the camera data signal DCL received at step 823 to the transmission data buffer 312.

Next, at step 828, the lens microcomputer 111 waits for the assertion of the request-to-send signal RTS by the camera microcomputer 205. If the request-to-send signal RTS is asserted, the lens microcomputer 111 at step 829 determines whether or not the camera data signal DCL of a previous frame received from the camera microcomputer 205 at step 832 described later in a previous routine includes an abnormality. If the request-to-send signal RTS has been asserted at step 825 or at step 834 described later in the previous routine, the abnormality included in the camera data signal DCL of the previous frame means the error information produced by the camera microcomputer 205 for sharing purpose. The determination that the camera data signal DCL includes the abnormality at step 829 means that an actual abnormality occurs in the camera data signal DCL of the previous frame. If the camera data signal DCL of the previous frame does not include the abnormality, the lens microcomputer 111 directly proceeds to step 831. If the camera data signal DCL of the previous frame includes the abnormality at step 829, the lens microcomputer 111 proceeds to step 830 to invert the parity bit PA of a first frame of the lens data signal DLC stored in the transmission data buffer 312 and then proceeds to step 831.

The lens microcomputer 111 directly proceeding from step 829 to step 831 transmits, to the camera microcomputer 205, the lens data signal DLC of one frame in which the parity bit PA is not inverted. On the other hand, the lens microcomputer 111 proceeding from step 829 to step 831 via step 830 transmits, to the camera microcomputer 205, the lens data signal DLC of the one (first) frame in which the parity bit PA is inverted. The lens microcomputer 111 thereby shares the detection of the abnormality in the camera data signal DCL (that is, the error information) with the camera microcomputer 205. The camera microcomputer 205 receiving any one of these lens data signals DLC transmits the camera data signal DCL of one frame, and the lens microcomputer 111 at step 832 receives this camera data signal DCL.

Next, at step 833, the lens microcomputer 111 determines whether or not the camera data signal DCL of a current frame received at step 832 in this (current) routine includes an abnormality. If the camera data signal DCL includes the abnormality, the lens microcomputer 111 proceeds to step 834 to determine whether or not the request-to-send signal RTS is asserted. If the request-to-send signal RTS is asserted, the lens microcomputer 111 determines that the abnormality included in the camera data signal DCL of the current frame is error information produced by the camera microcomputer 205 for sharing purpose and then proceeds to step 835.

At step 835, the lens microcomputer 111 clears the transmission data buffer 312 and then enters into the communication standby (IDLE) state.

On the other hand, if a determination is made at step 833 that the camera data signal DCL of the current frame currently received does not include the abnormality or if, though a determination is made that the camera data signal DCL includes the abnormality, the request-to-send signal RTS is negated at step 833, the lens microcomputer 111 proceeds to step 836.

At step 836, the lens microcomputer 111 determines whether or not transmission of the whole frames of the lens data signal DLC stored in the transmission data buffer 312 at step 827 to the camera microcomputer 205 has been completed. If the transmission has been completed, the lens microcomputer 111 enters into the communication standby (IDLE) state. If the transmission has not been yet completed, the lens microcomputer 111 at step 837 performs an increment of an index specifying a frame to be subsequently transmitted among the frames of the lens data signal DLC remaining in the transmission data buffer 312 without being transmitted and then returns to step 828.

This embodiment enables, when the camera microcomputer 205 or the lens microcomputer 111 detects the communication error, the camera and lens microcomputers 205 and 111 to share the detection of the communication error (that is, the error information) with a smaller number of processes than in Embodiment 1. Thereby, the camera and lens microcomputers 205 and 111 can clear their transmission data buffers 301 and 312 immediately after the communication error occurs and restart the communication therebetween in a short time.

Embodiment 3

Next, description will be made of a third embodiment (Embodiment 3) of the present invention. This embodiment is a modified example of Embodiment 1 and is an embodiment of the following image-capturing apparatus. The image-capturing apparatus includes a camera controller having a function of detecting an accessory communication error in accessory data received from an accessory apparatus. The lens controller is configured to, when detecting the accessory communication error, transmit camera error information to the accessory apparatus, during transmission of camera data in response to receiving the accessory data, by inverting a specific bit of the camera data. Also in this embodiment, the communication error is the parity error or the framing error. The camera controller is further configured to, when transmitting the camera data in response to receiving the accessory data, change the specific bit depending on a delay amount of the transmission of the camera data with respect to the receipt of the accessory data. Moreover, the camera controller is configured to change the specific bit depending on a type of the communication error (that is, depending on whether the parity error or the framing error).

Figure 10A:
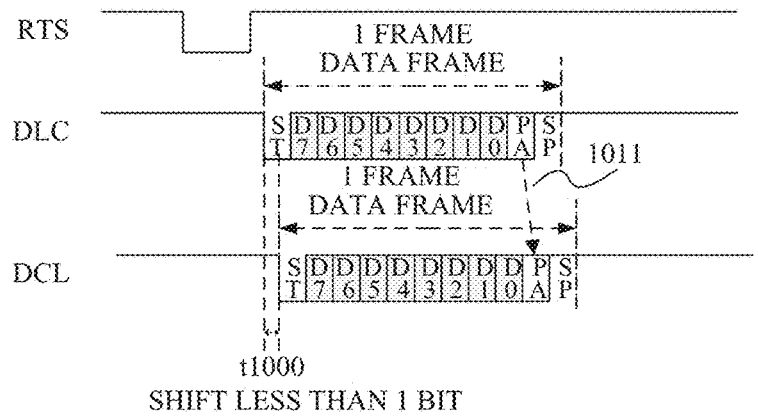
FIGS. 10A to 10C illustrate waveforms of signals transmitted and received between a camera body and an interchangeable lens when a parity error is detected in Embodiment 3.

FIG. 10A illustrates waveforms of signals transmitted and received between the camera and lens microcomputers 205 and 111 in a case where no communication error occurs in this embodiment. The case where no communication error occurs in this embodiment is a case where a delay amount t1000 of a time at which the camera microcomputer 205 starts transmitting the camera data signal DCL with respect to a time at which the camera microcomputer 205 starts receiving the lens data signal DLC is less than 1 bit.

The delay amount t1000 is a time period (bit shift number) from a time of receiving the start bit ST of the lens data signal DLC to a time of transmitting the start bit ST of the camera data signal DCL.

Figure 10B:
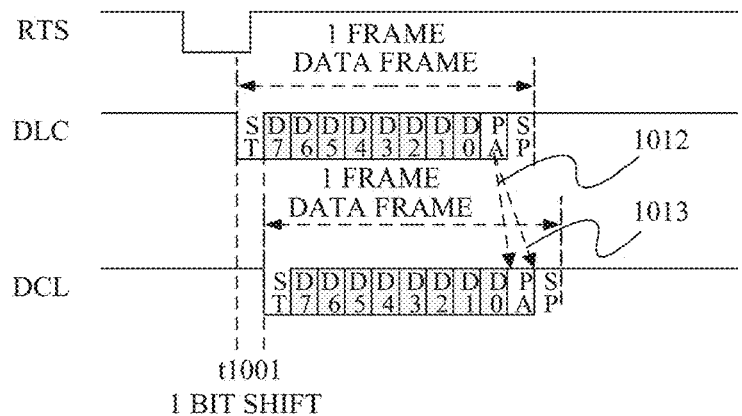
Figure 10C:
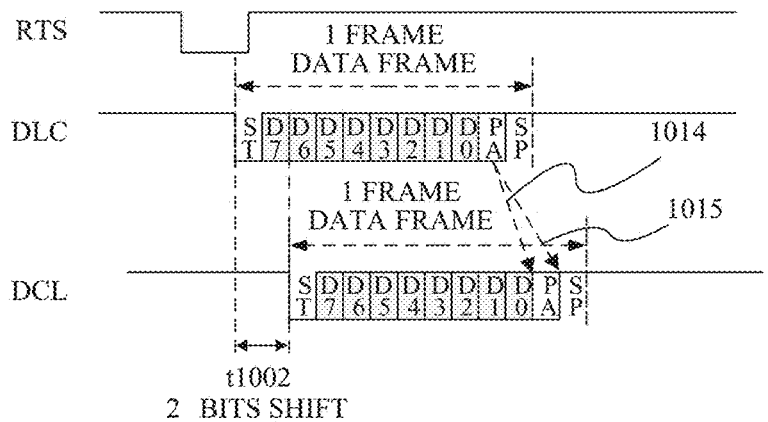

FIGS. 10B and 10C illustrate waveforms of signals transmitted and received between the camera and lens microcomputers 205 and 111 when the parity error as the communication error occurs in this embodiment.

Figure 9:
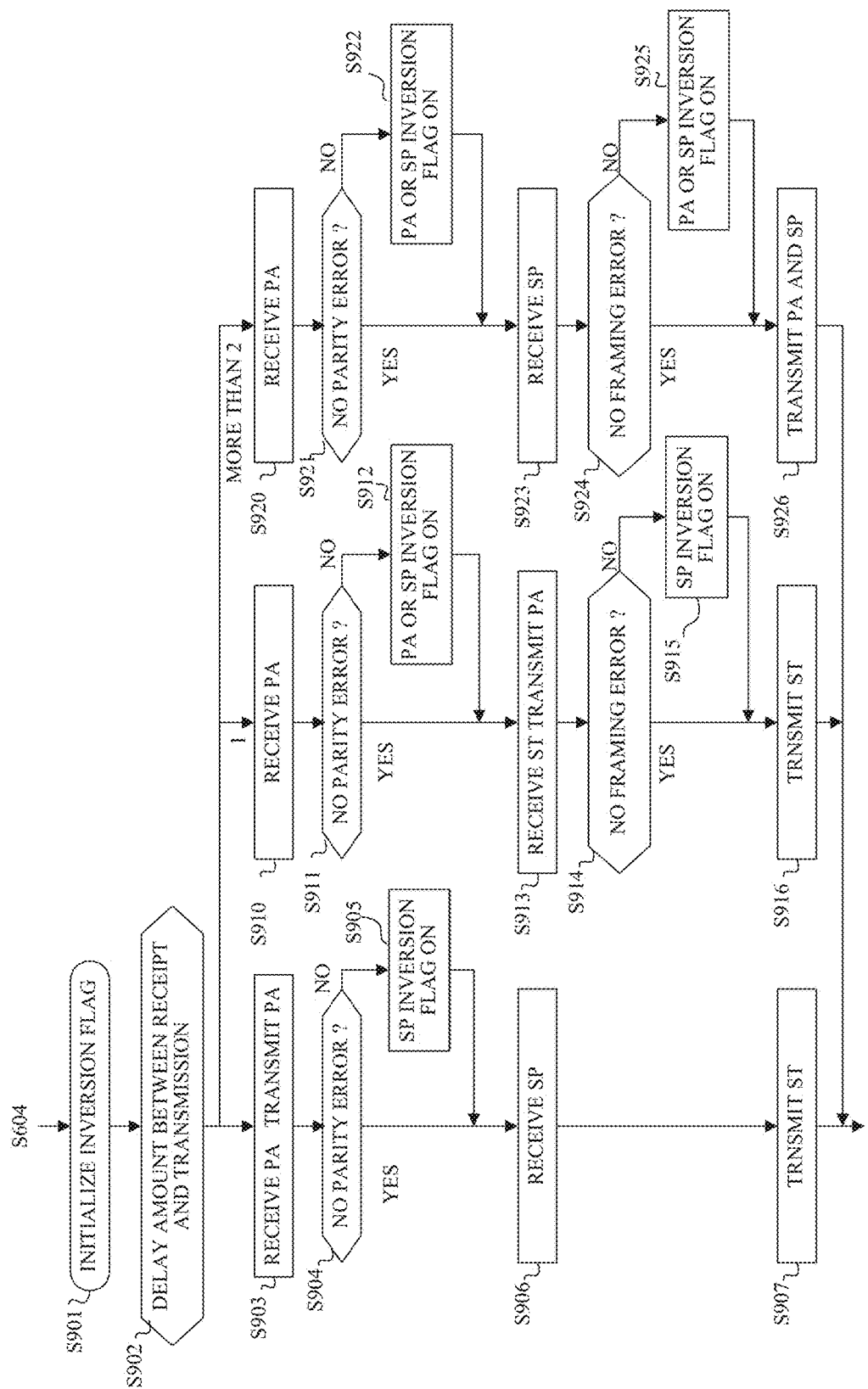
FIG. 9 is a flowchart illustrating a communication process in Embodiment 3 of the present invention.
Figure 11A:
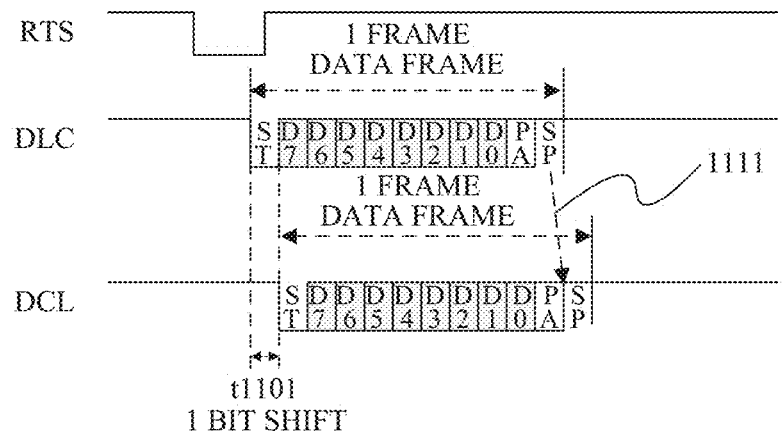
FIGS. 11A and 11B illustrate waveforms of signals transmitted and received between a camera body and an interchangeable lens when a framing error is detected in Embodiment 3.
Figure 11B:
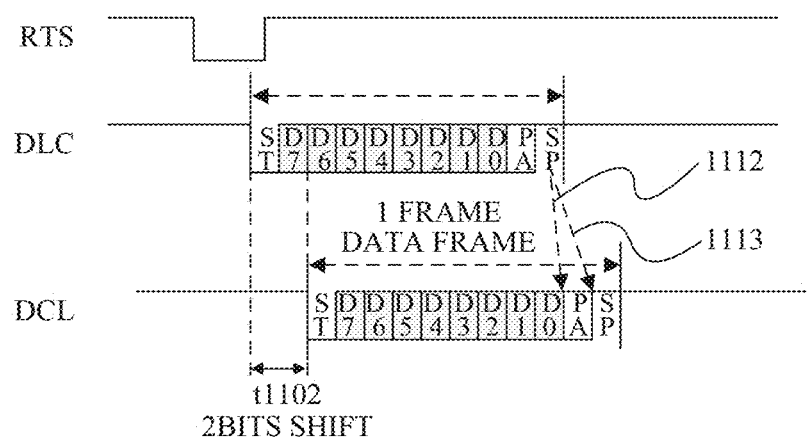

FIG. 10B illustrates a case where the delay amount t1000 is 1 bit, and FIG. 10C illustrates a case where the delay amount t1000 is 2 bits. Furthermore, FIGS. 11A and 11B illustrate waveforms of signals transmitted and received between the camera and lens microcomputers 205 and 111 when the framing error as the communication error occurs in this embodiment. FIG. 11A illustrates a case where the delay amount t1101 is 1 bit, and FIG. 11B illustrates a case where the delay amount t1102 is 2 bits. In FIGS. 10A to 10C, 11A and 11B, the lens data signals DLC and the camera data signals DCL respectively have mutually common basic signal waveforms though the delay amounts are mutually different. Next, with referring to a flowchart illustrated in FIG. 9, description will be made of a communication process (communication control) performed by the camera microcomputer 205 when the communication error occurs.

Figure 6A:
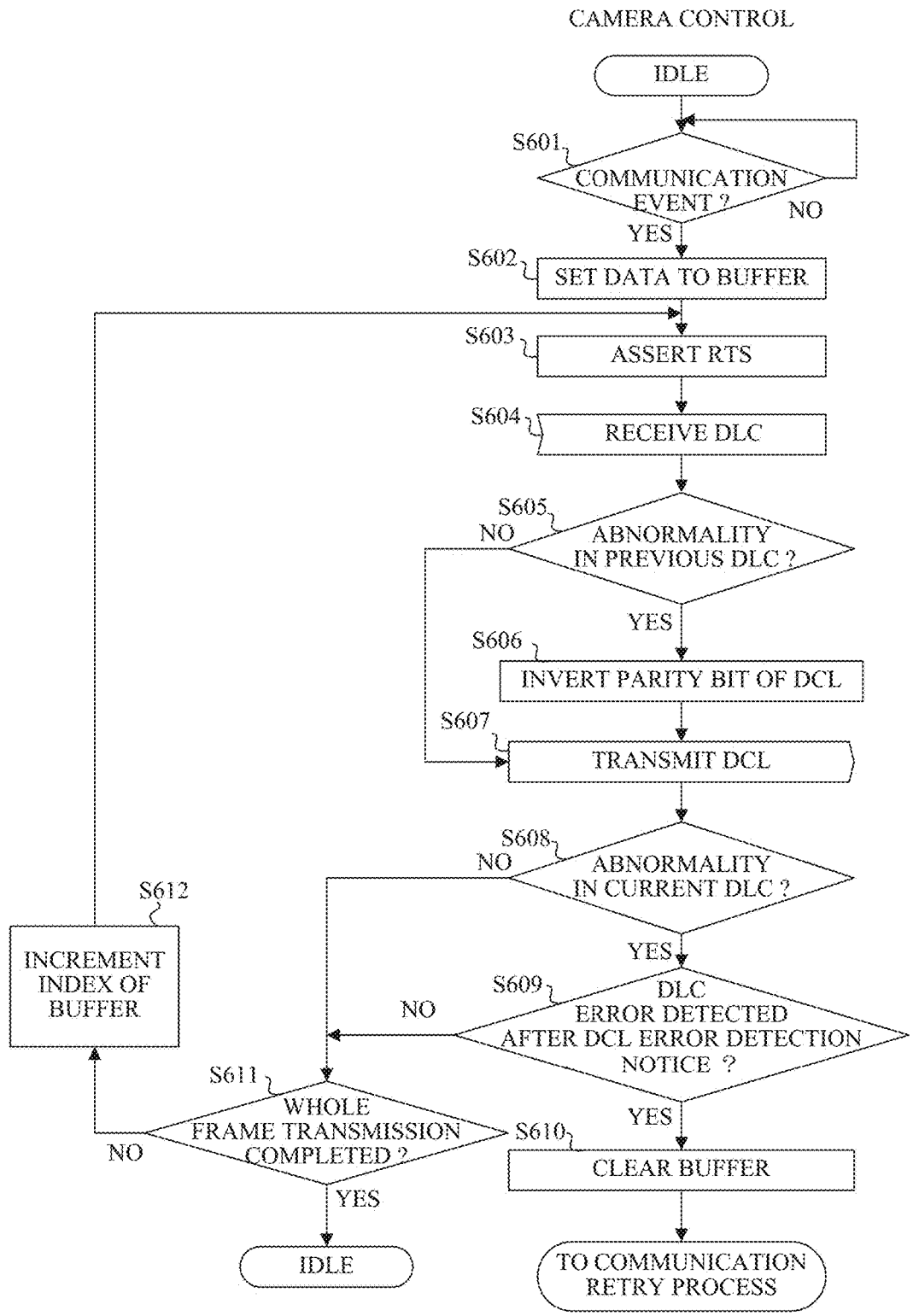
FIGS. 6A and 6B are flowcharts illustrating a communication process in Embodiment 1.
Figure 6B:
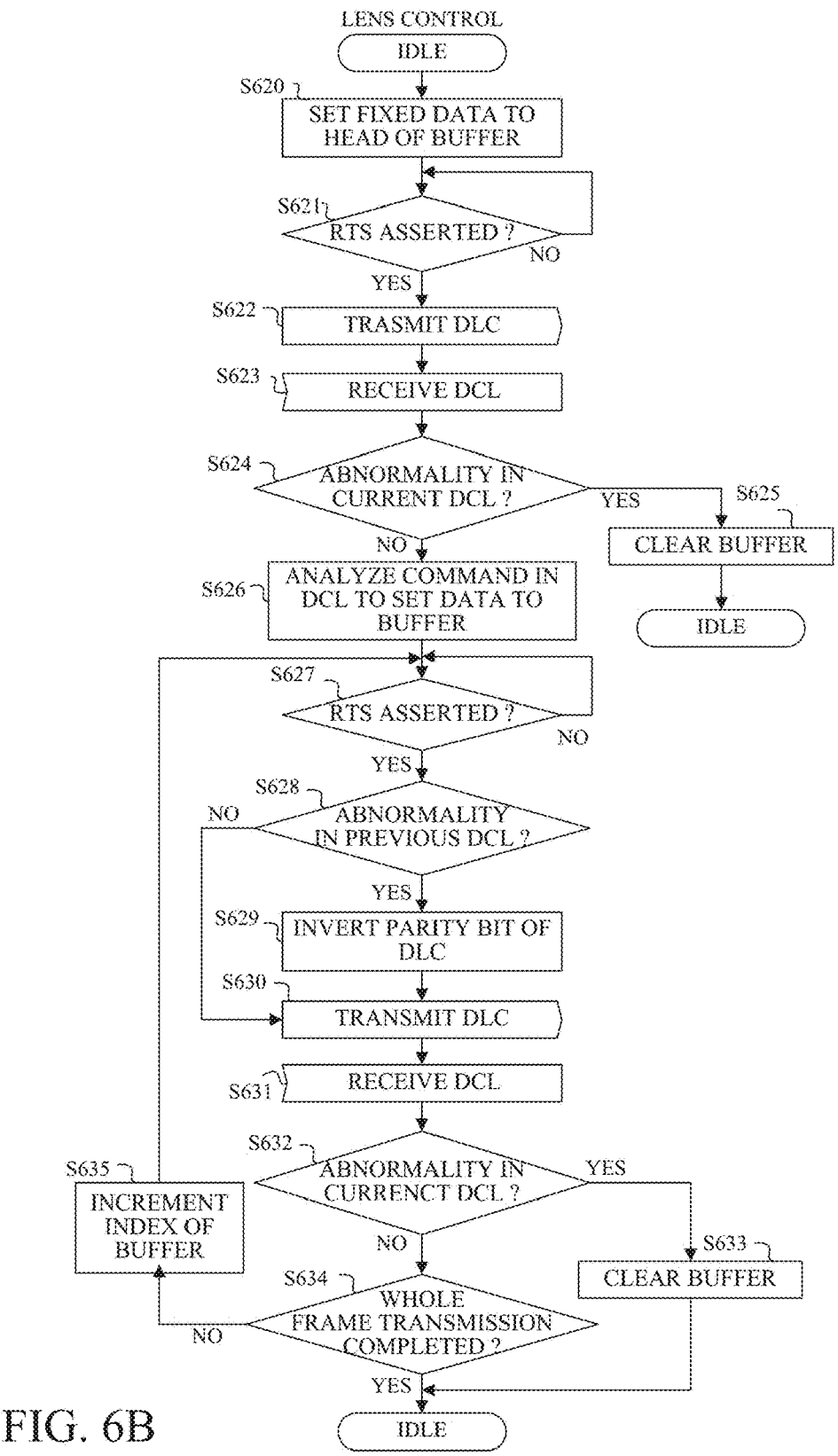

The camera microcomputer 205 performs, after starting receiving the lens data signal DLC from the lens microcomputer 111 at step 604 illustrated in FIG. 6A in Embodiment 1, processes at step (each abbreviated by S in FIG. 9) 901 and steps subsequent thereto, instead of steps 605 to 607 in illustrated in FIG. 6A. At a start of the process at step 901, the camera microcomputer 205 has already received the start bit ST and the data D7 to D0 of the lens data signal DLC and has already transmitted the start bit ST and the data D7 to D0 of one frame of the lens data signal DLC. That is, the process at step 901 is started during the receipt of the lens data signal DLC and during the transmission of the one frame of the camera data signal DCL.

At step 901, the camera microcomputer 205 initializes an inversion flag indicating whether or not to invert the parity bit PA and the stop bit SP of the camera data signal DCL. The initialized inversion flag becomes OFF indicating that an inversion of the parity bit PA and the stop bit SP is not performed.

Next, at step 902, the camera microcomputer 205 acquires the delay amount of the transmission time (start bit ST) of the camera data signal DCL with respect to the received lens data signal DLC and performs a selected one of the following three processes that is selected depending on the acquired delay amount. The delay amount may be acquired as a delay bit number predetermined between the camera and lens microcomputers 205 and 111 or may be acquired by providing a delay amount detector (not illustrated) in the camera microcomputer 205 and by detecting the delay amount by the delay amount detector.

The camera microcomputer 205 performs a first process of the three processes when the acquired delay amount is less than 1 bit as illustrated in FIG. 10A; the first process is for the parity error of the lens data signal DLC and includes processes at steps 903 to 907. Specifically, as illustrated by 1011 in FIG. 10A, the first process inverts, depending on a receipt result of the parity bit PA of the lens data signal DLC, the stop bit SP of the camera data signal DCL.

The camera microcomputer 205 performs a second process of the three processes when the acquired delay amount is 1 bit as illustrated in FIGS. 10B and 11A; the second process is for the parity error and the framing error of the lens data signal DLC and includes processes at steps 910 to 916. Specifically, as illustrated by 1012 and 1013 in FIG. 10B, the second process inverts, depending on the receipt result of the parity bit PA of the lens data signal DLC, the parity bit PA or the stop bit SP of the camera data signal DCL. Alternatively, as illustrated by 1111 in FIG. 11A, the second process inverts, depending on a receipt result of the stop bit SP of the lens data signal DLC, the parity bit PA or the stop bit SP of the camera data signal DCL.

The camera microcomputer 205 performs a third process of the three processes when the acquired delay amount is 2 bit (or more) as illustrated in FIGS. 10C and 11B; the third process is for the parity error and the framing error of the lens data signal DLC and includes processes at steps 920 to 926. Specifically, as illustrated by 1014 and 1016 in FIG. 10C, the third process inverts, depending on the receipt result of the parity bit PA of the lens data signal DLC, the parity bit PA or the stop bit SP of the camera data signal DCL.

Alternatively, as illustrated by 1112 and 1113 in FIG. 11B, the third process inverts, depending on the receipt result of the stop bit SP of the lens data signal DLC, the parity bit PA or the stop bit SP of the camera data signal DCL.

First, description of the first process will be made. At step 903, the camera microcomputer 205 receives the parity bit PA of the lens data signal DLC from the lens microcomputer 111 and transmits the parity bit PA of the camera data signal DCL to the lens microcomputer 111.

Next, at step 904, the camera microcomputer 205 determines whether or not the parity error is detected by the camera error detector 2051. If the parity error is detected, the camera microcomputer 205 proceeds to step 905, and otherwise proceeds to step 906.

At step 905, the camera microcomputer 205 changes the inversion flag to ON indicating that the inversion of the stop bit SP of the camera data signal DCL is performed. Then, the camera microcomputer 205 proceeds to step 906. At step 906, the camera microcomputer 205 receives the stop bit SP of the lens data signal DLC.

Then, at step 907, the camera microcomputer 205 transmits, depending on the inversion flag (ON or OFF), the stop bit SP of the camera data signal DCL to the lens microcomputer 111. Thereafter, the camera microcomputer 205 proceeds to step 608 in FIG. 6A.

The camera microcomputer 205 proceeding to step 608 determines, as described in Embodiment 1, whether or not the lens data signal DLC of one frame (current frame) received at step 604 in the current routine includes an abnormality. If the lens data signal DLC includes the abnormality, the camera microcomputer 205 performs the processes at step 609 and steps subsequent thereto. This applies to the second and third processes below.

Next, description of the second process will be made. At step 910, the camera microcomputer 205 receives the parity bit PA of the lens data signal DLC from the lens microcomputer 111. Next, at step 911, the camera microcomputer 205 determines whether or not the parity error is detected by the camera error detector 2051. If the parity error is detected, the camera microcomputer 205 proceeds to step 912, and otherwise proceeds to step 913.

At step 912, the camera microcomputer 205 changes the inversion flag to ON indicating that the inversion of at least one of the parity bit PA and the stop bit SP of the camera data signal DCL is performed and then proceeds to step 913. The inversion herein aims to intentionally bring the signal waveform of the camera data signal DCL into an abnormal (error) state, so that the inversion may be performed either on the parity bit PA or the stop bit SP. At step 913, the camera microcomputer 205 receives the stop bit SP of the lens data signal DLC from the lens microcomputer 111. On the other hand, the camera microcomputer 205 transmits, depending on the inversion flag (ON or OFF), the parity bit PA of the camera data signal DCL to the lens microcomputer 111.

Next, at step 914, the camera microcomputer 205 determines whether or not the framing error is detected by the camera error detector 2051. If the framing error is detected, the camera microcomputer 205 proceeds to step 915, and otherwise proceeds to step 916.

At step 915, the camera microcomputer 205 changes the inversion flag to ON indicating that the inversion of the stop bit SP of the camera data signal DCL is performed and then proceeds to step 916. At step 916, the camera microcomputer 205 transmits, depending on the inversion flag (ON or OFF), the stop bit SP of the camera data signal DCL to the lens microcomputer 111. Thereafter, the camera microcomputer 205 proceeds to step 608 in FIG. 6A.

Next, description of the third process will be made. At step 920, the camera microcomputer 205 receives the parity bit PA of the lens data signal DLC from the lens microcomputer 111. Next, at step 321, the camera microcomputer 205 determines whether or not the parity error is detected by the camera error detector 2051. If the parity error is detected, the camera microcomputer 205 proceeds to step 922, and otherwise proceeds to step 923.

At step 922, the camera microcomputer 205 changes the inversion flag to ON indicating that the inversion of at least one of the parity bit PA and the stop bit SP of the camera data signal DCL is performed and then proceeds to step 923. The inversion herein, as well as the second process, aims to intentionally bring the signal waveform of the camera data signal DCL into an abnormal (error) state, so that the inversion may be performed either on the parity bit PA or the stop bit SP. At step 923, the camera microcomputer 205 receives the stop bit SP of the lens data signal DLC from the lens microcomputer 111.

Next, at step 924, the camera microcomputer 205 determines whether or not the framing error is detected by the camera error detector 2051. If the framing error is detected, the camera microcomputer 205 proceeds to step 925, and otherwise proceeds to step 926.

At step 925, the camera microcomputer 205 changes, due to the same reason at step 922, the inversion flag to ON indicating that the inversion of at least one of the parity bit PA and the stop bit SP of the camera data signal DCL is performed and then proceeds to step 926. At step 926, the camera microcomputer 205 transmits, depending on the inversion flag (ON or OFF), the parity bit PA and the stop bit SP of the camera data signal DCL to the lens microcomputer 111. Thereafter, the camera microcomputer 205 proceeds to step 608 in FIG. 6A.

Performing any one of the above three process completes transmission of one frame of the camera data signal DCL to the lens microcomputer 111. All the above three processes are not necessarily performed, that is, it is only necessary that any one of them be performed. In this case, it is necessary to predetermine the delay amount between the camera and lens microcomputers 205 and 111. In other words, it is only necessary that an appropriate one of the three processes for the predetermined delay amount be performed.

In this embodiment, the camera microcomputer 205 intentionally generates the error state in one frame of the camera data signal DCL when the communication error occurs in the lens data signal DLC received from the lens microcomputer 111. The camera microcomputer 205 thereby enables notifying the lens microcomputer 111 of the occurrence of the communication error in the received lens data signal DLC.

Furthermore, the lens microcomputer 111 can detect the error state of the camera date signal DCL at the lens error detector 1091 and perform a predetermined recovery process, which enables promptly restarting a normal communication. In the predetermined recovery process, for example, the lens microcomputer 111 having detected the error state of the camera data signal DCL starts preparing for retransmitting the lens data signal DLC corresponding to the occurrence time of the communication error. Then, the lens microcomputer 111 retransmits the prepared lens data signal DLC in a subsequent communication with the camera microcomputer 205 (that is, in response to a subsequent assertion of the request-to-send signal RTS).

Furthermore, the communication process in this embodiment enables, when the communication error occurs in the burst communication described in Embodiment 1, restarting the burst communication from a frame in which the communication error has occurred, without a necessity of restarting the burst communication from its beginning.

Moreover, in this embodiment, the camera microcomputer 205 having detected the communication error in the lens data signal DLC can notify the lens microcomputer 111 of the occurrence of the communication error in a frame of the camera data signal DCL corresponding to that of the lens data signal DCL where the communication error has been detected. That is, the camera microcomputer 205 inverts, during the transmission of one frame of the camera data signal DCL, the parity bit PA or the stop bit SP in that one frame, which enables notifying the lens microcomputer 111 of the occurrence of the communication error. Thus, this embodiment enables, as compared with Embodiment 1, earlier notifying the lens microcomputer 111 of the occurrence of the communication error and earlier restarting a normal communication.

Embodiment 4

Next, description will be made of a fourth embodiment (Embodiment 4) of the present invention. Embodiment 4 performs the burst communication by the asynchronous serial communication in the communication setting (non-BUSY addition mode) in which the BUSY notice (BUSY frame) is not added. As described in Embodiment 1, the non-BUSY addition mode enables large volume data burst communication at a higher speed as compared with the BUSY addition mode in which the BUSY frame is added.

However, when the communication error occurs in such a burst communication, performing a reset process or an initialization process may require a long time to restart the communication, and therefore image capturing at a user's desired time may be prevented. Thus, this embodiment enables an image-capturing apparatus to promptly acquiring large volume data from an interchangeable lens (accessory apparatus) and to promptly restart the communication after the communication error occurs.

This embodiment is an embodiment of the following image-capturing apparatus. A camera controller of the image-capturing apparatus has, in the first communication setting, a function of performing a connection confirmation communication for confirming a connection between the image-capturing apparatus and the accessory apparatus and a function of detecting a communication error in accessory data received from the accessory apparatus. The camera controller is characterized by being capable of changing a period (cycle) of performing the connection confirmation communication depending on a number of times (frequency) of detecting the communication errors. The camera controller is further characterized by being capable of changing the communication setting between the first and second communication settings depending on the number of times of detecting the communication errors.

FIG. 12 illustrates waveforms of signals transmitted and received between the camera and lens microcomputers 205 and 111 in the non-BUSY addition mode in the first communication setting. FIG. 12A illustrates signal waveforms when three frames in which each one frame is a minimum communication unit are continuously communicated. As described above, in the non-BUSY addition mode, the BUSY notice is not added to the lens data signal DLC. In the non-BUSY addition mode, one frame of the lens data signal DLC has a data format formed only by the data frame, that is, not including the BUSY frame. Therefore, in the non-BUSY addition mode, the lens microcomputer 111 cannot provide the BUSY notice to the camera microcomputer 205. This data format is used for performing the burst communication as continuous communication in which each interval between frames is shortened so as to transmit relatively large volume data between the camera microcomputer 205 and the lens microcomputer ill. That is, the non-BUSY addition mode enables large volume data communication at a higher speed.

Furthermore, in the non-BUSY addition mode, each frame of the lens data signal DLC includes two stop bits SP as final bits, which is more than that of each frame of the camera data signal DCL. This difference in stop bit number makes a bit length of one frame of the lens data signal DLC longer than that of one frame of the camera data signal DCL. The reason for the longer bit length will be described later.

FIG. 12B illustrates signal waveforms when the camera microcomputer 205 and the lens microcomputer 111 continuously transmit and receive n frames of the camera data signal DCL and n frames of the lens data signal DLC (that is, when performing the burst communication). Prior to starting this communication, the camera microcomputer 205 receives a notice indicating n frames as data size (frame number) information from the lens microcomputer 111 responding to receiving the camera data signal DCL of one frame illustrated in FIG. 4A.

The camera microcomputer 205 asserts the request-to-send signal RTS when an event for starting the communication with the lens microcomputer 111 occurs. Thereafter, in the non-BUSY addition mode in which it is unnecessary to negate the request-to-send signal RTS at each frame, the camera microcomputer 205 maintains the assertion of the request-to-send signal RTS while performing continuous data communication (transmission and receipt) with the lens microcomputer 111.

The lens microcomputer 111 performs, in response to detecting a transmission request by the assertion of the request-to-send signal RTS, a process for producing the lens data signal DLC to be transmitted to the camera microcomputer 205. Then, after a preparation for transmitting the lens data signal DLC is completed, the lens microcomputer 111 starts transmitting a first frame DL1 of the lens data signal DLC to the camera microcomputer 205 through the first data communication channel.

The lens microcomputer 111 having transmitted the data frame of the first frame of the lens data signal DLC rechecks the request-to-send signal RTS. If the request-to-send signal RTS is asserted, the lens microcomputer 111 transmits, after the first frame whose transmission has been completed, a second frame DL2 of the lens data signal DLC to the camera microcomputer 205. In this way, while the assertion of the request-to-send signal RTS is maintained by the camera microcomputer 205, the lens microcomputer 111 continuously transmits the n frames DL1 to DLn of the lens data signal DLC to the camera microcomputer 205. Then, if the transmission of the n frames indicated in the data size information is completed, the transmission of the lens data signal DLC is stopped.

The camera microcomputer 205 transmits, in response to detecting the start bits ST of the frames of the lens data signal DLC, n frames DC1 to DCn of the camera data signal DCL through the second data communication channel. Thus, the assertion of the request-to-send signal RST maintained by the camera microcomputer 205 enables continuous transmission and receipt of the lens and camera data signals DLC and DCL whose each frame number corresponds to the data size information.

The camera microcomputer 205 temporarily stores the n frames of the lens data signal DLC continuously received from the lens microcomputer 111 to the receipt data buffer 303 through the serial-parallel converter 306. The DMA controller 307 transfers the n frames of the lens data signal DLC stored in the receipt data buffer 303 to the memory 210 to finally store these n frames to the memory 210. Therefore, to receive a larger data amount of the lens data signal DLC than a capacity of the receipt data buffer 303, it is necessary to transfer the lens data signal DLC stored before in the receipt data buffer 303 to the memory 210 so as to secure a free space of the receipt data buffer 303. However, when the DMA controller 307 cannot access the memory 210 due to a processing situation of the signal processor 203 provided in the camera body 200, it is impossible to transfer the n frames of the lens data signal DLC continuously received from the lens microcomputer 111 to the memory 210. This results in a lack of the free space of the receipt data buffer 303, which makes it impossible to store part of the lens data signal DLC to the memory 210. For example, if remaining data of the lens data signal DLC in the receipt data buffer 303, the remaining data being part of the lens data signal DLC received before by the camera microcomputer 205 and being not transferred to the memory 210, is overwritten by newly received data, the rewritten data is not stored to the memory 210. Thus, it is necessary to suspend (temporarily stop) the communication performed between the camera and lens microcomputers 205 and 111 before the data stored in the receipt data buffer 303 is overwritten.

FIG. 12C illustrates signal waveforms in a case where, during the continuous data communication illustrated in FIG. 12B, the camera microcomputer 205 instructs a suspension of the communication. Also in this case, in response to the assertion of the request-to-send signal RTS by the camera microcomputer 205, the lens microcomputer 111 starts transmitting the lens data signal DLC. Then, in response to detecting the start bit ST of the lens data signal DLC, the camera microcomputer 205 starts transmitting the camera data signal DCL.

In FIG. 12C, T represents a communication suspension time period where the suspension of the communication is instructed by the camera microcomputer 205. In response to occurrence of a communication suspension event, the camera microcomputer 205 instructs the lens microcomputer 111 to suspend the communication (that is, provides a communication suspension instruction to the lens microcomputer 111) by temporarily negating the request-to-send signal RTS. In response to detecting the negation of the request-to-send signal RTS, the lens microcomputer 111 suspends transmitting the lens data signal DLC after completing transmitting a frame incompletely transmitted at the time of detecting the negation (this last transmitted frame is illustrated as DL6 in FIG. 12C and hereinafter referred to as "a suspension frame"). In response to the transmission suspension of the camera data signal DLC, the camera microcomputer 205 also suspends transmitting the camera data signal DCL after completing transmitting a frame (illustrated as DC6 in FIG. 12C) thereof corresponding to the suspension frame of the lens data signal DLC.

Such communication control enables, even when the communication suspension instruction is provided during the continuous data communication, managing so as to make a transmitted frame number of the lens data signal DLC equal to that of the camera data signal DCL, that is, so as to synchronize the transmissions of the lens and camera data signals DLC and DCL.

In response to termination of the communication suspension event, the camera microcomputer 205 is allowed to assert the request-to-send signal RTS again to instruct the lens microcomputer 111 to restart the communication (that is, provides a communication restart instruction to the lens microcomputer 111). The lens microcomputer 111 restarts, in response to the communication restart instruction, transmitting the lens data signal DLC from a frame subsequent to the suspension frame (this subsequent frame is illustrated as DL7 in FIG. 12C and hereinafter referred to as "a restart frame"). Then, in response to detecting the start bit ST of the restart frame, the camera microcomputer 205 restarts transmitting the camera data signal DCL from a frame DC7 thereof corresponding to the restart frame of the lens data signal DLC.

As just described, the camera microcomputer 205 temporarily negates the request-to-send signal RTS to suspend the communication with the lens microcomputer 111. Then, if a received frame number of the lens data signal DLC at the time of the suspension is less than the frame number indicated in the data size information, the camera microcomputer 205 is allowed to restart receiving the lens data signal DLC from the lens microcomputer 111.

Figure 16A:
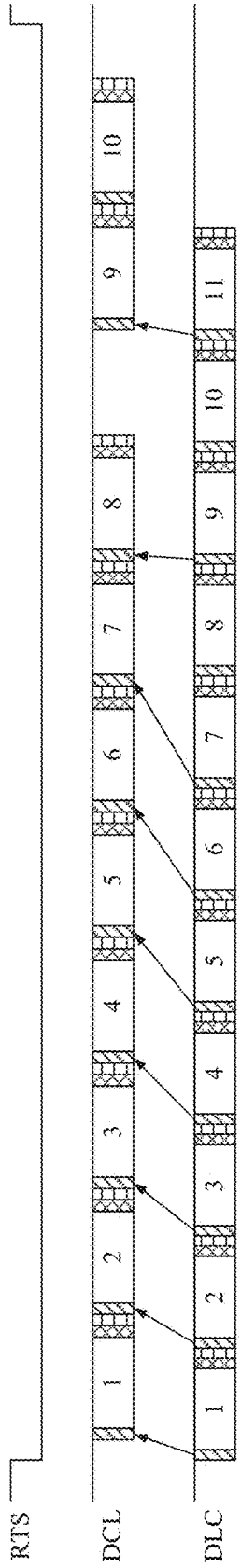
FIGS. 16A and 16B illustrate data frames transmitted and received between the camera body and the interchangeable lens in the second communication setting in Embodiment 4.

Next, with referring to FIG. 16A, description will be made of a problem that may occur when, in the non-BUSY addition mode, a bit rate of the camera data signal DCL output from the camera microcomputer 205 and that of the lens data signal DLC output from the lens microcomputer 111 are different from each other. FIG. 16A illustrates a relation of frames of the camera and lens data signals DCL and DLC when the camera and lens data signals DCL and DLC have the same bit length of one frame (data frame) and the bit rate of the camera data signal DCL is slower than that of the lens data signal DLC. Arrows in FIG. 16A illustrates which start bit ST of the lens data signal DLC is detected by the camera microcomputer 205 and which frame of the camera data signal DCL is transmitted from the camera microcomputer 205 to the lens microcomputer 111.

Since the bit rate of the camera data signal DCL is slower than that of the lens data signal DLC, delays of the frames of the camera data signals DCL with respect to the frames of the lens data signal DLC are gradually increased. The camera and lens microcomputers 205 and 111 are performing continuous data communication, so that gaps (non-communication time period) are provided between the frames. Accordingly, accumulation of the delays causes a shift of one frame or more between the camera and lens data signals DCL and DLC, which generates a difference between the transmitted frame numbers of the camera and lens data signals DCL and DLC. Furthermore, the above shift between the camera and lens data signals DCL and DLC causes the camera microcomputer 205 to skip the start bit ST of one frame of the lens data signal DLC, which generates a time period corresponding to about one frame where the camera data signal DCL is not transmitted to the lens microcomputer 111. Such a situation makes it difficult to manage the transmitted frame numbers (communicated data amounts) between the camera and lens microcomputers 205 and 111 and makes the data communication therebetween impossible.

Figure 16B:
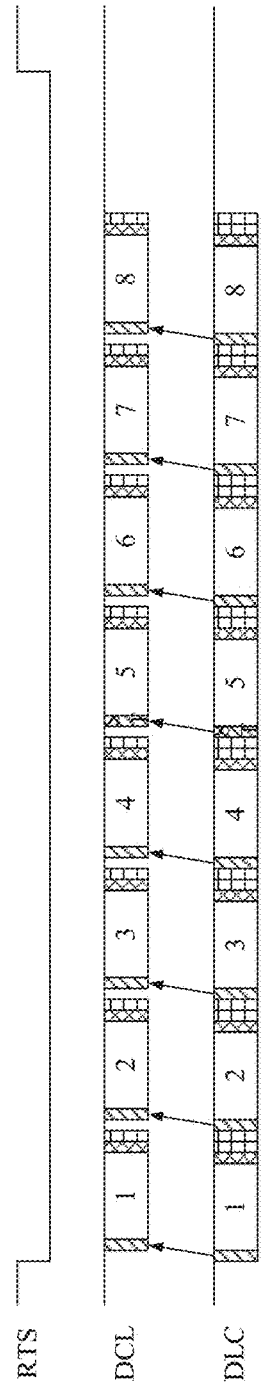

Thus, this embodiment provides, as illustrated in FIGS. 12A and 16B, a greater number of the stop bits SP in each frame of the lens data signal DLC than that in each frame of the camera data signal DCL. specifically, each frame of the camera data signal DCL includes one stop bit SP, and on the other hand, each frame of the lens data signal DLC includes two stop bits SP. The data formats of the lens and camera data signals DLC and DCL are mutually the same except for the stop bit number. The difference in stop bit number makes the bit number of one frame (data frame) of the lens data signal DLC greater than that of one frame of the camera data signal DCL. In other words, the difference in stop bit number makes the bit length of one frame of the lens data signal DLC longer than that of one frame of the camera data signal DCL. This setting enables, even when the bit rate of the camera data signal DCL is slower than that of the lens data signal DLC, preventing the shifts of the frames of the camera data signal DCL with respect to the frames of the lens data signal DLC from being accumulated.

When the bit rates of the lens and camera data signals DLC and DCL are equal to each other, the longer bit length of one frame of the lens data signal DLC than that of one frame of the camera data signal DCL causes the transmission of the camera data signal DCL to be completed earlier than that of the lens data signal DLC. Furthermore, even when the bit rate of the camera data signal DCL is slower than that of the lens data signal DLC due to a bit rate error, one bit as a bit length difference of one frame is a sufficient margin amount for absorbing a transmission time difference between corresponding frames of the camera and lens data signals DCL and DLC due to the bit rate error.

On the other hand, when the bit rate of the camera data signal DCL is faster than that of the lens data signal DLC, the above-described frame shift problem does not occur. This is because the setting is made that each frame of the camera data signal DCL is transmitted in response to detecting the start bit ST in each frame of the lens data signal DLC. Furthermore, even when the bit rates settable in the camera body 200 and the interchangeable lens 100 are slightly different from each other, increasing the bit number of the stop bits SP in each frame of the lens data signal DLC enables responding to the difference.

As described above, in the BUSY addition mode in the first communication setting, the camera microcomputer 205 can notify the lens microcomputer 111 of the suspension of the communication by temporarily negating the request-to-send signal RTS. Furthermore, the lens microcomputer 111 adds the BUSY notice (BUSY frame) to the lens data signal DLC to notify the camera microcomputer 205 of the suspension of the communication. These functions of the camera and lens microcomputers 205 and 111 enable smooth and fast data communication therebetween.

On the other hand, in the non-BUSY addition mode in the first communication setting, the camera microcomputer 205 can notify the lens microcomputer 111 of the suspension of the communication during the burst communication from the lens microcomputer 111 to the camera microcomputer 205 by temporarily negating the request-to-send signal RTS. This function of the camera microcomputers 205 and 111 enables performing a large volume data communication at a high speed between the camera and lens microcomputers 205 and 111 while synchronizing them with each other.

Figure 13:
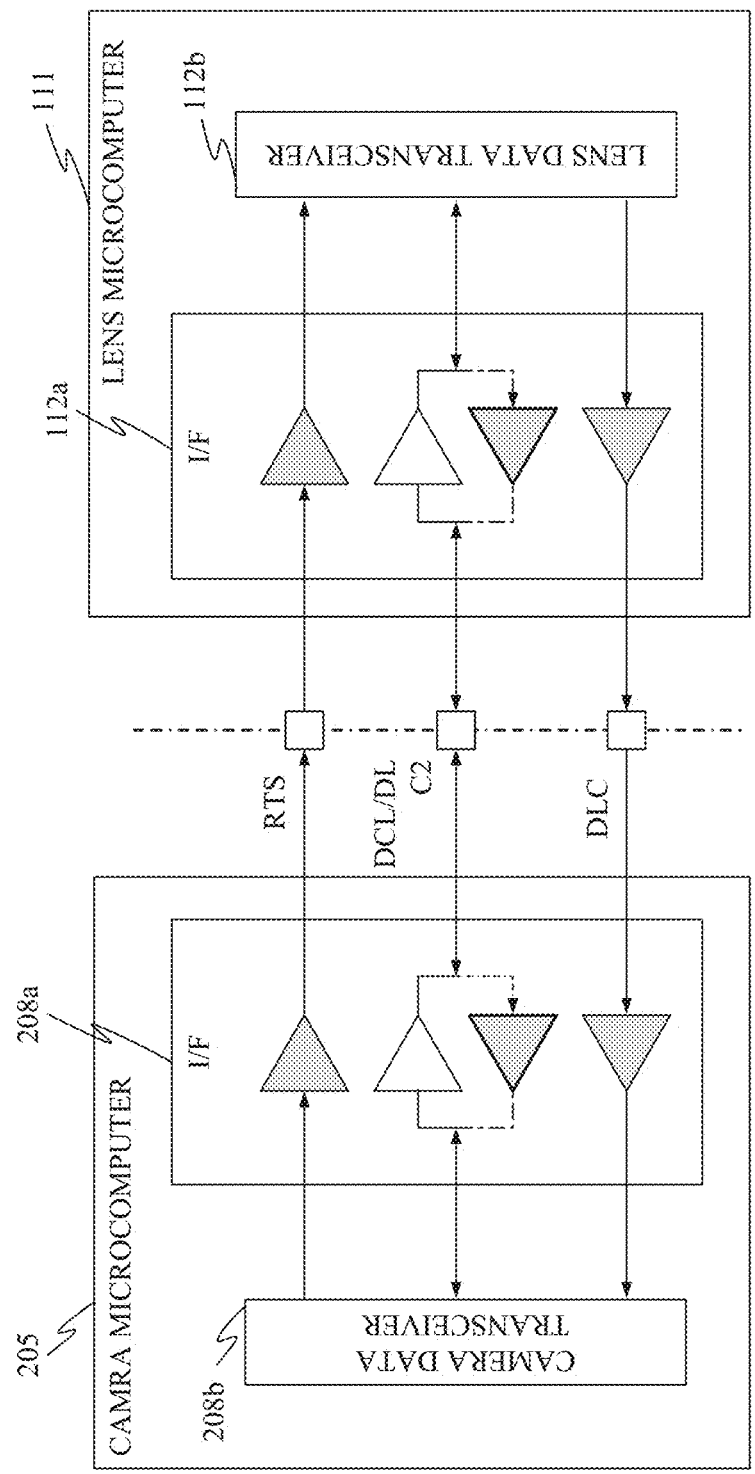
FIG. 13 illustrates a communication circuit between the camera body and the interchangeable lens in Embodiment 4.

Next, description will be made of the second communication setting between the camera and lens microcomputers 205 and 111. In the second communication setting, as illustrated in FIG. 13, switching communication directions in the communication interface circuits 208a and 112a (that is, switching a communication setting) enables using the second data communication channel for lens data transmission from the lens microcomputer 111 to the camera microcomputer 205. Specifically, in a communication circuit for the second data communication channel, input and output buffers are connected in parallel to the second data communication channel such that an input/output direction in the second data communication channel is switchable. The input and output buffers are exclusively selectable. The input and output buffers connected in parallel to the second data communication channel are hereinafter collectively referred to as "an input/output buffer". In the following description, lens data transmitted from the lens microcomputer 111 to the camera microcomputer 205 through the second data communication channel is referred to as "a second lens data signal DLC2". In addition, the lens data signal DLC transmitted from the lens microcomputer 111 to the camera microcomputer 205 with the transmission of the second lens data signal DLC2 through the first data communication channel is referred to as "a first lens data signal DLC" in order to distinguish this first lens data signal DLC from the second lens data signal DLC2.

The second communication setting uses the first and second data communication channels for continuous communication (burst communication) of the lens data signal to the camera microcomputer 205. This second communication setting enables a large volume data communication at a higher speed as compared with the non-BUSY addition mode in the first communication setting.

However, when the first communication setting is switched to the second communication setting, it is necessary to avoid collision of the camera data signal DCL transmitted from the camera microcomputer 205 with the lens data signal DLC transmitted from the lens microcomputer 111. Thus, in this embodiment, the camera and lens microcomputers 205 and 111 perform in cooperation with each other a communication setting switching process according to a predetermined procedure.

Figure 14:
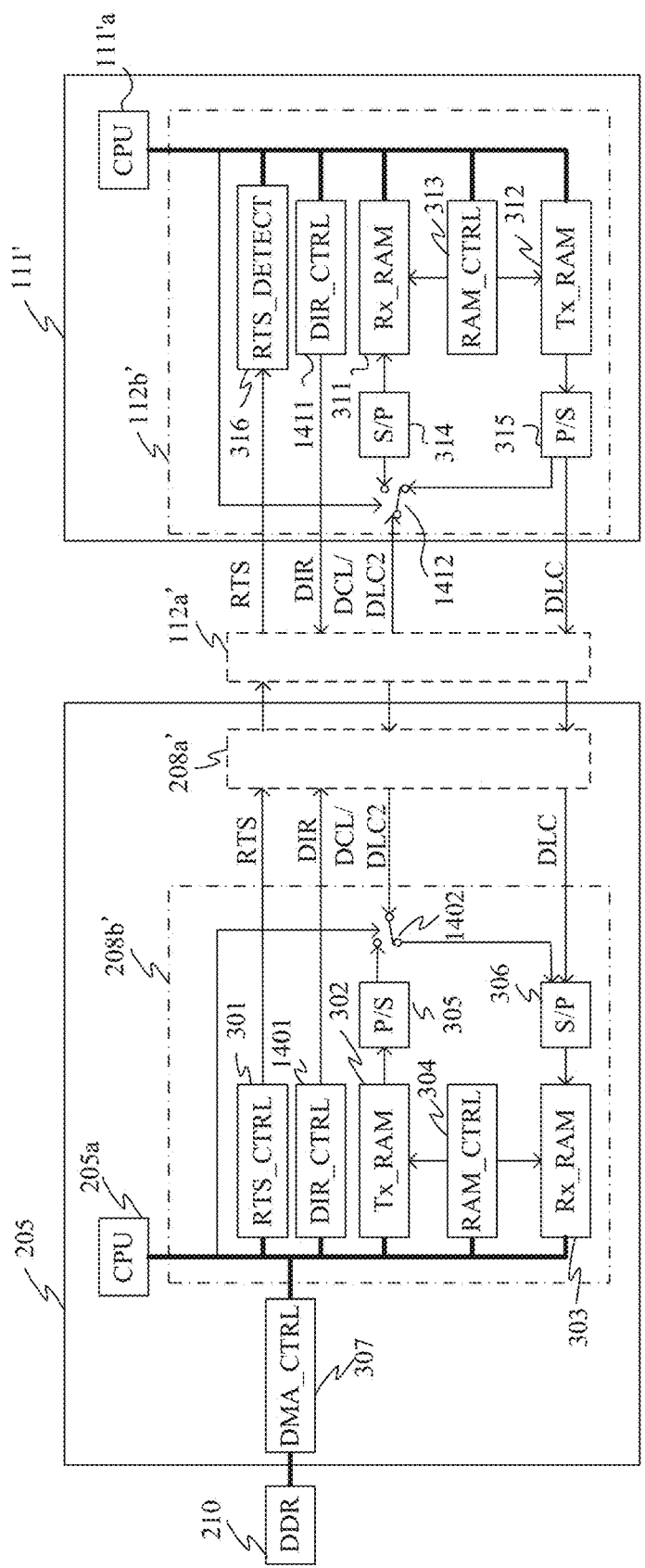
FIG. 14 is a diagram illustrating a configuration of camera and lens transceiver in a second communication setting in Embodiment 4.

FIG. 14 illustrates a configuration of the camera data transceiver 208b' in the camera microcomputer 205 and the lens data transceiver 112b' in the lens microcomputer 111. In FIG. 14, constituent elements common to those in FIG. 3 are denoted by the same reference numerals as those in FIG. 3, and their description will be omitted.

The camera data transceiver 208b' includes a communication direction switcher 1401 that operates a switch 1402 so as to switch the input/output direction in the second data communication channel to a direction in which the camera microcomputer 205 receives the second lens data signal DLC2 transmitted from the lens microcomputer 111. Then, in the camera microcomputer 205, the second lens data signal DLC2 received from the lens microcomputer 111 through the second data communication channel is converted from a serial data signal into a parallel data signal by the serial-parallel converter 306 and is stored to the receipt data buffer 303. The receipt data buffer 303 also stores the first lens data signal DLC received through the first data communication channel and converted from a serial data signal into a parallel data signal by the parallel-serial converter 306. The second lens data signal DLC2 stored in the receipt data buffer 303 is read out therefrom by the DMA controller 307, and the read lens data signal DLC is transferred and stored to the memory 210.

The lens data transceiver 112b' includes a communication direction switcher 1411 that operates a switch 1412 so as to switch the input/output direction in the second data communication channel to the direction in which the lens microcomputer 111 transmits the second lens data signal DLC2 to the camera microcomputer 205. Then, in the lens microcomputer 111, the second lens data signal DLC2 stored in the transmission data buffer 312 is converted from a parallel data signal into a serial data signal by the parallel-serial converter 315 and is transmitted to the camera microcomputer 205 through the second data communication channel. In the lens microcomputer 111, the first lens data signal DLC stored in the transmission data buffer 312 is converted from a parallel data signal into a serial data signal by the parallel-serial converter 315 and is transmitted to the camera microcomputer 205 through the first data communication channel.

Figure 15A:
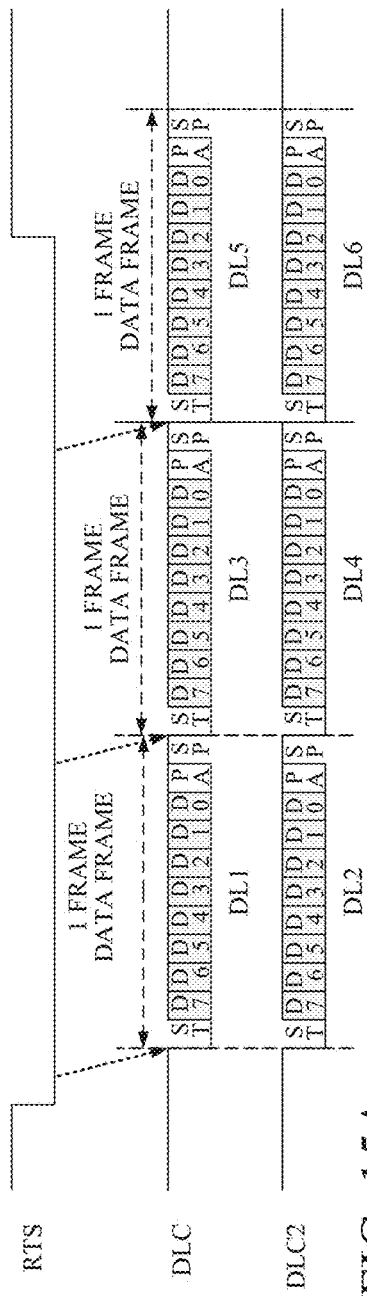
FIGS. 15A to 15C illustrate waveforms of signals transmitted and received between the camera body and the interchangeable lens in the second communication setting in Embodiment 4.

Next, description will be made of the procedure in the second communication setting. FIG. 15A illustrates signal waveforms when three frames in which each one frame is a minimum communication unit are continuously communicated. In the second communication setting, as the non-BUSY addition mode in the first communication setting, each frame of the first and second lens data signals DLC and DLC2 has a data format formed only by the data frame, that is, not including the BUSY frame. That is, the first and second lens data signals DLC and DLC2 have a data format not allowing transmitting the BUSY notice from the lens microcomputer 111 to the camera microcomputer 205.

Furthermore, the second communication setting is customized as a communication setting used only for the lens data transmission from the lens microcomputer 111 to the camera microcomputer 205, that is, camera data transmission from the camera microcomputer 205 to the lens microcomputer 111 is unable to be performed in the second communication setting. Moreover, the first and second lens data signals DLC and DLC2 have a data format enabling continuous communication without a wait time between the stop bit SP of a previous frame and the start bit ST of a subsequent frame. The data frames of the first and second lens data signals DLC and DLC2 have mutually the same data formats in which one frame bit lengths thereof are equal to each other. This is for a purpose of a communication management that makes numbers of the transmitted frames equal to each other in a case where the data communication is stopped in its middle. However, relative relations of bit positions in the data frames of the first and second lens data signals DLC and DLC2 are not necessarily needed to be identical to each other, that is, a shift amount of the bit positions between the first and second lens data signals DLC and DLC2 within one frame length is allowed.

Figure 15B:
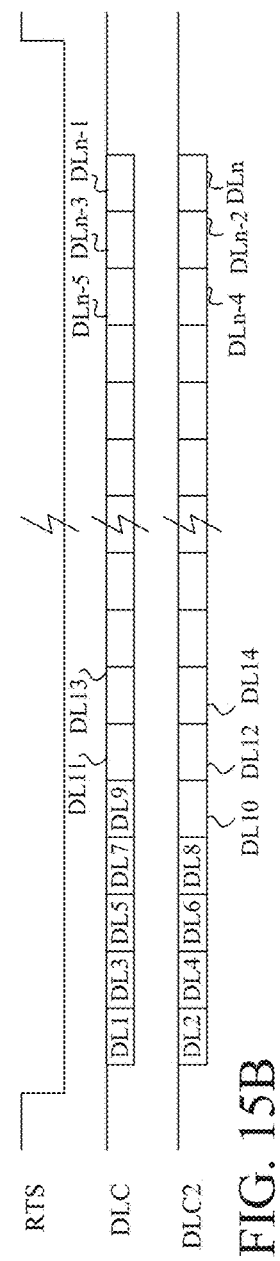

FIG. 15B illustrates signal waveforms when the lens microcomputer 111 continuously transmit n frames in total of the first and second lens data signals DLC and DLC2 to the camera microcomputer 205 in the second communication setting (that is, when performing the burst communication).

The camera microcomputer 205 asserts the request-to-send signal RTS when an event for starting the communication with the lens microcomputer 111 occurs. Thereafter, in the second communication setting in which it is unnecessary to negate the request-to-send signal RTS at each frame, the camera microcomputer 205 maintains the assertion of the request-to-send signal RTS while performing continuous data communication (transmission and receipt) with the lens microcomputer 111.

The lens microcomputer 111 performs, in response to detecting a transmission request by the assertion of the request-to-send signal RTS, a process for producing the first and second lens data signals DLC and DLC2 to be transmitted to the camera microcomputer 205. Then, after a preparation for transmitting the first and second lens data signals DLC and DLC2 is completed, the lens microcomputer 111 starts transmitting a first frame DL1 of the first lens data signal DLC to the camera microcomputer 205 through the first data communication channel. Simultaneously, the lens microcomputer 111 starts transmitting a second frame DL2 of the second lens data signal DLC2 to the camera microcomputer 205 through the second data communication channel.

The lens microcomputer 111 having transmitted the first and second frames DL1 and DL2 of the first and second lens data signals DLC and DLC2 rechecks the request-to-send signal RTS. If the request-to-send signal RTS is asserted, the lens microcomputer 111 transmits, after the first and second frames, third and fourth frames DL3 and DL4 of the first and second lens data signals DLC and DLC2 to the camera microcomputer 205. In this way, while the assertion of the request-to-send signal RTS is maintained by the camera microcomputer 205, the lens microcomputer 111 continuously transmits the n frames in total of the first and second lens data signals DLC and DLC2 to the camera microcomputer 205.

Setting the total frame number n of the first and second lens data signals DLC and DLC2 to an even number makes frame numbers transmitted respectively through the first and second data communication channels from the lens microcomputer 111 to the camera microcomputer 205 equal to each other.

Although in FIG. 15B the first lens data signal DLC transmitted through the first data communication channel includes only odd frames and the second lens data signal DLC2 transmitted through the second data communication channel includes only even frames, the first and second lens data signals DLC and DLC2 may include other frames.

Figure 15C:
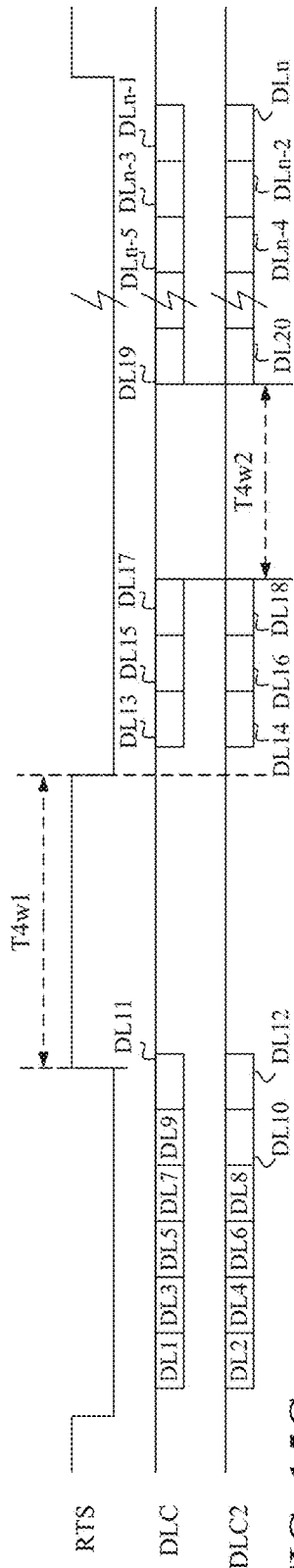

FIG. 15C illustrates signal waveforms in a case where, during the continuous data communication illustrated in FIG. 15B, the camera microcomputer 205 and the lens microcomputer 111 each instruct a suspension of the communication. In response to the assertion of the request-to-send signal RTS S by the camera microcomputer 205, the lens microcomputer 111 starts transmitting the first and second lens data signals DLC and DLC2. Thereafter, while frames DL11 and DL12 are being transmitted, the camera microcomputer 205 instructs the suspension of the communication. In FIG. 15C, T4$w$1 represents a communication suspension time period where the suspension of the communication is instructed by the camera microcomputer 205. In response to occurrence of a communication suspension event, the camera microcomputer 205 instructs the lens microcomputer 111 to suspend the communication (that is, provides a communication suspension instruction to the lens microcomputer 111) by temporarily negating the request-to-send signal RTS. In response to detecting the negation of the request-to-send signal RTS, the lens microcomputer 111 suspends transmitting the first and second lens data signals DLC and DLC2 after completing transmitting the frames DL11 and DL12 incompletely transmitted at the time of detecting the negation (the frames DL11 and DL12 are hereinafter referred to as "suspension frames").

In response to termination of the communication suspension event, the camera microcomputer 205 asserts the request-to-send signal RTS again to instruct the lens microcomputer 111 to restart the communication (that is, provides a communication restart instruction to the lens microcomputer 111). The lens microcomputer 111 restarts, in response to the communication restart instruction, transmitting the first and second lens data signals DLC and DLC2 from frames DL13 and DL14 subsequent to the suspension frames DL11 and DL12 (the subsequent frames DL13 and DL14 are hereinafter referred to as "restart frames").

The lens microcomputer 111 continuously transmits, to the camera microcomputer 205, the restart frames DL13 and DL14, subsequent frames DL15 and DL16 and further subsequent frames DL17 and D118 in this order. Then, when the transmission of the frames DL17 and DL18 is completed and a communication suspension request event occurs in the lens microcomputer 111, the lens microcomputer 111 notifies the camera microcomputer 205 of a suspension of the communication.

In FIG. 15C, T4$w$2 represents a communication suspension time period where the suspension of the communication is instructed by the lens microcomputer 111. The notification of the suspension of the communication from the lens microcomputer 111 is performed by not transmitting the first and second lens data signals DLC and DLC2 from the lens microcomputer 111 even though the request-to-send signal RTS is asserted. The camera microcomputer 205 maintains the assertion of the request-to-send signal RTS during the communication suspension time period T4$w$2 instructed by the lens microcomputer 111.

Thereafter, when the communication suspension request event is terminated in the lens microcomputer 111, the lens microcomputer 111 restarts transmitting, to the camera microcomputer 205, the first and second lens data signals DLC and DLC2 from their next restart frames DL19 and DL20. Thus, the lens microcomputer 111 transmits, to the camera microcomputer 205, remaining frames included in the first and second lens data signals DLC and DLC2 and having not been transmitted to the camera microcomputer 205 due to the suspension of the communication.

As described above, in the second communication setting, the lens microcomputer 111 suspends the transmission of the first and second lens data signals DLC and DLC2 to the camera microcomputer 205 and thereby suspends the communication between the camera and lens microcomputers 205 and 111. This function of the lens microcomputer 111 enables performing a large volume data communication at a high speed between the camera and lens microcomputers 205 and 111 while synchronizing them with each other.

In order to perform image capturing at a user's desired time, it is necessary to reduce a release time lag from a user's image-capturing instruction operation to the image capturing. In order to reduce the release time lag, it is necessary to communicate necessary information between the camera and lens microcomputers 205 and 111 at a high speed. Therefore, it is necessary in both the first and second communication settings to enable, when the communication error occurs, promptly restarting a normal communication.

Accordingly, in this embodiment, the camera microcomputer 205 changes, depending on a number of times (frequency) of the communication error detected by the camera microcomputer 205, a period (cycle) of a connection confirmation process for confirming a connection between the camera body 200 and the interchangeable lens 100.

Figure 17:
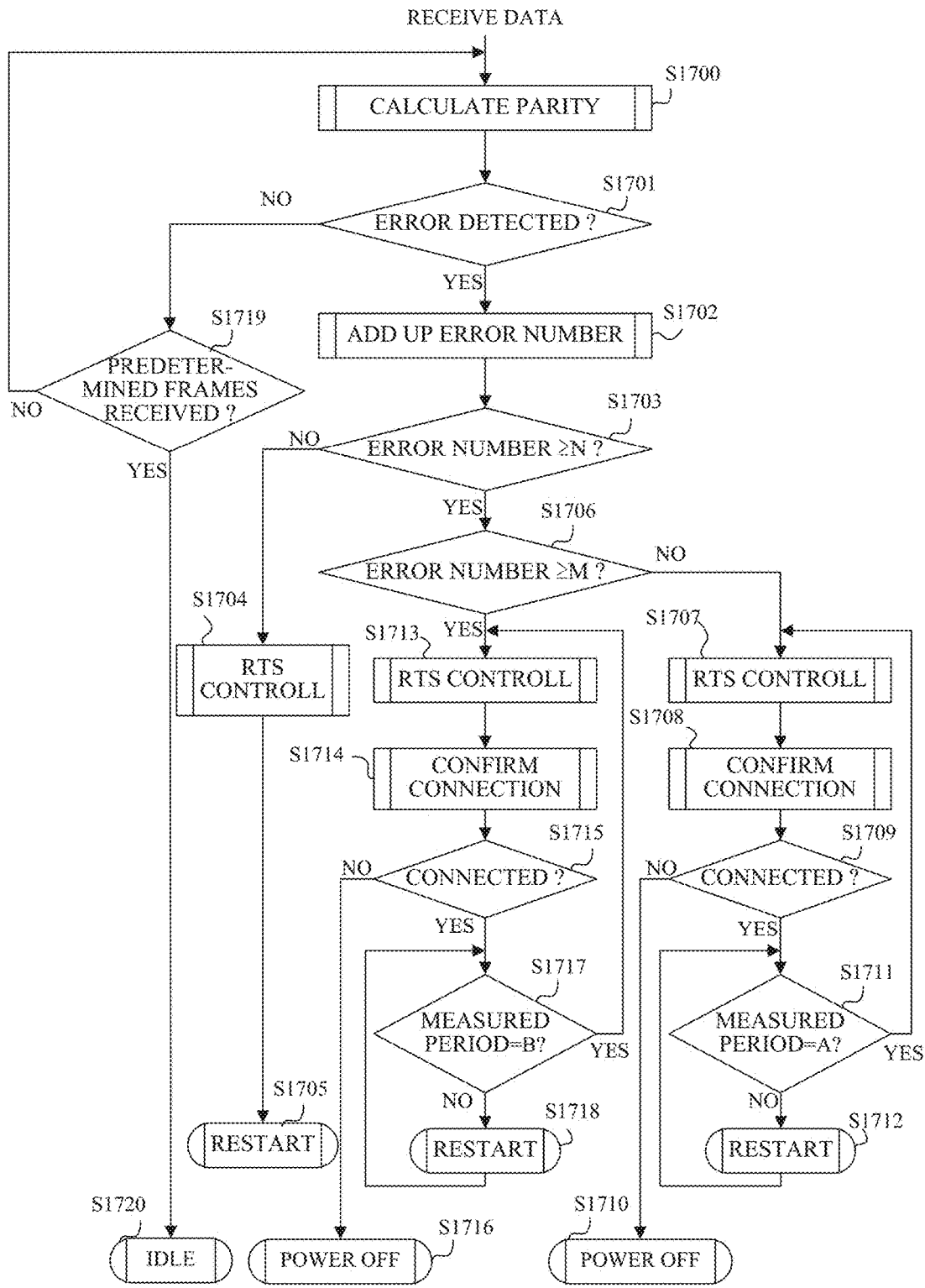
FIG. 17 is a flowchart illustrating an error process in the first communication setting in Embodiment 4.

FIG. 17 is a flowchart illustrating an error process performed by the camera microcomputer 205 when the communication error occurs in the non-BUSY addition mode in the first communication setting. The camera microcomputer 205 executes this process according to a communication control program as a computer program. In the following description, the camera microcomputer 205 asserts the request-to-send signal RTS and then maintains this assertion to perform burst communication. In addition, the following description will be made of a case of detecting a parity error as the communication error. However, the communication error may be other errors such as a framing error.

At step (abbreviated by S in FIG. 17) 1700, the camera microcomputer 205 calculates a parity of the lens data signal DLC received from the lens microcomputer 111. Next, at step 1701, the camera microcomputer 205 determines whether or not the calculation result of the parity includes an error (parity error). If the calculation result does not include the parity error, the camera microcomputer 205 proceeds to step 1719. At step 1719, the camera microcomputer 205 determines whether or not receipt of the whole frames (predetermined frames) of the lens data signal DLC has been completed. If the receipt of the whole frames has been completed, the camera microcomputer 205 at step 1720 enters into a communication standby (IDLE) state. If the receipt of the whole frames has not been yet completed, the camera microcomputer 205 returns to step 1700.

On the other hand, if at step 1701 detecting the parity error, the camera microcomputer 205 at step 1702 counts a number of times of detecting the parity error (the number of times is hereinafter referred to as "a parity error number"). That is, the camera microcomputer 205 counts up the parity error number at each detection of the parity error.

Next, at step 1703, the camera microcomputer 205 determines whether or not the parity error number is equal to or greater than a threshold N. If the parity error number is less than the threshold N, the camera microcomputer 205 at step 1704 temporarily negates the request-to-send signal RTS to suspend the burst communication. Then (after a predetermined time has elapsed), the camera microcomputer 205 at step 1705 asserts the request-to-send signal RTS to restart the burst communication. Specifically, the camera microcomputer 205 causes the lens microcomputer 111 to reperform transmission of the lens data signal DLC from its restart frame subsequent to its suspension frame at which the burst communication has been suspended. Thereby, the restart of the burst communication is performed at step 1705. The restart of the burst communication described above is also performed at other steps for restarting the burst communication. The burst communication may be restart from its beginning.

If at step 1703 the parity error number is equal to or more than the threshold N, the camera microcomputer 205 proceeds to step 1706 to determine whether or not the parity error number is equal to or more than a threshold M (>N). If the parity error number is less than the threshold M, the camera microcomputer 205 at step 1707 temporarily negates the request-to-send signal RTS to suspend the burst communication. Then, the camera microcomputer 205 at step 1708 performs a connection confirmation communication with the lens microcomputer 111 as the connection confirmation process. Specifically, the camera microcomputer 205 performs the connection confirmation communication by transmitting the camera data signal DCL of one frame to the lens microcomputer 111 and receiving the lens data signal DLC of one frame transmitted in response thereto from the lens microcomputer 111. In addition, the camera microcomputer 205 measures an elapsed time from the connection confirmation communication.

The camera microcomputer 205 at step 1709 determines whether or not the connection with the lens microcomputer 111 is confirmed by the connection confirmation communication. If the connection with the lens microcomputer 111 is not confirmed, the camera microcomputer 205 at step 1710 shuts down a power supply for the interchangeable lens 100. In this case, the camera microcomputer 205 reactivates the power supply for the interchangeable lens 100 in order to reestablish a normal connection and a normal communication.

On the other hand, if the connection with the lens microcomputer 111 is confirmed at step 1709, the camera microcomputer 205 at step 1711 determines whether or not the elapsed time counted from step 1708 has reached a time corresponding to a predetermined period (first period) A. If the elapsed time counted from step 1708 has reached the time corresponding to the predetermined period A, the camera microcomputer 205 returns, via step 1707, to step 1708 to reperform the connection confirmation communication with the lens microcomputer 111.

If the elapsed time counted from step 1708 has not reached the time corresponding to the predetermined period A, the camera microcomputer 205 proceeds to step 1712. At step 1712, the camera microcomputer 205 asserts the request-to-send signal RTS to restart the burst communication. Then, the camera microcomputer 205 returns to step 1711 and returns, upon the elapsed time counted from step 1708 having reached the time corresponding to the predetermined period A, via step 1707 to step 1708 to reperform the connection confirmation communication with the lens microcomputer 111. In this way, the camera microcomputer 205 performs, when the parity error number is N or more and less than M, the connection confirmation communication with the lens microcomputer 111 with the predetermined period A.

If at step 1706 the parity error number is M or more, the camera microcomputer 205 at step 1711 temporarily negates the request-to-send signal RTS to suspend the burst communication. Then, the camera microcomputer 205 at step 1714 performs, as at step 1708, the connection confirmation communication with the lens microcomputer 111. In addition, the camera microcomputer 205 starts counting the elapsed time from the connection confirmation communication.

Next, the camera microcomputer 205 at step 1715 determined whether or not the connection with the lens microcomputer 111 is confirmed by the connection confirmation communication. If the connection with the lens microcomputer 111 is not confirmed, the camera microcomputer 205 at step 1716 shuts down the power supply for the interchangeable lens 100. Also in this case, the camera microcomputer 205 reactivates the power supply for the interchangeable lens 100 in order to reestablish a normal connection and a normal communication. On the other hand, if the connection with the lens microcomputer 111 is confirmed at step 1715, the camera microcomputer 205 at step 1717 determines whether or not the elapsed time counted from step 1714 has reached a time corresponding to a predetermined period (second period) B. The predetermined period B is shorter than the predetermined period A. If the elapsed time counted from step 1714 has reached the time corresponding to the predetermined period B, the camera microcomputer 205 returns, via step 1713, to step 1714 to reperform the connection confirmation communication with the lens microcomputer 111.

At step 1711, if the elapsed time counted from step 1714 has not reached the time corresponding to the predetermined period B, the camera microcomputer 205 proceeds to step 1718. At step 1718, the camera microcomputer 205 asserts the request-to-send signal RTS to restart the burst communication. Then, the camera microcomputer 205 returns to step 1717 and returns, upon the elapsed time counted from step 1714 having reached the time corresponding to the predetermined period B, via step 1713 to step 1714 to reperform the connection confirmation communication with the lens microcomputer 111. In this way, the camera microcomputer 205 performs, when the parity error number is M or more, the connection confirmation communication with the lens microcomputer 111 with the predetermined period B.

As described above, in the first communication setting, when the parity error number is N or more and less than M, the camera microcomputer 205 performs the connection confirmation communication with the lens microcomputer 111 with the predetermined period A. On the other hand, when the parity error number is M or more, the camera microcomputer 205 performs the connection confirmation communication with the lens microcomputer 111 with the predetermined period B shorter than the predetermined period A. That is, the camera microcomputer 205 reduces the period with which the connection confirmation communication with the lens microcomputer 111 is performed as the number of times of detecting the communication error increases, which enables completing the burst communication while avoiding the shutdown of the power supply for the interchangeable lens 100 as far as possible. In other words, the camera microcomputer 205 can restart the communication with the lens microcomputer 111 without reactivating the interchangeable lens 100 from a power-off state.

Figure 18:
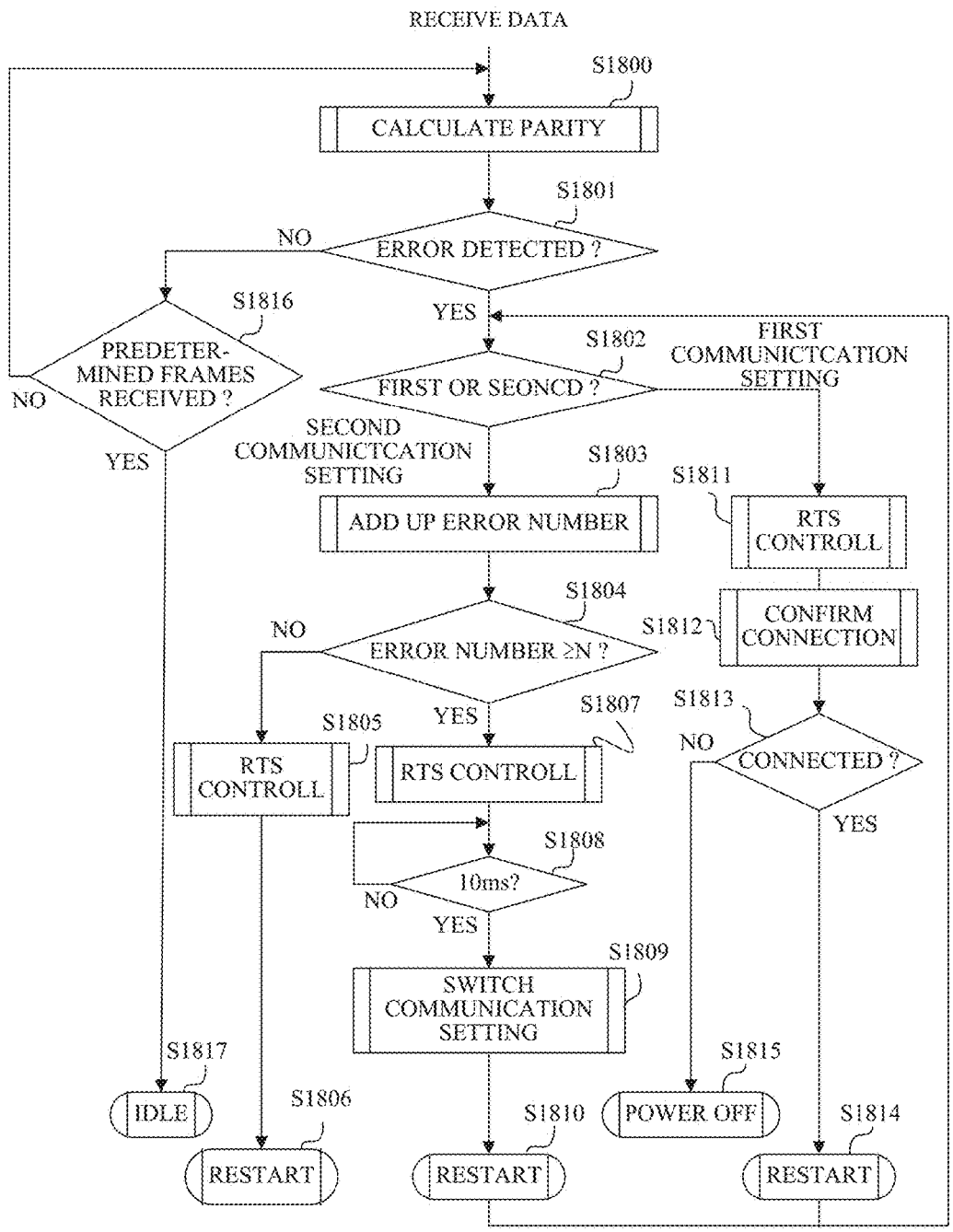
FIG. 18 is a flowchart illustrating an error process in the second communication setting in Embodiment 4.

FIG. 18 is a flowchart illustrating an error process performed by the camera microcomputer 205 when the communication error occurs in the second communication setting. Furthermore, FIG. 18 illustrates a process performed by the camera microcomputer 205 when the communication error occurs after the communication setting is switched from the second communication setting to the first communication setting. The camera microcomputer 205 executes this process according to the above-mentioned communication control program as the computer program. Also in the following description, the camera microcomputer 205 asserts the request-to-send signal RTS and then maintains this assertion to perform burst communication. In addition, the following description will also be made of the case of detecting the parity error as the communication error. However, the communication error may be other errors such as the framing error.

At step 1800, the camera microcomputer 205 calculates a parity of the lens data signal DLC received from the lens microcomputer 111. Next, at step 1801, the camera microcomputer 205 determines whether or not the calculation result of the parity includes the parity error. If the calculation result does not include the parity error, the camera microcomputer 205 proceeds to step 1816. At step 1816, the camera microcomputer 205 determines whether or not receipt of the whole frames (predetermined frames) of the lens data signal DLC has been completed. If the receipt of the whole frames has been completed, the camera microcomputer 205 at step 1817 enters into a communication standby (IDLE) state. If the receipt of the whole frames has not been yet completed, the camera microcomputer 205 returns to step 1800.

On the other hand, if at step 1801 detecting the parity error, the camera microcomputer 205 at step 1802 whether the current communication setting is the first communication setting or the second communication setting. If the current communication setting is the second communication setting, the camera microcomputer 205 proceeds to step 1803. At step 1803, the camera microcomputer 205 counts the parity error number, that is, the camera microcomputer 205 counts up the parity error number at each detection of the parity error.

Next, at step 1804, the camera microcomputer 205 determines whether or not the parity error number is equal to or greater than the threshold N. If the parity error number is less than the threshold N, the camera microcomputer 205 at step 1805 temporarily negates the request-to-send signal RTS to suspend the burst communication. Then (after the predetermined time has elapsed), the camera microcomputer 205 at step 1806 asserts the request-to-send signal RTS to restart the burst communication. Specifically, the camera microcomputer 205 causes the lens microcomputer 111 to reperform transmission of the lens data signal DLC from its restart frame subsequent to its suspension frame at which the burst communication has been suspended. Thereby, the restart of the burst communication is performed at step 1806. The restart of the burst communication described above is also performed at other steps for restarting the burst communication. The burst communication may be restart from its beginning.

If at step 1804 the parity error number is equal to or more than the threshold N, the camera microcomputer 205 proceeds to step 1807. At step 1807, the camera microcomputer 205 temporarily negates the request-to-send signal RTS to suspend the burst communication. Then, the camera microcomputer 205 maintains at step 1808 the negation of the request-to-send signal RTS for a predetermined time (for example, 10 ms) and thereafter at step 1809 switches the communication setting from the second communication setting to the first communication setting. Simultaneously, the camera microcomputer 205 at step 1808 instructs the lens microcomputer 111 to switch from the second communication setting to the first communication setting. Then, the camera microcomputer 205 proceeds to step 1810 to assert the request-to-send signal RTS to restart the burst communication.

When detecting at step 1801 the parity error after restarting the burst communication, the camera microcomputer 205 at step 1802 redetermines whether or not the current communication setting is the first communication setting or the second communication setting. If the current communication setting is the first communication setting, the camera microcomputer 205 proceeds to step 1811. The camera microcomputer 205 at step 1811 temporarily negates the request-to-send signal RTS to suspend the burst communication. Then, the camera microcomputer 205 at step 1812 performs the connection confirmation communication with the lens microcomputer 111. The connection confirmation communication performed here is the same as those performed at steps 1708 and 1714 in FIG. 17.

Next, the camera microcomputer 205 at step 1813 determines whether or not the connection with the lens microcomputer 111 is confirmed by the connection confirmation communication. If the connection with the lens microcomputer 111 is not confirmed, the camera microcomputer 205 at step 1815 shuts down a power supply for the interchangeable lens 100. In this case, the camera microcomputer 205 reactivates the power supply for the interchangeable lens 100 in order to reestablish a normal connection and a normal communication. On the other hand, if the connection with the lens microcomputer 111 is confirmed at step 1813, the camera microcomputer 205 at step 1814 asserts the request-to-send signal RTS to restart the burst communication.

As described above, when the parity error number is N or more, the camera microcomputer 205 switches the communication setting from the second communication setting to the first communication setting. Thereby, when the communication errors frequently occurs in the second communication setting, the camera microcomputer 205 can receive the lens data signal DLC from the lens microcomputer 111 without using the second communication setting (that is, the second data communication channel).

In this embodiment, in a case of using an interchangeable lens not supporting the asynchronous serial communication, but supporting the clock-synchronous serial communication, the camera microcomputer 205 may communicate with a lens microcomputer of the interchangeable lens using the clock-synchronous serial communication.

Furthermore, in this embodiment, an extender as an intermediate accessory may be attached between the camera body 200 and the interchangeable lens 100. In this case, even though the interchangeable lens 100 is detached from the extender, the camera microcomputer 205 does not recognize the detachment of the interchangeable lens 100 because the extender is attached to the camera body 200.

Therefore, although the camera microcomputer 205 tries communication with the interchangeable lens 100 (lens microcomputer 111) using the asynchronous serial communication, the communication does not succeed. In such a case, the camera microcomputer 205 is desirable to use the clock-synchronous serial communication.

This embodiment switches the communication setting depending on the number of times of detecting the communication error to avoid using an error-prone communication setting, which enables completing the burst communication in a short time without reactivating the communication from an initial state as far as possible.

Next, description will be made of an error process for more promptly detecting the communication error. Specifically, description will be made of an embodiment of an image-capturing apparatus whose camera controller changes, depending on a number of times (frequency) of detecting the communication error, a frame to which a parity bit is added. The camera controller may change a data communication speed when adding the parity bit.

Figure 19:
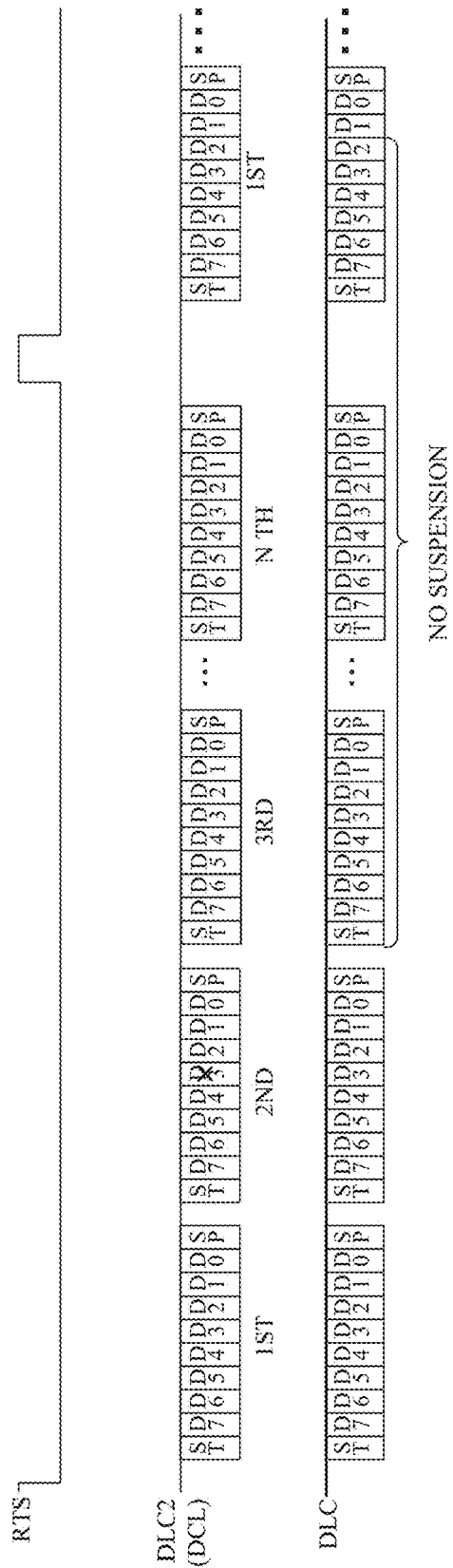
FIG. 19 is a time chart illustrating communication problems in the second communication setting between the camera body and the interchangeable lens in Embodiment 4.

FIG. 19 illustrates signal waveforms when the communication error occurs during the burst communication in the second communication setting. In the burst communication illustrated in FIG. 19, in order to shorten an effective communication time, no parity bit is added to each frame. The camera microcomputer 205 determines whether or not the communication error occurs by using a checksum calculated at the time of completion of the burst communication. Therefore, even if the communication error occurs in a second frame (indicated by x in FIG. 19), the burst communication is performed to its end, and in response to detecting the communication error at the time of the completion of the burst communication, the burst communication is reperformed. This also applied to a case of using the first communication setting. However, such an error process repeats the entire burst communication twice, which takes a long time until the communication is completed.

Figure 20:
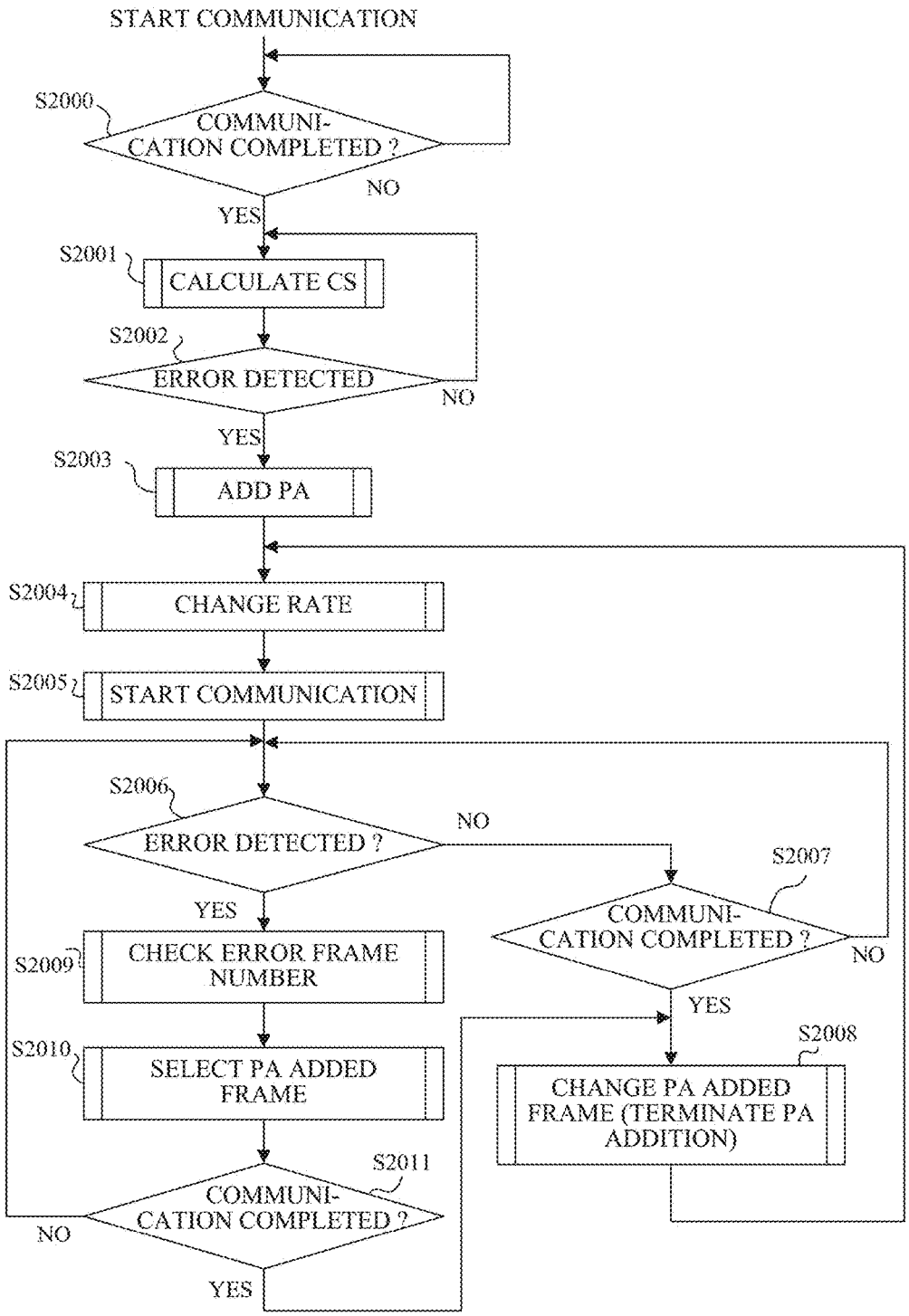
FIG. 20 is a flowchart illustrating an error process in the second communication setting in Embodiment 4.

FIG. 20 is a flowchart illustrating an error process performed by the camera microcomputer 205 when the communication error occurs in the second communication setting. In this error process, the communication error first detected is a checksum error. However, the first detected communication error may be an error other than the checksum error. The camera microcomputer 205 executes this process according to a communication control program as a computer program.

The camera microcomputer 205 asserts the request-to-send signal RTS and then maintains this assertion to perform the burst communication. At step (abbreviated by S in FIG. 20) 2000, the camera microcomputer 205 determines whether or not the burst communication has been completed. If the burst communication has not been yet completed, the camera microcomputer 205 proceeds to step 2001.

At step 2001, the camera microcomputer 205 calculates a checksum (CS) of each of the first and second lens data signals DLC and DLC2 received from the lens microcomputer 111. The camera microcomputer 205 further calculates checksums for data D0 to D7 in each frame.

Next, at step 2002, the camera microcomputer 205 determines whether or not the calculated checksums include the checksum error. If the calculated checksums include the checksum error, the camera microcomputer 205 at step 2003 adds a parity bit PA to each frame of the first and second lens data signals DLC and DLC2. Furthermore, the camera microcomputer 205 at step 2004 changes a communication bit rate as a communication speed between the camera and lens microcomputer 205 and 111. Specifically, the camera microcomputer 205 increases the communication bit rate from before the change. At step 2005 the camera microcomputer 205 starts the burst communication at the changed (increased) communication bit rate.

Thereafter, the camera microcomputer 205 at step 2006 determines, during the burst communication, presence or absence of a parity error by using the parity bit PA added to each frame. If detecting the parity error, the camera microcomputer 205 at step 2009 counts a number of frames in which the parity error is detected (that is, a number of times of detecting the parity error). The number of frames is hereinafter referred to as "a parity error frame number". Then, the camera microcomputer 205 at step 2010 selects, depending on the parity error frame number, at least one frame to which the parity bit PA is added in a subsequent burst communication. For example, the camera microcomputer 205 selects the frame(s) to which the parity bit PA is added such that, when the parity error frame number is equal to or more than a predetermined number as a threshold, the parity bit PA is added to the whole frames, and when the parity error frame number is less than the predetermined number, the parity bit PA is added to each two frames. In this way, in this embodiment, the camera microcomputer 205 changes the frame to which the parity bit PA is added depending on the number of times of detecting the communication error.

At step 2011, the camera microcomputer 205 determines whether or not the current burst communication has been completed. If the current burst communication has not been yet completed, the camera microcomputer 205 returns to step 2006. If the current burst communication has been completed, the camera microcomputer 205 proceeds to step 2008.

On the other hand, if detecting no parity error at step 2006, the camera microcomputer 205 proceeds to step 2007 to determine whether or not the current burst communication has been completed. If the current burst communication has not been yet completed, the camera microcomputer 205 returns to step 2006. If the current burst communication has been completed, the camera microcomputer 205 proceeds to step 2008.

At step 2008, the camera microcomputer 205 adds the parity bit PA to the first and second lens data signals DLC and DLC2 to be transmitted in the subsequent burst communication. At this step, the camera microcomputer 205 having proceeded to step 2008 via step 2010 adds the parity bit PA only to the frame(s) selected at step 2010. Then, the camera microcomputer 205 returns to step 2004. Thus, at next step 2005, the subsequent burst communication of the first and second lens data signals DLC and DLC2 in which the parity bit PA is added to their only selected frame is performed.

On the other hand, the camera microcomputer 205 having proceeded to step 2008 from step 2007 terminates adding the parity bit PA to the first and second lens data signals DLC and DLC2 to be transmitted in the subsequent burst communication and then returns to step 2004. At this step, the camera microcomputer 205 changes the communication bit rate changed at step 2004 for the subsequent burst communication to its original bit rate. Furthermore, the camera microcomputer 205 detects the communication error by using the checksum.

The camera microcomputer 205 repeats the above-described process until the whole burst communication is completed.

Figure 21:
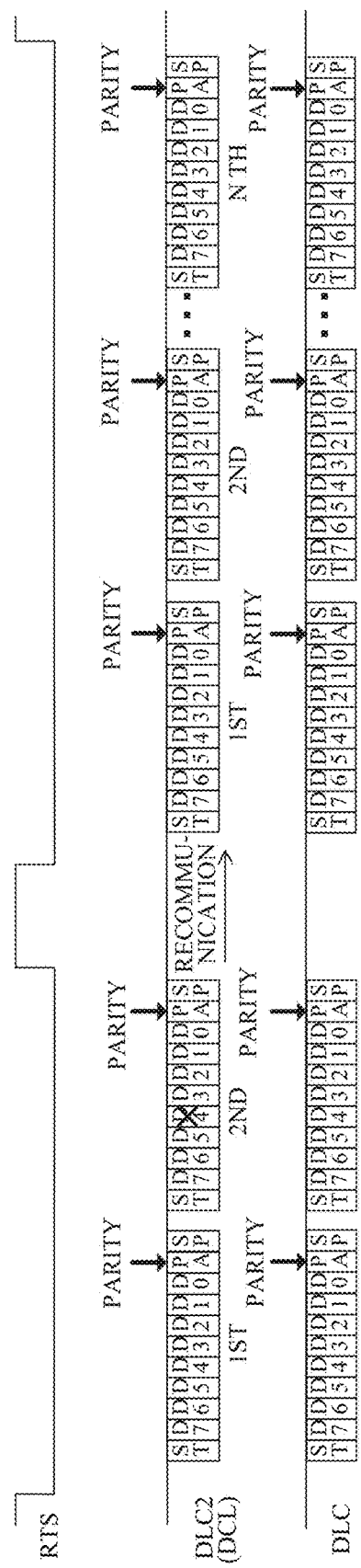
FIG. 21 illustrates a data format (parity bit is added) when a communication error occurs in the second communication setting in Embodiment 4.

FIG. 21 illustrates the first and second lens data signals DLC and DLC2 whose each frame includes the parity bit (Parity) PA added at step 2003 in the above error process. At step 2003, the camera microcomputer 205 adds the parity bit PA to all the frames of the first and second lens data signals DLC and DLC2.

The camera microcomputer 205 performs the burst communication at the following communication bit rates:

RATE $A$<RATE $B$ where RATE A represents a communication bit rate before the parity bit PA is added, and RATE B represents a communication bit rate after the parity bit PA is added.

In this error process, for example, if the communication error (parity error) is detected in a second frame (indicated by x in FIG. 21), the camera microcomputer 205 discontinues the burst communication at the second frame. Then, the camera microcomputer 205 adds the parity bit PA to all the frames and promptly restart the burst communication. Thereafter, in response to detecting the communication error (parity error) by using the added parity bit, the camera microcomputer 205 suspends the burst communication and then promptly restart the burst communication. Accordingly, the whole burst communication is completed in a short time.

Figure 22:
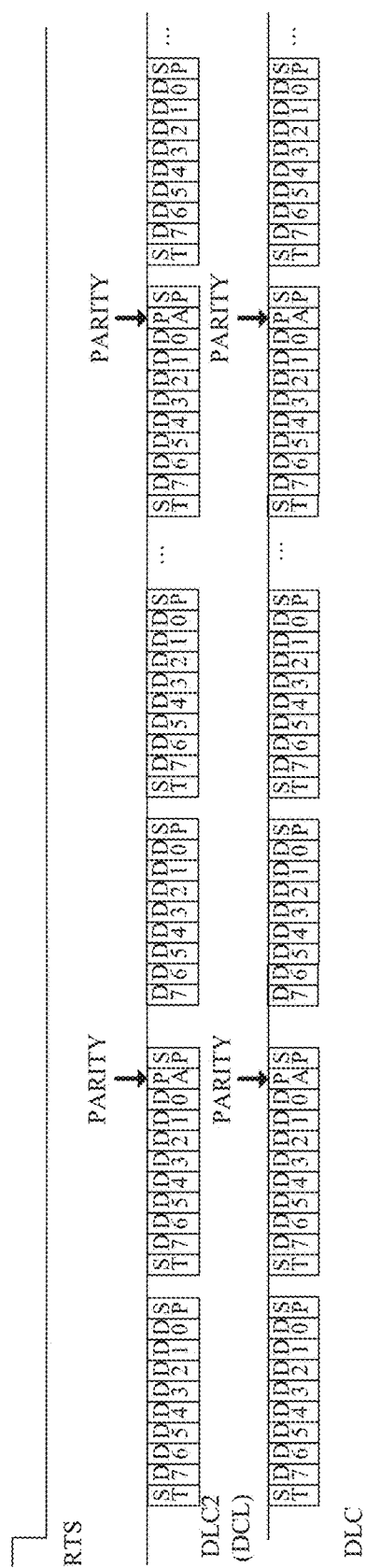
FIG. 22 illustrates a data format (discrete parity bit is added) when a communication error occurs in the second communication setting in Embodiment 4.

FIG. 22 illustrates the first and second lens data signals DLC and DLC2 whose each frame includes the parity bit (Parity) PA added at step 2010 in the error process illustrated in FIG. 20.

At step 2010, the camera microcomputer 205 adds the parity bit PA to, among all the frames of the first and second lens data signals DLC and DLC2, discretely selected frames (for example, to each two frames). Adding the parity bit PA not to all the frames, but to such discretely selected frames enables shorten the time required for the burst communication without increasing the communication speed.

As described above, this embodiment changes the frame (s) to which the parity bit is added, depending on the number of times of detecting the communication error, so that the parity bit is added to only a required number of frames. Thereby, this embodiment enables detecting the communication error during (that is, in the middle of) the burst communication and shortening the time required for the burst communication.

Although this embodiment described the error process in the burst communication in the second communication setting, a similar error process to the error process in this embodiment can be performed in the communication in the first communication setting.

Embodiment 5

Next, description will be made of a fifth embodiment (Embodiment 5) of the present invention. This embodiment is a modified example of an image-capturing apparatus whose camera controller changes, depending on the number of times (frequency) of detecting the communication error, a data length (burst length) in the data communication as the burst communication.

Figure 23:
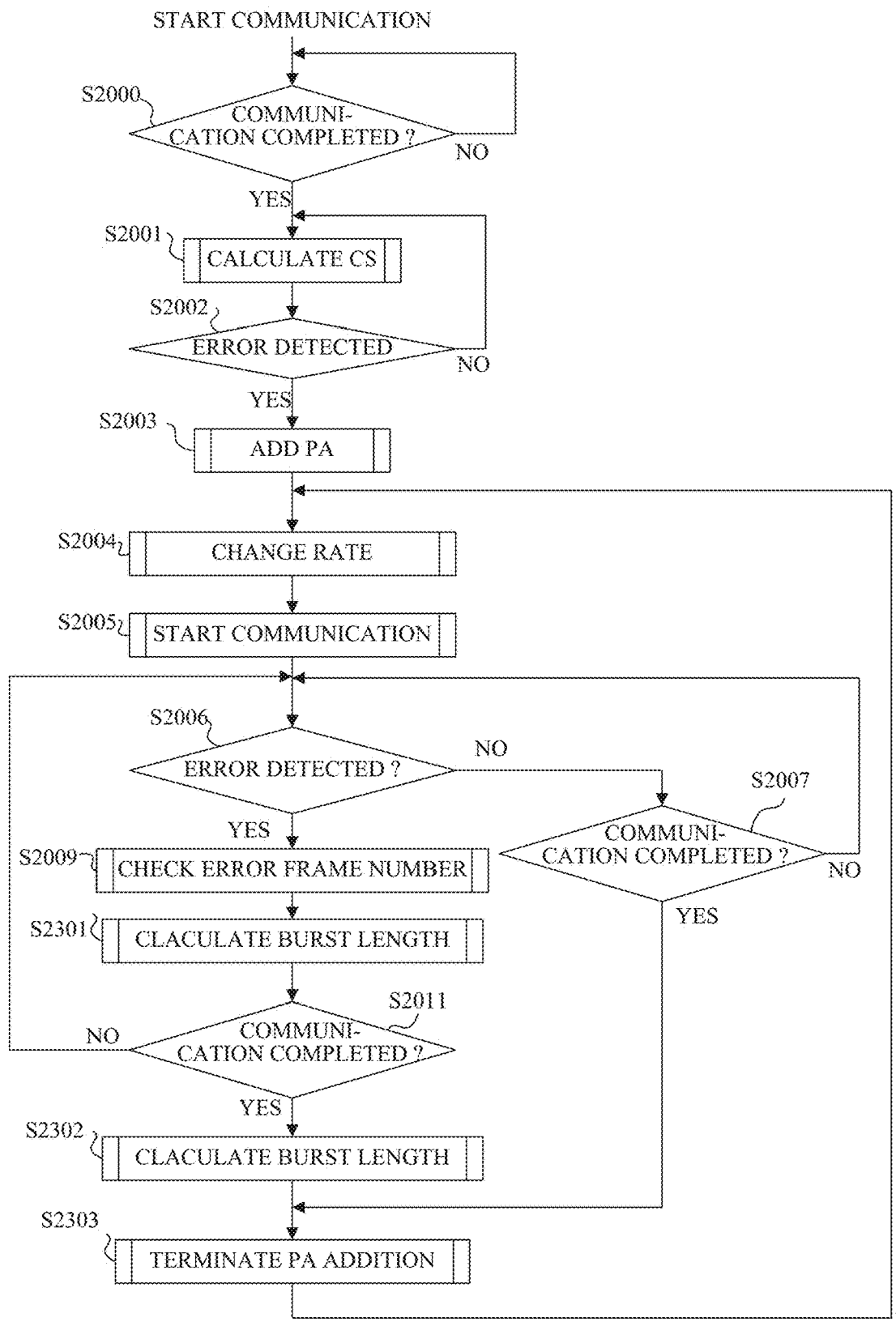
FIG. 23 is a flowchart illustrating an error process in a second communication setting in Embodiment 5.

FIG. 23 is a flowchart illustrating an error process performed by the camera microcomputer 205 when the communication error occurs in the second communication setting. The camera microcomputer 205 executes this process according to a communication control program as a computer program. In this error process, the communication error first detected is a checksum error. However, the first detected communication error may be an error other than the checksum error.

Steps 2000 to 2007, step 2009 and step 2011 in FIG. 23 are the same as steps 2000 to 2007, step 2009 and step 2011 in FIG. 20 of Embodiment 4.

At step 2301, the camera microcomputer 205 calculates, depending on the parity error frame number calculated at step 2009, the data length (burst length) of a subsequent burst communication. For example, the camera microcomputer 205 calculates a normal burst length (illustrated as N in FIG. 19) if the parity error frame number is less than a predetermined number (threshold) and calculates a shorter burst length than the normal burst length. In this way, the camera microcomputer 205 changes the burst length depending on the number of times of detecting the communication error.

Then, the camera microcomputer 205 having determined at step 2011 that the current burst communication has been completed proceeds to step 2302. At step 2302, the camera microcomputer 205 sets (changes) the burst length of the first and second lens data signals DLC and DLC2 to be transmitted in the subsequent burst communication to the burst length calculated at step 2301. Furthermore, the camera microcomputer 205 at step 2303 terminates the addition of the parity bit and then returns to step 2004. Thereby, at next step 2005, the subsequent burst communication whose burst length is changed is performed.

On the other hand, the camera microcomputer 205 having determined at step 2007 that the current burst communication has been completed and proceeding to step 2303 terminates the addition of the parity bit to the first and second lens data signals DLC and DLC2 to be transmitted in the subsequent burst communication. Then, the camera microcomputer 205 returns to step 2004. The camera microcomputer 205 changes the communication bit rate changed at step 2004 to its original communication bit rate.

The camera microcomputer 205 repeats the above-described process until the whole burst communication is completed.

Figure 24:
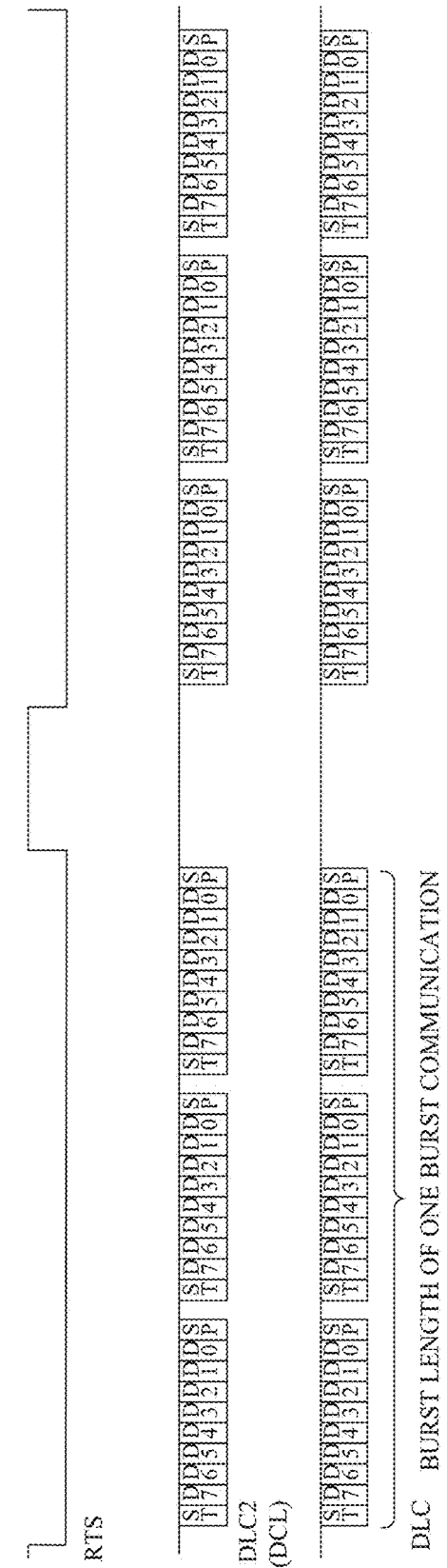
FIG. 24 illustrates a data format (burst length is changed) when a communication error occurs in the second communication setting in Embodiment 5 of the present invention.

FIG. 24 illustrates the first and second lens data signals DLC and DLC2 whose each burst length are changed at steps 2301 and 2302 in the error process illustrated in FIG. 23. FIG. 24 illustrates an example that the burst length of one burst communication is changed to be shorter than the normal burst length; the changed burst length is "3".

In this error process, for example, if the communication error (parity error) is detected in a second frame (indicated by x in FIG. 24), the camera microcomputer 205 discontinues the burst communication at the second frame. Then, as illustrated in FIG. 21, the camera microcomputer 205 adds the parity bit PA to all the frames and promptly restart the burst communication. Thereafter, when the parity error frame number becomes equal to or more than the predetermined number, the camera microcomputer 205 shortens the burst length of the subsequent burst communication without addition of the parity bit. That is, shortening the burst length of one burst communication with no addition of the parity bit to each frame and repeating the burst communication with short intervals enables promptly detecting the checksum error. Thus, the whole burst communication is completed in a short time.

When the communication error is not detected in the subsequent burst communication, the burst length may be changed to be longer than the changed burst length, for example, to the normal burst length.

This embodiment changes the burst length depending on the number of times of detecting the communication error so at to make the detection of the communication error easier, which enables shortening the time required for the burst communication.

Although this embodiment described the error process in the burst communication in the second communication setting, a similar error process to the error process in this embodiment can be performed in the communication in the first communication setting.

Embodiment 6

Next, description will be made of a sixth embodiment (Embodiment 6) of the present invention. In order to correctly perform data communication by asynchronous serial communication, it is necessary to limit a phase relation between a transmitting data output time and a received data sampling time within a predetermined allowable range. However, this phase relation is shifted depending on stabilities of clock signals respectively generated in the image-capturing apparatus and the accessory apparatus. Therefore, in order to prevent received data from being unable to be correctly sampled during the communication, a communicable data amount (frame number) in one communication is limited. When performing a large volume data communication, it is necessary to perform the communication in multiple times, which results in decrease in effective communication rate. Thus, after setting a baud rate, detecting a time length of each frame and updating the baud rate depending on the time length may correct the shift of the phase relation between the transmitting data output time and the received data sampling time.

However, even though a maximum communicable data amount in one communication is increased, a limitation on a data size transmittable in one frame causes a necessity of increasing a frame number in order to increase a communicated data amount. In this case, a bit for adjusting the phase relation between the transmitting data output time and the received data sampling time is inserted, which results in decrease in effective communication rate.

Thus, this embodiment performs a communication process (communication control) capable of improving the effective communication rate while increasing the communicated data amount This embodiment is one of embodiments of an image-capturing apparatus that receives lens data including at least one frame from an accessory apparatus and transmits camera data including at least one frame to the accessory apparatus. Each of the lens data and the camera data includes a start field, a data field and an end field. A camera controller in the image-capturing apparatus changes, depending on individual information of the image-capturing apparatus and individual information of the accessory apparatus, at least a configuration of the data field (hereinafter referred to as "a data field configuration"). Not only the data field configuration, but also a configuration of the end field (hereinafter referred to as "an end field configuration") may be changed.

The individual information of each of the image-capturing apparatus and the accessory apparatus includes information on stability of a clock signal generated in that apparatus and information on temperature of that apparatus. Furthermore, the individual information includes information on a baud rate supported by that apparatus.

Changing the data field configuration (or the end field configuration) includes, for example, changing a data length (bit number) of that field. It is desirable to change the data field configuration such that the phase relation between the transmitting data output time and the received data sampling time is within the predetermined allowable range.

As illustrated in FIGS. 4A and 12A, the data field in one frame is normally defined by 8 bits because it is necessary that the phase relation between the transmitting data output time and the received data sampling time is within the predetermined allowable range. As described above, this phase relation is shifted depending on the stabilities of the clock signals (each hereinafter referred to as "a clock stability") respectively generated in the camera body 200 and the interchangeable lens 100. However, as the camera body 200 and the interchangeable lens 100, various types of camera bodies and interchangeable lenses are used in combination, and there are some combinations that, even when the bit number of the data field is increased, the phase relation is within the predetermined allowable range. It is known that the clock stability is changed due to an influence of temperature. In the following description, a method of improving the effective communication rate by changing the data field configuration.

Figure 2:
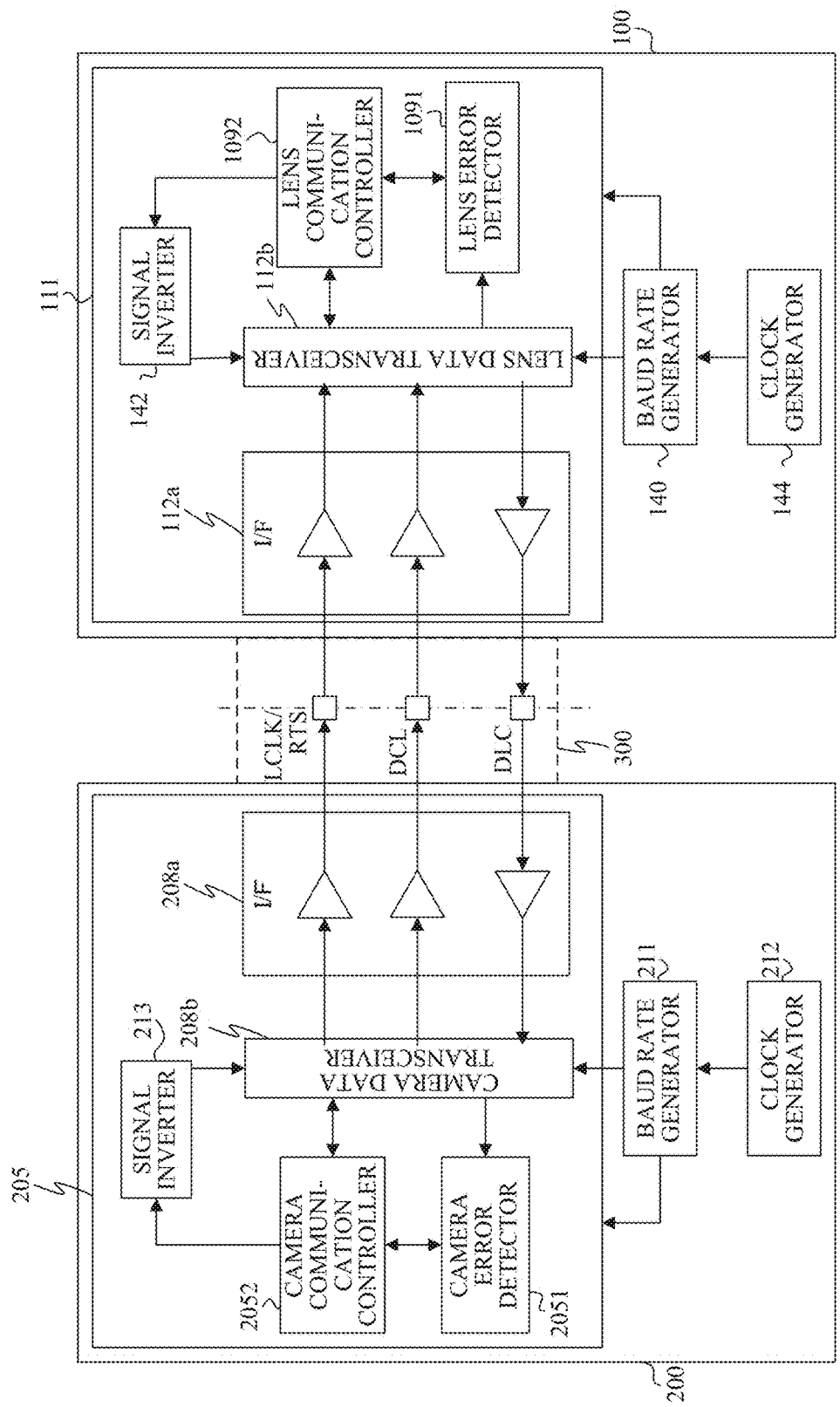
FIG. 2 illustrates a communication circuit between a camera body and an interchangeable lens in Embodiment 1.

In this embodiment, the camera body 200 and the interchangeable lens 100 have, for example, the same configurations as those illustrated in FIG. 2. That is, the camera body 200 and the interchangeable lens 100 respectively have the clock generators 212 and 144, the baud rate generators 211 and 140. The camera microcomputer 205 and the lens microcomputer 111 respectively include the camera error detector 2051 and the lens error detector 1091.

FIG. 25A illustrates waveforms of the lens data signal DLC and the camera data signal DCL when the data field in one frame of each data signal is expanded in the first communication setting described in Embodiment 1. The one frame of each of the lens data signal DLC and the camera data signal DCL includes the start field, an expanded data field and the end field. The expanded data field in this embodiment is constituted by data of 12 bits from a second bit to a thirteenth bit. The data bits are arranged in an MSB-first format starting from a highest-order data bit D11 and continuing to data bits D10, D9, D8, D7, D6, D5,D4, D3,D2 and D1 in this order and ending with a lowest-order data bit D0. The start bit and the end field are the same as those described in Embodiment 1.

Although this embodiment describes the case where the data field is constituted by 12 bits, this is an example, and the data field may be constituted by any other number of bits as long as the phase relation between the transmitting data output time and the received data sampling time of the camera and lens microcomputers 205 and 111 is within the predetermined allowable range. In addition, the numbers of bits in the data fields of the lens and camera data signals DLC and DCL may be different from each other.

FIG. 25B illustrates signal waveforms when two frames of each of the lens data signal DLC and the camera data signal DCL are continuously communicated in the non-BUSY addition mode described in Embodiment 1; each frame is the same as that illustrated in FIG. 25A.

Prior to starting this communication, the camera microcomputer 205 notifies the lens microcomputer 111, by the camera data signal DCL of one frame illustrated in FIG. 4A, of data size information (two frames in this description) of the camera data signal DCL to be transmitted. Furthermore, the camera microcomputer 205 notifies the camera microcomputer 111 of a frame configuration (described later) including the data field configuration.

The camera microcomputer 205 asserts the request-to-send signal RTS when an event for starting the communication with the lens microcomputer 11 occurs. Thereafter, in the non-BUSY addition mode in which it is unnecessary to negate the request-to-send signal RTS at each frame, the camera microcomputer 205 maintains the assertion of the request-to-send signal RTS while performing continuous data communication with the lens microcomputer 111.

The lens microcomputer 111 performs, in response to detecting a transmission request by the assertion of the request-to-send signal RTS, a process for producing the lens data signal DLC to be transmitted to the camera microcomputer 205. Then, after a preparation for transmitting the lens data signal DLC is completed, the lens microcomputer 111 starts transmitting a first frame DL1 of the lens data signal DLC to the camera microcomputer 205 through the first data communication channel.

The lens microcomputer 111 having transmitted the data frame of the first frame of the lens data signal DLC rechecks the request-to-send signal RTS. If the request-to-send signal RTS is asserted, the lens microcomputer 111 transmits, after the first frame whose transmission has been completed, a second frame DL2 of the lens data signal DLC to the camera microcomputer 205. Then, if the transmission of the two frames indicated in the data size information is completed, the camera microcomputer 205 negates the request-to-send signal RTS, and thereby the transmission of the lens data signal DLC is stopped.

The data field configuration illustrated in FIG. 25B in this embodiment is equal to that illustrated in FIG. 12A in data amount of 24 bits (3 bytes). However, the data field configuration in FIG. 12A requires three frames for transmitting the 24-bit data, and on the other hand, the data field configuration in FIG. 25B requires two frames for transmitting the 24-bit data. Therefore, this embodiment enables reducing numbers of the start bits ST and the stop bits SP inserted into the camera and lens data signals DCL and DLC as compared with the case of FIG. 12A, which increases the effective communication rate.

Figure 26:
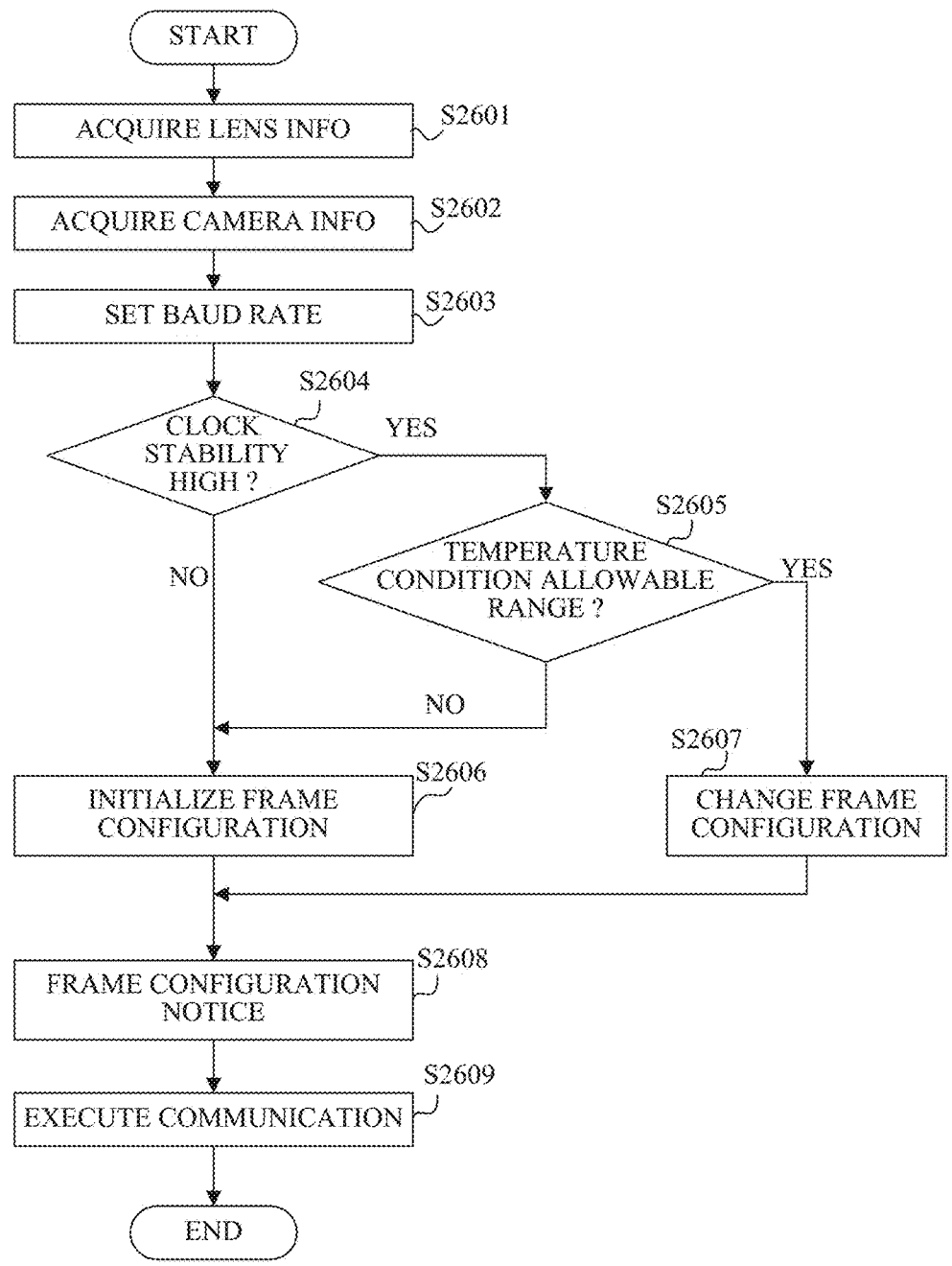
FIG. 26 is a flowchart illustrating a communication process in Embodiment 6.

FIG. 26 is a flow chart illustrating a communication process performed by the camera microcomputer 205 in this embodiment. The camera microcomputer 205 executes this process according to a communication control program as a computer program.

At step (abbreviated by S in FIG. 26) 2601, the camera microcomputer 205 performs communication with the lens microcomputer 111 to acquire, from the lens microcomputer 111, a lens ID as information on a type of the interchangeable lens 100. The camera microcomputer 205 further acquires, from the lens microcomputer 111, information on stability of the clock signal generated by the clock generator 144. The information on the stability is hereinafter referred to as "a lens clock stability". Moreover, the camera microcomputer 205 acquires, from the lens microcomputer 111, information on a temperature detected by a temperature sensor (not illustrated) provided in the interchangeable lens 100. The information on the temperature is hereinafter referred to as "a lens temperature". In addition, the camera microcomputer 205 acquires, from the lens microcomputer 111, information on a baud rate range supported by the interchangeable lens 100. The information on the baud rate range is hereinafter referred to as "a lens baud rate range". These lens ID, lens clock stability, lens temperature and lens baud rate range are included in individual information of the interchangeable lens 100. The individual information is hereinafter referred to as "lens information".

The camera microcomputer 205 performs the communication for acquiring the lens information from the lens microcomputer 111 with an initial format predetermined therebetween. The baud rate in this communication is an initial baud rate predefined therebetween. The lens ID is stored in a RAM (not illustrated) provided in the interchangeable lens 100. The camera microcomputer 205 is able to determine, from the lens ID, which functions the attached interchangeable lens 100 supports.

Next, at step 2602, the camera microcomputer 205 acquires camera information as individual information of the camera body 200 indicating its performances. The camera information includes information on stability of the clock signal generated by the clock generator 212 and information on temperature detected by a temperature sensor (not illustrated) provided in the camera body 200. The information on the stability is hereinafter referred to as "a camera clock stability", and the information on the temperature is hereinafter referred to as "a camera temperature". The camera information further includes information on a baud rate range supported by the camera body 200. The information on the baud rate range is hereinafter referred to as "a camera baud rate range".

Next, at step 2603, the camera microcomputer 205 sets, depending on the lens information acquired at step 2601 and the camera information acquired at step 2602, a baud rate to be used. As described above, the lens information includes the lens baud rate range, and the camera information includes the camera baud rate range. The camera microcomputer 205 sets, in a baud rate range included in both the lens and camera baud rate ranges, a baud rate appropriate for a type of data, an operation mode of the camera body 200 and the like. The camera microcomputer 205 notifies the lens microcomputer 111 of the set baud rate. Then, the camera microcomputer 205 notifies the baud rate generator 211 of the set baud rate to change a baud rate setting value of the baud rate generator 211 to the set baud rate.

Next, at step 2604, the camera microcomputer 205 checks the lens clock stability included in the lens information and the camera clock stability included in the camera information. If the lens and camera clock stabilities are lower than a predetermined level, the camera microcomputer 205 proceeds to step 2606. If the lens and camera clock stabilities are higher than (or equal to) the predetermined level, the camera microcomputer 205 proceeds to step 2605.

At step 2605, the camera microcomputer 205 checks the lens temperature included in the lens information and the camera temperature included in the camera information. If the lens and camera temperatures are out of an allowable temperature range, the camera microcomputer 205 proceeds to step 2606. If the lens and camera temperatures are within the allowable temperature range, the camera microcomputer 205 determines that a temperature condition is satisfied and proceeds to step 2607. At this step, the lens temperature is used as needed. That is, only the camera temperature may be used.

At step 2606, the camera microcomputer 205 sets, as the above-mentioned frame configuration that is a configuration of one frame, an initial frame configuration that is the frame configuration illustrated in FIG. 4A. This is because, when the lens and camera clock stabilities lower than the predetermined level (out of their allowable range), the data field cannot be expanded. Then, the camera microcomputer 205 proceeds to step 2608.

At step S2607, the camera microcomputer 205 changes the frame configuration to an expanded frame configuration that is the frame configuration illustrated in FIG. 25A. This is because the lens and camera clock stabilities are within the allowable range and the temperature condition is satisfied, so that the data field can be expanded.

As described above, the bit number of the data field can be arbitrary set as long as the phase relation between the transmitting data output time and the received data sampling time of the camera and lens microcomputers 205 and 111 is within the predetermined allowable range.

Then, the camera microcomputer 205 proceeds to step 2608. In a case of changing the end field configuration with the expansion of the data field, the camera microcomputer 205 also changes the end field configuration.

At step 2608, the camera microcomputer 205 notifies the lens microcomputer 111 of the frame configuration set at step 2606 or step 2607. The frame configuration notified of includes not only the bit number of the data field, but also the end field configuration. When the burst communication is performed, the frame configuration notified of includes the frame number communicated by the burst communication.

Next, at step 2609, the camera microcomputer 205 asserts the request-to-send signal RTS to cause the lens microcomputer 111 to start transmitting the lens data signal DLC and, in response to receiving the lens data signal DLC, the camera microcomputer 205 transmits the camera data signal DCL to the lens microcomputer 111. The frame configuration of the lens and camera data signals DLC and DCL transmitted and received at step 2609 is one set at step 2606 or step 2607. Communication subsequent to step 2609 is as described with referring to FIG. 12A or FIG. 25B.

This embodiment sets, depending on the individual information of each of the camera body 200 and the interchangeable lens 100, a data field configuration appropriate therefor, which enables improving the effective communication rate in asynchronous serial communication.

Embodiment 7

Next, description will be made of a seventh embodiment (Embodiment 7) of the present invention.

This embodiment is a modified example of Embodiment 6, which sets a data field configuration appropriate for the communication error in asynchronous serial communication. This embodiment is one of embodiments of an image-capturing apparatus whose camera controller has a function of detecting a communication error in lens data from an accessory apparatus and changes a data field configuration in response to the communication error.

This embodiment will describe a case where, as an example of the communication error, there is an inconsistency between the parity bit PA and a parity of data in the data field. However, the communication error is not limited thereto and includes a case where the stop bit SP cannot be correctly detected and a case where the connection at the mount 300 is broken due to abrupt detachment of the interchangeable lens 100 from the camera body 200.

In the camera microcomputer 205, the communication error is detected as follows. The camera error detector 2051 illustrated in FIG. 2 detects occurrence of the communication error and notifies the camera communication controller 2052 of information thereon (hereinafter referred to as "communication error information"). The communication error information includes the above-described content of the communication error (there is the inconsistency between the parity bit PA and the parity of data).

Figure 27:
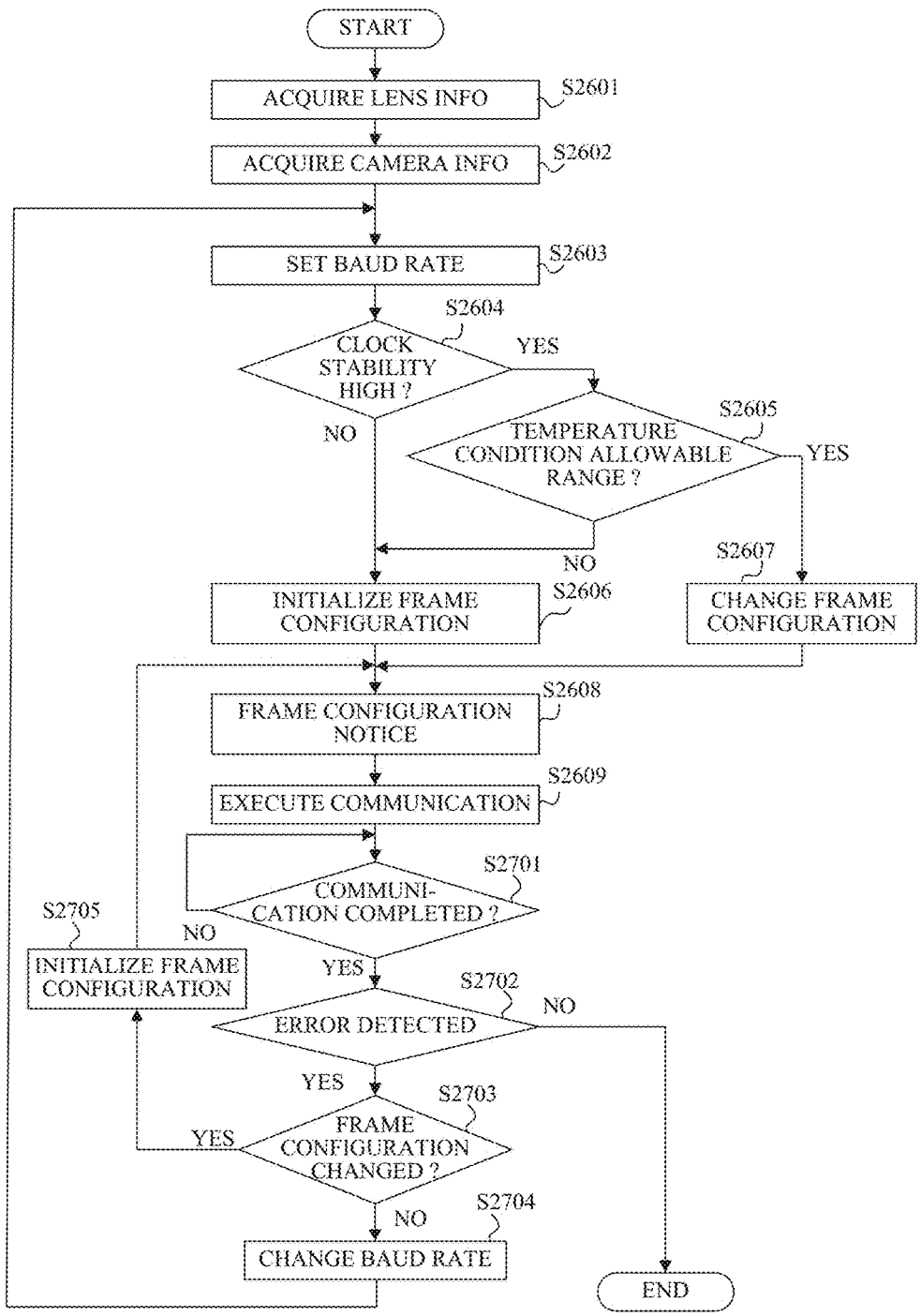
FIG. 27 is a flowchart illustrating a communication process in Embodiment 7 of the present invention.

FIG. 27 is a flow chart illustrating a communication process performed by the camera microcomputer 205 in this embodiment. The camera microcomputer 205 executes this process according to a communication control program as a computer program.

Processes at steps 2601 to 2609 are the same as those at steps 2601 to 2609 in FIG. 26 described in Embodiment 6.

The camera microcomputer 205 proceeding from step 2609 to step 2701 determines whether or not the communication having been started at step 2609 has been completed. The camera microcomputer 205 is pre-modified of the frame number of the communication as the data size information from the lens microcomputer 111. The camera microcomputer 205 (and the lens microcomputer 111) counts the transmitted frame number and determines the completion of the communication when the counted value reaches the frame number as the data size information. If the communication has been completed, the camera microcomputer 205 proceeds to step 2702.

At step 2702, the camera microcomputer 205 determines whether or not the communication error is detected by the camera error detector 2051. If the communication error is not detected, the camera microcomputer 205 directly ends this process. If the communication error is detected, the camera microcomputer 205 proceeds to step 2703.

At step 2703, the camera microcomputer 205 checks whether or not the bit number of the data field is changed according to the expanded frame configuration set at step 2608.

If the bit number of the data field is not changed (that is, the frame configuration is the initial frame configuration), the camera microcomputer 205 proceeds to step 2704. If the bit number of the data field is changed, the camera microcomputer 205 proceeds to step 2705.

At step 2704, the camera microcomputer 205 changes the baud rate setting value to a baud rate slower than that set when the communication error occurs. Then, the camera microcomputer 205 returns to step 2603 to repeat the above-described process.

On the other hand, at step 2705, the camera microcomputer 205 returns the bit number of the data field to that of the initial frame configuration. If the end field configuration has been changed, the camera microcomputer 205 returns the bit number of the end field to that of the initial frame configuration. However, the camera microcomputer 205 may reduce the bit number of the data field to a less number than that set when the communication error occurs, without returning the frame configuration to the initial frame configuration.

Then, the camera microcomputer 205 returns to step 2608 to notify the lens microcomputer 111 of the frame configuration returned at step 2705. Thereafter, the camera microcomputer 205 proceeds to step 2609 to reperform the communication. However, the communication error has occurred due to the detachment of the interchangeable lens 100 from the camera body 200, the camera microcomputer 205 starts the process from step 2601 after the interchangeable lens 100 is attached to the camera body 200.

This embodiment sets, when the communication error occurs, an appropriate frame configuration and an appropriate baud rate, which enables reducing reoccurrence of the communication error. For example, in a case where the clock stability becomes slower than envisioned due to aging degradation of the camera body 200 or the interchangeable lens 100, the reoccurrence of the communication error can be reduced.

Each of the above embodiments enables the image-capturing apparatus and the accessory apparatus to share the communication error information. Furthermore, each of the above embodiments clears the buffers in the image-capturing apparatus and the accessory apparatus promptly after the communication error occurs, which enables restarting the communication and image capturing in a short time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070093, filed on Mar. 31, 2016, which is hereby incorporated by reference herein in its entirety.

What is claimed is:

1. An accessory apparatus detachably attachable to an image-capturing apparatus, the accessory apparatus comprising:
    an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
    an accessory controller configured (a) to transmit, in response to receiving a transmission request as the notice from the image-capturing apparatus through the notification channel, the accessory data to the image-capturing apparatus through the first data communication channel and (b) to receive the camera data transmitted from the image-capturing apparatus through the second data communication channel,
    wherein:
        the accessory communicator includes an accessory data buffer configured to store the accessory data to be transmitted to the image-capturing apparatus;
        the accessory controller has a function of detecting a camera communication error in the camera data received from the image-capturing apparatus and is configured to, when detecting the camera communication error, transmit accessory error information to the image-capturing apparatus and erase the accessory data stored in the accessory data buffer.

2. An accessory apparatus according to claim 1, wherein the accessory controller is configured to produce the accessory error information by inverting a specific bit of the accessory data.

3. An accessory apparatus according to claim 1, wherein the camera communication error is a parity error or a framing error.

4. An accessory apparatus according to claim 1, wherein the specific error is a parity bit or a stop bit.

5. An accessory apparatus according to claim 1, wherein the accessory controller is configured to, when detecting the camera communication error, (a) stop transmitting the accessory error information to the image-capturing apparatus upon receiving an error detection notice as the notice from the image-capturing apparatus through the notification channel and (b) transmit the accessory error information to the image-capturing apparatus upon not receiving the error detection notice.

6. An accessory apparatus according to claim 5, wherein the accessory controller is configured to, when detecting the camera communication error, erase the accessory data stored in the accessory data buffer regardless of whether receiving or not receiving the error detection notice from the image-capturing apparatus.

7. An accessory apparatus according to claim 1, wherein the accessory controller is configured to receive the notice by a switching of a signal level on the notification channel from a first level to a second level.

8. An accessory apparatus according to claim 1, wherein the accessory controller is configured (a) to store a whole of the accessory data to be transmitted to the image-capturing apparatus to the accessory data buffer before starting transmitting the accessory data and (b) to transmit, in response to receiving a transmission request as the notice from the image-capturing apparatus, the accessory data stored in the accessory data buffer to the image-capturing apparatus through the first data communication channel.

9. An image-capturing apparatus to which an accessory apparatus is detachably attachable, the image-capturing apparatus comprising:
   a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
   a camera controller configured (a) to provide a transmission request as the notice to the accessory apparatus through the notification channel to cause the accessory apparatus to transmit the accessory data through the first data communication channel and (b) to transmit the camera data to the accessory apparatus through the second data communication channel,
   wherein:
     the camera communicator includes a camera data buffer configured to store the camera data to be transmitted to the accessory apparatus;
     the camera controller has a function of detecting an accessory communication error in the accessory data received from the accessory apparatus and is configured to, when detecting the accessory communication error, transmit camera error information to the accessory apparatus and erase the camera data stored in the camera data buffer.

10. An image-capturing apparatus according to claim 9, wherein the camera controller is configured to produce the camera error information by inverting a specific bit of the camera data.

11. An image-capturing apparatus according to claim 9, wherein the accessory communication error is a parity error or a framing error.

12. An image-capturing apparatus according to claim 9, wherein the specific error is a parity bit or a stop bit.

13. An image-capturing apparatus according to claim 9, wherein the camera controller is configured to, when detecting the accessory communication error, transmit the camera error information to the accessory apparatus and provide an error detection notice as the notice to the accessory apparatus through the notification channel.

14. An image-capturing apparatus according to claim 13, wherein the camera controller is configured to, when detecting the accessory communication error, erase the camera data stored in the camera data buffer regardless of whether providing or not providing the error detection notice to the accessory apparatus.

15. An image-capturing apparatus according to claim 9, wherein the camera controller is configured to provide the notice by switching a signal level on the notification channel from a first level to a second level.

16. An image-capturing apparatus according to claim 9, wherein the camera controller is configured (a) to store a whole of the camera data to be transmitted to the accessory apparatus to the camera data buffer before starting transmitting the camera data, (b) to provide a transmission request to the accessory apparatus to cause the accessory apparatus to transmit the accessory data through the first data communication channel and (c) to transmit the camera data stored in the camera data buffer to the accessory apparatus through the second data communication channel.

17. An image-capturing system including an image-capturing apparatus and an accessory apparatus detachably attachable to the image-capturing apparatus, wherein:
   the image-capturing apparatus and the accessory apparatus respectively comprise:
   a camera communicator and an accessory communicator configured to provide three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
   a camera controller and an accessory controller, the camera controller being configured to provide a transmission request as the notice to the accessory controller through the notification channel, the accessory controller being configured to, in response to receiving the transmission request, transmit the accessory data to the camera controller through the first data communication channel, the camera controller being configured to transmit the camera data to the accessory apparatus through the second data communication channel,
   wherein:
   the camera communicator includes a camera data buffer configured to store the camera data to be transmitted to the accessory apparatus;
   the accessory communicator includes an accessory data buffer configured to store the accessory data to be transmitted to the image-capturing apparatus;

the camera controller has a function of detecting an accessory communication error in the accessory data received from the accessory apparatus and is configured to, when detecting the accessory communication error in the accessory data, transmit camera error information to the accessory apparatus and erase the camera data stored in the camera data buffer; and the accessory controller has a function of detecting a camera communication error in the camera data received from the image-capturing apparatus and is configured to, when detecting the camera communication error, transmit accessory error information to the image-capturing apparatus and erase the accessory data stored in the accessory data buffer.

18. A control method for controlling an accessory apparatus detachably attachable to an image-capturing apparatus, the accessory apparatus configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the method comprising the steps of:

causing the accessory apparatus receiving a transmission request as the notice from the image-capturing apparatus through the notification channel to transmit the accessory data to the image-capturing apparatus through the first data communication channel;

causing the accessory apparatus to receive the camera data transmitted from the image-capturing apparatus through the second data communication channel; and causing the accessory apparatus detecting a camera communication error in the camera data received from the image-capturing apparatus (a) to transmit accessory error information to the image-capturing apparatus and (b) to erase the accessory data stored in an accessory data buffer to which the accessory data to be transmitted to the image-capturing apparatus is stored.

19. A control method for controlling an image-capturing apparatus to which an accessory apparatus is detachably attachable, the image-capturing apparatus configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the method comprising the steps of:

causing the image-capturing apparatus to provide a transmission request as the notice to the accessory apparatus through the notification channel to cause the accessory apparatus to transmit the accessory data to the image-capturing apparatus through the first data communication channel;

causing the image-capturing apparatus to transmit the camera data to the accessory apparatus through the second data communication channel; and causing the image-capturing apparatus detecting an accessory communication error in the accessory data received from the accessory apparatus (a) to transmit camera error information to the accessory apparatus and (b) to erase the camera data stored in a camera data buffer to which the camera data to be transmitted to the accessory apparatus is stored.

20. A non-transitory storage medium storing a control program as a computer program for causing a computer to execute a control method of controlling an accessory apparatus detachably attachable to an image-capturing apparatus and configured to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, the control method comprising the steps of:

causing the accessory apparatus receiving a transmission request as the notice from the image-capturing apparatus through the notification channel to transmit the accessory data to the image-capturing apparatus through the first data communication channel;

causing the accessory apparatus to receive the camera data transmitted from the image-capturing apparatus through the second data communication channel; and causing the accessory apparatus detecting a camera communication error in the camera data received from the image-capturing apparatus (a) to transmit accessory error information to the image-capturing apparatus and (b) to erase the accessory data stored in an accessory data buffer to which the accessory data to be transmitted to the image-capturing apparatus is stored.

21. A non-transitory storage medium storing a control program as a computer program for causing a computer to execute a control method of controlling an image-capturing apparatus to which an accessory apparatus is detachably attachable and that is configured to provide, with the accessory apparatus, three channels that are a notification channel used for providing a notice from the image-capturing apparatus to the accessory apparatus, a first data communication channel used for data transmission from the accessory apparatus to the image-capturing apparatus and a second data communication channel used for data transmission from the image-capturing apparatus to the accessory apparatus, the control method comprising the steps of:

causing the image-capturing apparatus to provide a transmission request as the notice to the accessory apparatus through the notification channel to cause the accessory apparatus to transmit the accessory data to the image-capturing apparatus through the first data communication channel;

causing the image-capturing apparatus to transmit the camera data to the accessory apparatus through the second data communication channel; and causing the image-capturing apparatus detecting an accessory communication error in the accessory data received from the accessory apparatus (a) to transmit camera error information to the accessory apparatus and (b) to erase the camera data stored in a camera data buffer to which the camera data to be transmitted to the accessory apparatus is stored.

* * * * *